United States Patent
Ahnert et al.

(10) Patent No.: US 6,443,276 B2
(45) Date of Patent: Sep. 3, 2002

(54) EMERGENCY FACILITIES FOR INFLUENCING DEFECTIVE CONSTITUENTS OF POWER TRAINS IN MOTOR VEHICLES

(75) Inventors: Gerd Ahnert, Sasbach-Obersasbach; Andreas Deimel, Bühl-Weitenung; Andreas Rogg, Bühl-Vimbuch; Reinhard Berger, Bühl, all of (DE)

(73) Assignee: LuK Getriebe-Systeme GmbH, Buhl/Baden (DE)

( * ) Notice: Subject to any disclaimer, the term of this patent is extended or adjusted under 35 U.S.C. 154(b) by 0 days.

(21) Appl. No.: 09/803,817

(22) Filed: Mar. 12, 2001

Related U.S. Application Data

(62) Division of application No. 09/512,588, filed on Feb. 24, 2000, now Pat. No. 6,223,873, which is a division of application No. 08/965,102, filed on Nov. 5, 1997, now Pat. No. 6,047,799.

(30) Foreign Application Priority Data

Nov. 12, 1996 (DE) .......................... 196 46 599

(51) Int. Cl.[7] .............................................. B60K 41/22
(52) U.S. Cl. ........................... 192/3.56; 74/335; 74/625; 192/83; 192/84.6
(58) Field of Search ................ 192/3.54, 3.55, 192/3.56, 3.57, 3.58, 3.59, 83, 84.6; 74/335, 625

(56) References Cited

U.S. PATENT DOCUMENTS

| | | | | |
|---|---|---|---|---|
| 1,453,202 A | * | 4/1923 | Stevens | 192/84.6 X |
| 1,459,358 A | * | 6/1923 | Buchenberg | 192/84.6 X |
| 4,085,629 A | * | 4/1978 | Fogarollo | 74/625 |
| 4,137,796 A | * | 2/1979 | Bostrom | 74/625 |
| 4,843,901 A | * | 7/1989 | Peterson et al. | 74/335 |
| 4,895,048 A | * | 1/1990 | Key et al. | 74/625 |
| 5,031,735 A | * | 7/1991 | Holmes | 192/3.57 |
| 5,080,209 A | * | 1/1992 | Yurko | 192/3.57 X |
| 5,101,684 A | * | 4/1992 | Mosslacher | 74/625 |
| 5,273,143 A | * | 12/1993 | Voss et al. | 192/3.58 |
| 6,073,504 A | * | 6/2000 | Gleixner et al. | 74/625 X |
| 6,086,232 A | * | 7/2000 | Schulze et al. | 74/625 X |
| 6,105,743 A | * | 8/2000 | Salecker et al. | 192/84.6 |

* cited by examiner

*Primary Examiner*—Rodney H. Bonck
(74) *Attorney, Agent, or Firm*—Darby & Darby

(57) ABSTRACT

The power train of a motor vehicle has an automated transmission and/or an automated clutch, at least one control unit and at least one actor receiving signals from the control unit and serving to control the operation of the automated constituent or constituents of the power train. A reestablishable connection can be interrupted in the event of a malfunctioning of the power train, such as exhaustion of the supply of electrical energy, defectiveness of the actor and/or defectiveness of the automated constituent or constituents and/or defectiveness of the motion transmitting connection or connections between the actor and the automated constituent or constituents. This renders it possible to set the transmission in neutral or into another gear and/or to select the condition of the clutch in such a way that the vehicle can advance to a selected destination under it own power or that it can be towed to such destination.

2 Claims, 24 Drawing Sheets

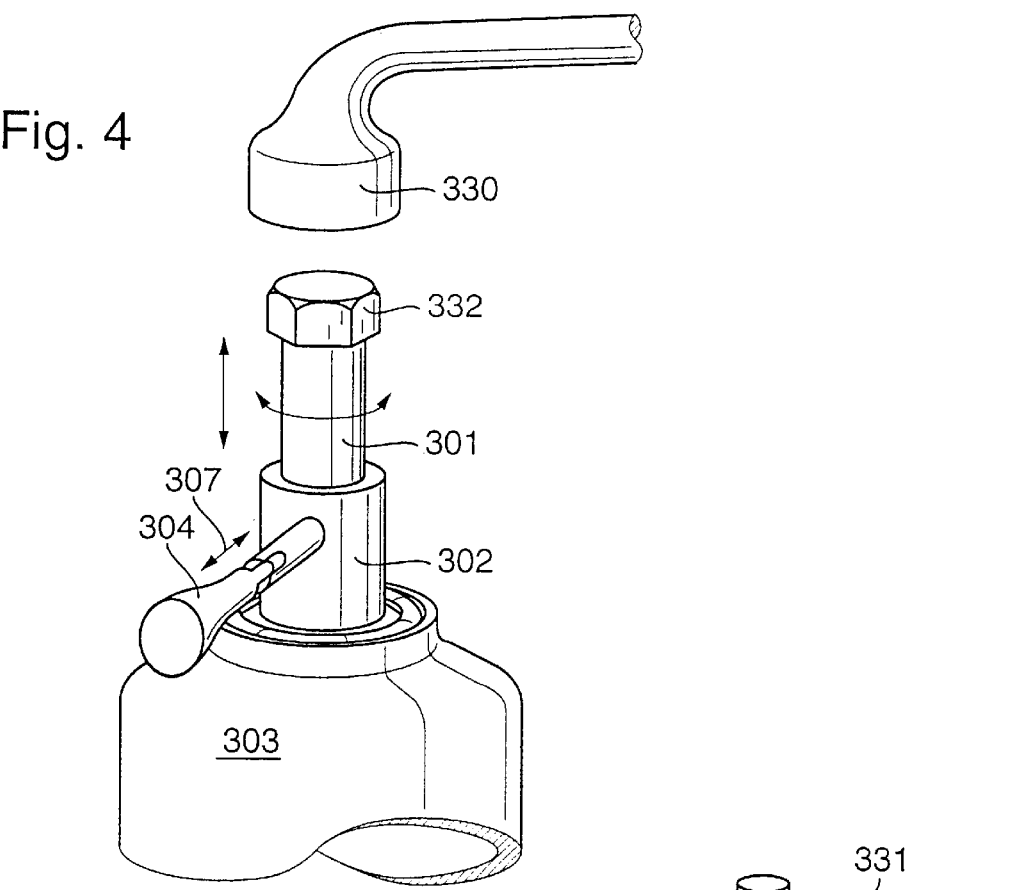
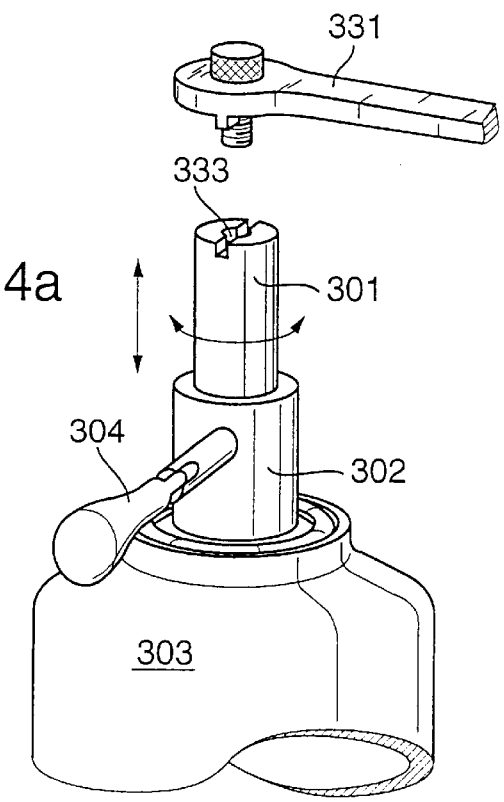
Fig. 4
Fig. 4a

EMERGENCY FACILITIES FOR INFLUENCING DEFECTIVE CONSTITUENTS OF POWER TRAINS IN MOTOR VEHICLES

This is a divisional application of Ser. No. 09/512,588, filed Feb. 24, 2000, which is now U.S. Pat. No. 6,223,873 which is a divisional of Ser. No. 08/965,102, filed Nov. 5, 1997, which is now U.S. Pat. No. 6,047,799, issued on Apr. 11, 2000. Each of these prior applications is hereby incorporated herein by reference, in its entirety.

BACKGROUND OF THE INVENTION

The invention relates to motor vehicles in general, and more particularly to improvements in power transmitting and power transmission interrupting arrangements (hereinafter called power trains) for use in motor vehicles. Still more particularly, the invention relates to improvements in power trains of the type wherein the torque transmitting system (such as a friction clutch or a torque converter with a bypass or lockup clutch) and/or the gear selecting and shifting transmission system is automated.

Power trains of the above outlined character comprise means for operating the automated system or systems. Certain recently developed operating means employ a discrete signal receiving and signal transmitting control unit (such as an electronic circuit) for each automated system, a single control unit for the single automated (transmission or torque transmitting) system, or a common control unit for both automated systems. The connection between a control unit and a discrete automated system or between a control unit and each of two automated systems comprises actuating means for shifting an automated transmission system into or from a selected or particular gear and/or for changing the condition of an automated torque transmitting system between a disengaged or partly or fully engaged condition.

Power trains of the above outlined character are disclosed, for example, in published German patent application Serial No. 43 09 901 (to which reference may be had, if necessary). For example, one of the power trains disclosed in this published German patent application is designed to ensure that shifting of the transmission system into a selected gear and/or any other regulation(s) of the transmission system is or are automated which is in contrast to most standard power trains employing a manually operable transmission system with a lever or rod which must be actuated by the operator of the motor vehicle to select a particular gear, to shift from a previously selected gear and to shift into the newly selected gear.

A drawback of presently known power trains with automated transmission systems and/or with automated torque transmitting systems is that, in the event of a malfunction or breakdown (such as damage to or destruction of an important or key component) and/or under other circumstances which cause a partial or complete failure of the automated system, the operator or even a highly skilled mechanic can be confronted with a situation that the motor vehicle is stalled or stranded at a location which is remote from an acceptable parking area, garage or repair shop. In this respect, a manually operated transmission system or torque transmitting system is more practical because, and assuming that the motor vehicle is equipped with a standard manually shiftable transmission system, exertion of a rather pronounced force upon the gear shifting lever or rod normally suffices to shift the manually operated transmission system into a selected gear or from a particular gear in order to place the motor vehicle in a condition in which the vehicle can be driven to a desired location by its own prime mover, or towed or pushed to such location by the operator (with or without assistance, e.g., from other occupant(s) of the affected vehicle) or by a second vehicle.

Analogously, if a pedal-operated torque transmitting system (such as a friction clutch) happens to malfunction, it is often still possible to cause the clutch to assume an engaged or disengaged condition, depending upon whether the disabled or partially disabled vehicle is to be pushed or pulled to a selected location or advanced to such location under its own power (e.g., at a low or extremely low speed).

If the power train of a motor vehicle employs an automated transmission system which is designed to be shifted into selected gears in response to signals from an electronic control unit, failure of the electrical energy supplying means can entail a disablement of the control unit so that automatic shifting into or from a selected gear is no longer possible. The same undesirable situation arises if a defect develops in the actuating means which is operated by the control unit and normally transmits motion to one or more internal or external mobile gear shifting and/or selecting components of an automated transmission system. Such actuating means can employ one or more electric or other suitable motors and a linkage, a cable, a Bowden wire or other suitable means for transmitting motion from the output element(s) of the motor or motors to the mobile input element(s) of the automated transmission system. Thus, if a malfunction develops while the automated transmission system is in (a forward or reverse) gear (rather than in neutral), e.g., due to the failure of the car battery and/or a generator to supply electrical energy to the electronic control unit, the transmission system acts as a parking brake and prevents any movements of the affected motor vehicle. The reason is that a conventional automated transmission system cannot be shifted into neutral gear if such automated system and/or the operating means therefor develops certain defects.

Presently known operating means for automated transmission systems are constructed and assembled in such a way that, if a malfunction develops in the means for transmitting signals to a control unit (e.g., a microprocessor) of the operating means or the means for transmitting signals from the output or outputs of the control unit to the driving unit or units (e.g., one or more electric motors) of the actuating means between the control unit and the automated transmission system, the operator of the motor vehicle is no longer in-a position to shift the defective automated transmission system into neutral gear or into another (forward or reverse) gear. This results in the aforediscussed inconveniences, such as the inability of the operator of the affected motor vehicle to drive the vehicle to a desired location under its own power, or even to push or pull the vehicle to such location. Thus, it is then necessary to lift the disabled motor vehicle onto the platform of a truck or to actually dismantle certain parts of the power train in order to alter the condition of the power train to an extent which is necessary to permit the driving, pushing or pulling of the vehicle to a safe parking area, to an area which is authorized for parking, to the garage of the owner of the vehicle, or to a repair shop.

The situation is not much different in the event of malfunctioning of an automated torque transmitting system (e.g., a friction clutch or a torque converter with a bypass or lockup clutch) and/or of the means for operating such automated torque transmitting systems. Thus, it is not alway possible to place a disabled automated torque transmitting system into a fully engaged condition, into a partially engaged condition or into a fully disengaged condition.

OBJECTS OF THE INVENTION

An object of the invention is to provide a motor vehicle with a power train which permits for the transport of the motor vehicle (under its own power or with assistance from another vehicle) even if its automated system or systems become defective to an extent which entails a complete immobilizing of a vehicle employing a presently known power train with one or more automated systems, e.g., an automated torque transmitting system and/or an atomated transmission system.

Another object of the invention is to provide novel and improved automated systems and novel and improved operating means for automated systems in the power trains of motor vehicles.

A further object of the invention is to provide a novel and improved automated transmission system, novel and improved operating means for such automated transmission system, and a power train which employs such automated transmission system and operating means therefor.

An additional object of the invention is to provide a power train with novel and improved emergency facilities for influencing defective constituents (such as automated transmission systems, automated torque transmitting systems and/or operating means for such automated systems) in such a way that a vehicle wherein one or more automated systems are defective or entirely out of commission can be still driven or pushed or pulled to a desired location.

Still another object of the invention is to provide emergency facilities which permit manual or power-operated interruption of the transmission of power by the power train in the event of damage to or a total breakdown of one or more automated systems of the power train and/or of the means for operating such automated system or systems.

A further object of the invention is to provide a power train wherein a defective automated transmission system can be mapulated to shift it into a selected (such as neutral or other) gear with a minimum of effort and with no loss or with negligible or minor loss of time.

Another object of the invention is to provide a power train which is not more sensitive, bulkier, more complex and/or more expensive than heretofore known power trains with one or more automated systems even though the improved power train exhibits the above enumerated advantages over conventional power trains.

An additional object of the invention is to provide a novel and improved method of manipulating a disabled power train having one or more automated systems and operating means therefor.

Still another object of the invention is to provide a motor vehicle which embodies the above outlined power train with one or more automated systems and operating means therefor.

A further object of the invention is to provide novel and improved automated systems for use in the above outlined power train.

Another object of the invention is to provide novel and improved combinations of control units, automated transmission systems and operating means connecting the control units with the transmission systems.

An additional object of the invention is to provide a novel and improved combination of a control unit, an automated torque transmitting system and operating means which is used between the control unit and the automated torque transmitting system.

Still another object of the invention is to provide novel and improved means for manipulating or adjusting or resetting a defective automated torque transmitting system and/or a defective automated transmission system in the power train of a passenger car or another motor vehicle.

A further object of the invention is to provide a power train which is constructed and assembled and which can be operated in such a way that unexpected malfunctioning or a total breakdown of one or more of its automated systems does not compel the operator of the motor vehicle, even an unskilled operator, to leave the vehicle stranded at a location which is not suitable for the reasons of safety and/or for any other reason or reasons (such as at a location where the stranded vehicle could interfere with the traffic or the owner would be likely to be penalized for unauthorized parking).

Another object of the invention is to provide novel and improved means for establishing temporary emergency connections between parts which are normally connected or coupled to each other only as long as the automated system (s) and/or the operating means for such system or systems in the power train of a motor vehicle are neither defective nor totally disabled.

SUMMARY OF THE INVENTION

One feature of the invention resides in the provision of a motor vehicle (e.g., a passenger car) employing a power transmitting and power interrupting arrangement (power train) which comprises the following constituents: a prime mover (such as a combustion engine), a torque transmitting system having engaged and disengaged conditions, a transmission system which is shiftable into a plurality of gears (at least one of these systems is automated), and means for automatically operating the at least one system. At least one of the above enumerated constituents of the power train is prone to develop at least one of defects entailing (a) the inability of the power train to interrupt the transmission of power or to continue to transmit power, (b) the inability of the torque transmitting system to change its condition (e.g., from an at least partially engaged condition to fully disengaged condition or vice versa), and (c) the inability of the transmission system to shift into or from a selected gear, and the power train further comprises at least one emergency facility for at least partially eliminating or overcoming the at least one defect in accordance with at least one of the procedures including (i) manualy and (ii) automatically.

Another feature of the invention resides in the provision of a motor vehicle having a power train which comprises a prime mover (such as a combustion engine), a torque transmitting system having engaged and disengaged conditions, an automatically operable transmission system which is shiftable into a plurality of gears (e.g., a neutral gear, a reverse gear and several forward gears), and means for automatically operating the transmission system. The operating means comprises a signal receiving and transmitting control unit, means (e.g., a plurality of sensors and/or one or more electronic circuits) for transmitting signals to the control unit, and actuating means operating between the control unit and at least one input element of the transmission system. The actuating means comprises at least one driving unit (such as an electric motor) and at least one mobile output element arranged to receive motion from the at least one driving unit and to normally transmit motion to the at least one input element. In accordance with a feature of the invention, the power train further comprises a separable connection which is provided between the at least one input element and at least one of (a) the at least one driving unit and (b) the at least one output element.

The connection can be designed and installed in such a way that it is separable and reengageable. Still further, the power train can comprise means for manually shifting the transmission system into a selected gear in the separated condition of the connection and/or means for automatically shifting the transmission into a selected gear in response to separation of the connection.

A further feature of the invention resides in the provision of a motor vehicle having a power train which comprises a prime mover (such as a combustion engine), a transmission system shiftable into a plurality of gears, an automatically operable torque transmitting system (e.g., a friction clutch) having engaged and disengaged conditions (unless otherwise stated, the term "engaged" is intended to denote a partly engaged or a fully engaged condition of the torque transmitting system), and means for automatically operating the torque transmitting system. The operating means comprises a signal receiving and transmitting control unit, means for transmitting signals to the control unit, and actuating means operating between the control unit and at least one input element of the torque transmitting system. The actuating means can comprise at least one driving unit and at least one mobile output element which is arranged to receive motion from the at least one driving unit and to normally transmit motion to the at least one input element, and the power train further comprises a separable connection which is provided between the at least one input element of the torque transmitting system and at least one of the at least one driving unit and the at least one output element of the actuating means.

The connection is preferably separable and reengageable, and the improved power train further comprises means for manually changing the condition of the torque transmitting system in the separated condition of the connection and/or means for automatically changing the condition of the torque transmitting system in response to separation of the connection.

An additional feature of the invention resides in the provision of a power train which can be put to use in a motor vehicle and comprises a prime mover, a transmission system which is shiftable into and from a selected one of a plurality of gears, a torque transmitting system having engaged and disengaged conditions, and means for automatically operating at least one of the systems. The operating means comprises a signal receiving and transmitting control unit, means for transmitting signals to the control unit, and actuating means operating between the control unit and at least one input element of the at least one (automatically operable) system. The actuating means comprises at least one driving unit and at least one mobile output element which is arranged to receive motion from the at least one driving unit and to normally transmit motion to the at least one input element, and the power train further comprises at least one connection provided between the at least one input element of the automatically operable system and the actuating means and having an operative condition and an inoperative condition.

The power train further comprises means for operating the at least one (automatically operable) system in the inoperative condition of the at least one connection, and such operating means can be manipulated by hand or it can be automated and can include auxiliary actuating means. For example, the means for operating the at least one system in the inoperative condition of the at least one connection can comprise at least one coil spring, leaf spring or another energy storing device.

If the at least one automatically operable system is the transmission system, the at least one connection can be constructed and installed in such a way that, when it assumes the inoperative condition, it separates the at least one input element of the automated transmission system from the actuating means. The means for operating the transmission system in the inoperative condition of the at least one connection can comprise at least one of (a) manually operable means for shifting the transmission system into and from a selected gear, (b) at least one automatic auxiliary actuating means for shifting the transmission system into and from a selected gear, and (c) energy storing means for shifting the transmission system into and from a selected gear.

If the at least one system is the torque transmitting system, the at least one connection can be designed and installed in such a way that, when it assumes the inoperative condition, it separates the at least one input element of the automated torque transmitting system from the actuating means. The means for operating the automated torque transmitting system in the inoperative condition of the at least one connection can comprise at last one of (a) manually operable means for changing the condition of the automated torque transmitting system, (b) at least one automatic auxiliary actuating means for changing the condition of the automated torque transmitting system, and (c) energy storing means for changing the condition of the automated torque transmitting system.

The at least one connection can constitute a mechanical connection. In accordance with a presently preferred embodiment, the at least one connection can include at least one of the following: a linkage (such as a link train), at least one Bowden wire, one or more cables, at least one lever, and a fluid-operated (hydraulic or pneumatic) connection.

The actuating means can comprise a transmission (e.g., a gearing such as a bevel gearing and/or a spur gearing), and a driving unit for the transmission. The a least one connection can be constructed and installed in such a way that it is normally operative between the at least one input element of the at least one system and the transmission of the actuating means.

The at least one connection can be disposed at (such as close to) the transmission system or at the torque transmitting system.

In one of the presently preferred embodiments, the at least one connection includes first and second parts which are connected to each other in the operative condition of the at least one connection and are separable at least once to change the condition of the at least one connection to inoperative condition. The arrangement can be such that the first and second parts are connectable to each other at least once to thereby cause the at least one connection to assume the operative condition and which are separable from each other at least once to thus cause the at least one connection to assume its inoperative condition.

The at least one connection can constitute a form-locking connection comprising normally interconnected first and second parts which are separable from each other at least once to thus cause the at least one connection to assume its inoperative condition. The arrangement can be such that the first and second parts are connectable to each other at least once to thus cause the at least one connection to reassume its operative condition.

The actuating means can comprise at least one driving unit and at least one output element between the at least one driving unit and the at least one input element of the at least one system, and the form-locking connection can be provided between the at least one input element and at least one of the at least one output element and the at least one driving unit of the actuating means.

If the form-locking connection comprises at least two separable parts which are connected to each other in the operative condition of the at least one connection, at least one of the at least two parts can be at least substantially coaxial with at least a portion of the other of the at least two parts in the operative condition of the at least one (form-locking) connection. Alternatively, at least one of the at least two parts of the form-locking connection can be at least substantially parallel with and adjacent at least a portion of the other of the at least two parts in the operative condition of the at least one connection.

It is also possible to design the at least one connection in such a way that it constitutes a forcelocking connection. Such force-locking connection can comprise normally interconnected first and second parts which are separable from ech other at least once to thus cause the at least one connection to assume its inoperative condition. The arrangement can be such that the first and second parts are connectable to each other at least once to thus cause the at least one (force-locking) connection to reassume its operative condition.

The actuating means can comprise at least one driving unit and at least one output element between the at least one driving unit and the at least one input element of the at least one system. The force-locking connection can be provided between the at least one input element and at least one of the at least one output element and the at least one driving unit of the actuating means.

If the force-locking connection comprises at least two separable parts which are connected to each other in the operative condition of the at least one connection, at least one of the at least two parts can be at least substantially coaxial at least with a portion of the other of the at least two parts in the operative condition of the at least one (force-locking) connection. Alternatively, at least one of the at least two parts can be at least substantially parallel with and adjacent at least a portion of another part in the operative condition of the at least one (force-locking) connection.

If the at least one connection is a form-locking connection, it can be constructed and installed in such a way that it is separable in response to disengagement of a suitable coupling element to thus establish the inoperative condition of the at least one connection. Such form-locking connection can comprise first and second parts which are separably connected to each other by the coupling element in the operative condition of the at least one connection. For example, the coupling element can constitute a bolt, a detent, a pawl, a locking bar, a pin or stud, a sliding bolt, a screw or another threaded fastener, or a plug.

The coupling element can include first and second male portions, and the first and second parts of the form-locking connection then respectively comprise first and second female portions which receive the respective male portions of the coupling element in the operative condition of the at least one connection. Alternatively, one of the parts of the at least one connection can be provided with a female portion for a male portion of the coupling element, and the other part of the at least one connection can be force-lockingly connected with the coupling element in the operative condition of the at least one (form-locking) connection. As a further alternative, one part of the at least one connection can be provided with a female portion for a male portion of the coupling element, and another part of the at least one connection can be frictionally connected with the coupling element in the operative condition of the at least one (form-locking) connection.

The just discussed form-locking connection can further comprise at least one energy storing element which biases the coupling element against at least one of the first and second parts of the at least one connection, at least in the operative condition of the at least one connection, in order to establish a force transmitting connection between the parts of the at least one (form-locking) connection. If the at least one system is the transmission system, the at least one connection of the just outlined character can be provided between the at least one input element of the transmission system and the at least one output element of the actuating means forming part of the means for operating the automated transmission system. The coupling element is preferably disengageable from at least one of the parts of the at least one connection against the opposition of the at least one energy storing element to thus establish the inoperative condition of the at least one connection.

It is also possible to employ at least one connection having first and second parts and to further employ a coupling element having first and second positions in which the coupling element respectively connects the parts to each other in the operative condition of the at least one connection and is uncoupled from at least one of the parts in the inoperative condition of the at least one connection. Such connection can further comprise means for locking the coupling element in at least one of its first and second positions.

The power train can further comprise manually operable means (such as a wrench or a lever) for moving the at least one input element at least in the inoperative condition of the at least one connection and/or automated means (such as a suitable motor) for moving the at least one input element at least in the inoperative condition of the at least one connection.

Still further, the power train can comprise resilient means for moving the at least one input element at least in the inoperative condition of the at least one connection.

The at least one input element can comprise a profiled (e.g., hexagonal) portion engageable by an implement which is operable to effect, when necessary, movements of the at least one input element at least in the inoperative condition of the at least one connection. Such implement can constitute a manually operable implement. Alternatively, the implement can be an automatically operable implement, and the power train then further comprises means for automatically operating such implement. Still further, the implement can be operated by resilient means in addition to or in lieu of manual or automatic operation.

The at least one imput element can be further provided with a second portion which separably supports and is movable by the aforementioned profiled portion in response to operation of the implement.

The power train can comprise manually operable means for moving the at least one input element in the inoperative condition of the at least one connection. Such manually operated means can be replaced by power-operated means. The power-operated means can comprise one of (a) an electric motor, (b) a magnet (such as an electromagnet), and (c) a fluid-operated (hydraulic or pneumatic) motor.

The power train can comprise means for moving the at least one input element to a predetermined position in the inoperative condition of the at least one connection. If the at least one system is the transmission system, such system can be shifted into neutral gear or into a gear other than neutral in response to movement of the at least one input element to its predetermined position. If the at least one system is the torque transmitting system, such system can be caused to assume a fully engaged condition, a partly engaged condition or a disengaged condition in response to movement of the at least one output element to its predetermined position.

Another feature of the invention resides in the provision of a power train which comprises a prime mover, a transmission system shiftable into and from one of a plurality of gears, a torque transmitting system having engaged and disengaged conditions, and means for automatically operating at least one of the two systems. The operating means comprises a signal receiving and transmitting control unit, means for transmitting signals to the control unit, and actuating means operating between the control unit and at least one input element of the at least one system. The actuating means comprises at least one driving unit, at least one mobile output element arranged to receive motion from the at least one driving unit by way of at least one transmission and to normally transmit motion to the at least one input element, and a mobile operating component for at least one of the driving unit and the at least one transmission. Such power train can further comprise at least one of (a) a manually manipulatable implement and (b) a power-operated implement for moving the operating component. The operating component and the at least one implement can comprise complementary portions for the establishment of a form-locking or force-locking or frictional connection between them. Furthermore, the operating component and the at least one implement can comprise means for separably coupling the at least one implement to the operating component and/or resilient means for yieldably opposing movements of the operating component by way of the at least one implement. The arrangement can be such that the operating component is shiftable between a first position in which such component is connectable with the at least one implement and a second position in which it is disconnectable from the at least one implement. Such structure can further comprise a coupling which is arranged to transmit motion from the at least one implement to the operating component in the first position of such component. Still further, there can be provided means for releasably locking the operating component in at least one of its first and second positions. The locking means can comprise at least one resilient element and/or a form-locking device for the operating component.

A further feature of the invention resides in the provision of a power train which comprises a prime mover, a transmission system which is shiftable into and from a selected one of a plurality of gears, a torque transmitting system having engaged and disengaged conditions, and means for automatically operating at least one of the two systems. The operating means comprises a signal receiving and transmitting control unit, means for transmitting signals to the control unit, and actuating means operating between the control unit and at least one input element of the at least one system. The actuating means comprises at least one driving unit and at least one mobile output element arranged to receive motion from the at least one driving unit and to normally transmit motion to the at least one input element. The at least one system further comprises means for moving the at least one input element.

The arrangement can be such that the means for moving the at least one input element is operative to move the at least one input element independently of the actuating means. Furthermore, the means for moving the at least one input element can comprise at least one of (a) a manually manipulatable implement and (b) a power-operated implement. If the at least one system is the transmission system and one of the plurality of gears is a neutral gear, the at least one implement can be arranged to shift the transmission system into neutral gear. If the at least one system is the torque transmitting system, the at least one implement can be arranged to cause the torque transmitting system to assume its disengaged condition.

Still another feature of the invention resides in the provision of a power train which comprises a prime mover, an automatically operable torque transmitting system having engaged and disengaged conditions, an automatically operable transmission system which is shiftable into a plurality of gears, means for automatically operating the torque transmitting system, and means for automatically operating the transmission system. Each of the operating means comprises a signal receiving and signal transmitting control unit, means for transmitting signals to the control unit, and actuating means operating between the control unit and at least one input element of the respective system. Still further, such power train comprises a separable connection provided between at least one of the input elements and the respective actuating means.

Each of the two control units can have its own (discrete) housing. Alternatively, the power train can comprise a common housing for the two control units. Still further, the power train can comprise a single control unit which is common to the two operating means.

Another feature of the invention resides in the provision of a power train which comprises a prime mover, a torque transmitting system having engaged and disengaged conditions, a transmission system which is shiftable into a plurality of gears, and means for automatically operating at least one of the two systems. The operating means comprises a signal receiving and signal transmitting control unit, means for transmitting signals to the control unit, and actuating means operating between the control unit and at least one input element of the at least one system. The control unit includes means for generating on the basis of received signals at least one defect signal denoting a malfunctioning of the at least one system.

The control unit can be arranged to generate at least one defect signal in response to reception of signals departing from a range of signals which denote a satisfactory operation of the at least one system. It is also possible to design the control unit in such a way that it generates at least one defect signal in response to a failure of the actuating means to react in a predetermined (prescribed) manner to signals which are being transmitted by the control unit. Still further, the control unit can be arranged to generate at least one defect signal in response to reception of at least one signal denoting the failure of the actuating means to respond to a predetermined set of data in a predetermined manner. It is also possible to design the control unit in such a way that it generates at least one defect signal in response to reception of at least one signal denoting a departure of available electrical energy from a predetermined range of acceptable values; such at least one defect signal can be generated due to reception by the control unit of at least one signal denoting that the available electrical energy is at least close to zero.

The at least one defect signal can be generated in response to an activity by the operator of the motor vehicle, namely an activity which entails the transmission to the control unit of a signal departing from an acceptable or anticipated signal. Such activity can involve actuation of at least one of a knob, a lever and a switch.

An additional feature of the invention resides in the provision of a power train which comprises a prime mover, a torque transmitting system having engaged and disengaged conditions, a transmission system having a plurality of conditions in each of which the transmission system is shifted into one of a plurality of different gears, and means for automatically operating at least one of the two systems. The operating means comprises a signal receiving and transmitting control unit, means for transmitting signals to the control unit, and actuating means operative between the control unit and at least one input element of the at least one system. The power train further comprises means for indicating the momentary condition of the at least one system.

The indicating means can be associated with the actuating means and it can be provided on the at least one system. Furthermore, the indicating means can be associated with at least one component part of the at least one system.

For example, the indicating means can comprise a scale and a pointer. The scale is movable relative to the pointer or vice versa to a position which is indicative of the momentary condition of the at least one system.

The indicating means can include means for displaying the momentary condition of the at least one system.

The novel features which are considered as characteristic of the invention are set forth in particular in the appended claims. The improved power train itself, however, both as to its construction, its mode of operation and the mode of installing it in a motor vehicle, together with numerous additional important and advantageous features thereof, will be best understood upon perusal of the following detailed description of certain presently preferred specific embodiments with reference to the accompanying drawings.

BRIEF DESCRIPTION OF THE DRAWINGS

FIG. 4 illustrates the structure of FIG. 3 but with the connection separated and further showing an implement which can be manipulated by hand to transmit motion to the input element of the transmission system in lieu of the actuating means;

FIG. 4a is a view similar to that of FIG. 4 but showing a different manually manipulatable implement for rotating the input element of the transmission system independently of the output element of the actuating means;

FIG. 6b is an enlarged view of the combined adjusting and separating means of the connection which is shown in FIG. 6a;

FIG. 7b is an enlarged partly elevational and partly sectional view of a detail in the structure of FIG. 7a;

FIG. 16b shows a modification of the structure which is shown in FIG. 16a;

FIG. 17b shows a modification of the structure which is illustrated in FIG. 17a;

DESCRIPTION OF PREFERRED EMBODIMENTS

Figure 1:
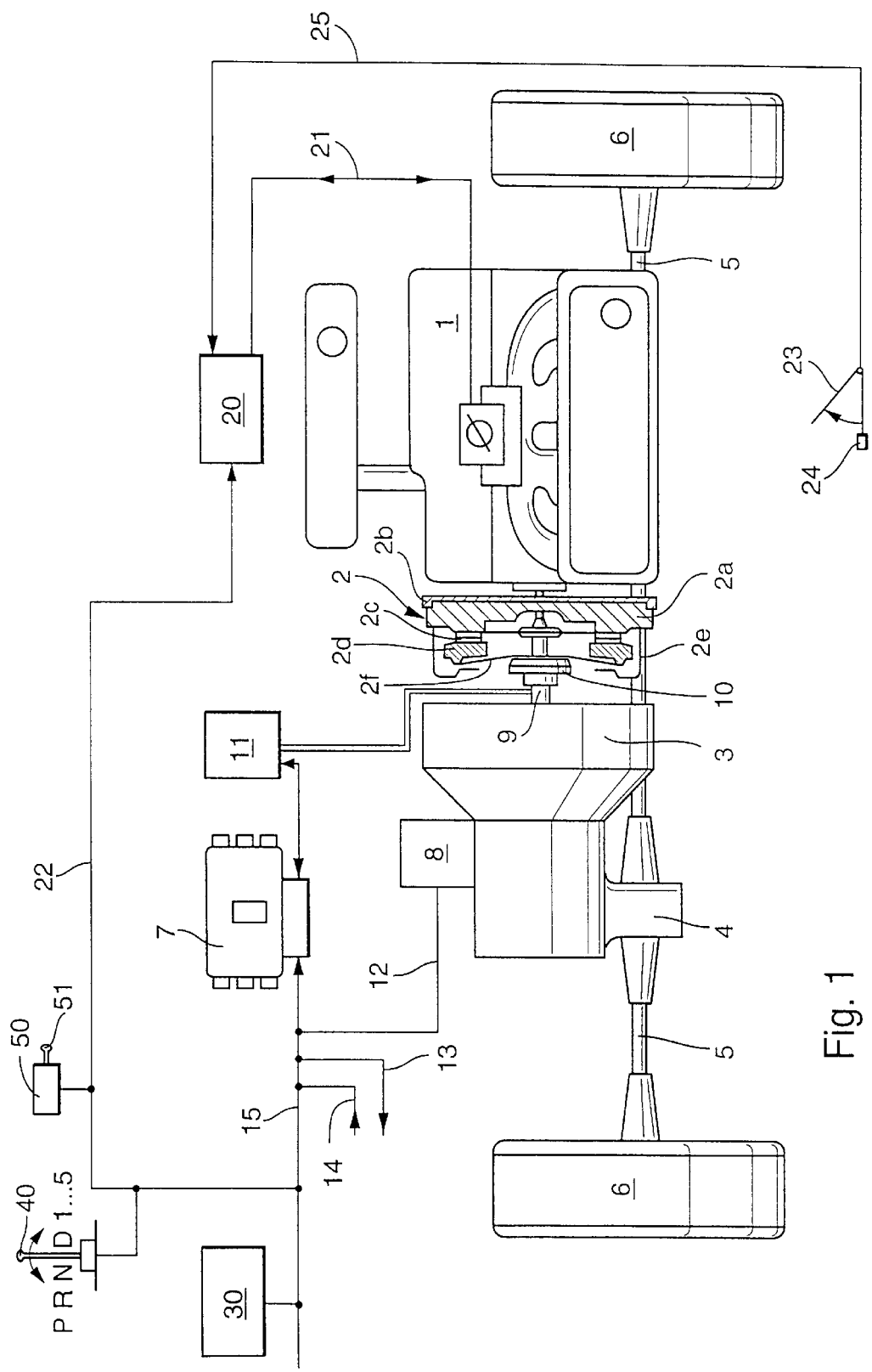
FIG. 1 is a schematic partly elevational and partly diagrammatic view of certain constituents of a motor vehicle including a power train which embodies one form of the present invention and comprises an automated friction clutch between a prime mover and an automated transmission system.

Referring first to FIG. 1, there is shown a portion of a motor vehicle including a power train (power transmitting and power transmission interrupting arrangement) which comprises a prime mover 1 (such as a standard internal combustion engine) having a rotary output element (such as a camshaft or a crankshaft) serving to transmit torque to a rotary input element 2a (such as a single or a composite flywheel) of an automated torque transmitting system 2, e.g., a friction clutch and hereinafter called clutch or friction clutch for short. The output element 2c (such as a clutch disc or clutch plate) of the clutch 2 serves to transmit torque to a rotary input element (e.g., a shaft) of an automated transmission system 3 having a plurality of gears (e.g., a neutral gear N, a reverse gear R, a parking gear P and several forward gears, e.g., 1 to 5). The output element of the transmission system 3 serves to transmit motion to a differential 4 which, in turn, transmits motion to live axles 5 for driven wheels 6 of the motor vehicle.

The RPM of at least one of the wheels 6 can be monitored by a suitable RPM detector or sensor (not specifically shown) serving to transmit signals to the corresponding input of an electronic control unit 7 forming part of means for automatically operating the automated clutch 2 and the automated transmission system 3. In lieu of or in addition to an RPM sensor for at least one of the driven wheels 6, the monitoring means can comprise one or more further RPM sensors, and such sensor or sensors can transmit appropriate signals to the control unit 7 as well as to one or more additional electronic circuits such as a suitable antiblocking system (ABS). Still further, a tachometer generator (not shown) can monitor the rotational speed of one or more parts of the differential 4, and the control unit 7 can evaluate and process such signals to ascertain the speed of the motor vehicle and/or the rotational speed of one or more selected constituents of the engine 1 and/or of the transmission system 3.

The internal combustion engine 1 is but one of several types of prime movers which can be put to use in the power train of the present invention. For example, the engine 1 can be replaced with a hybrid drive employing an electric motor, a flywheel with a freewheel and/or a combustion engine The illustrated friction clutch 2 can be replaced with another suitable torque transmitting system. For example, this clutch can be replaced with a magnetic powder or particle clutch, a multiple-disc clutch or a hydrokinetic torque converter with a bypass or lockup clutch, e.g., of the type disclosed in commonly owned U.S. Pat. No. 5,377,796 granted Jan. 3, 1995 to Friedmann et al. for "APPARATUS FOR TRANSMITTING FORCE BETWEEN ROTARY DRIVING AND DRIVEN PARTS". Furthermore, the illustrated friction clutch 2 can be of the type embodying suitable wear compensating means. Reference may be had to commonly owned U.S. Pat. No. 5,409,091 granted Apr. 25, 1995 to Reik et al. for "AUTOMATICALLY ADJUSTABLE FRICTION CLUTCH". The disclosures of these U.S. patents, the disclosures of all other U.S. patents specifically mentioned herein, as well as the disclosures of all U.S. patents and allowed U.S. patent applications corresponding to any of the foreign patents and/or patent applications mentioned in the present specification, are incorporated herein by reference.

FIG. 1 shows that the clutch 2 is installed in the power train between the prime mover 1 and the transmission system 3 (as seen in the direction of power flow toward the wheels 6). However, it is equally within the purview of the invention to install the clutch 2 or another suitable torque transmitting system downstream of the transmission system 3. Reference may be had to German patent No. 37 03 759 which discloses an infinitely variable speed transmission (CVT) of the type also known as variator upstream of the clutch. Another power train with an infinitely variable speed transmission is disclosed in commonly owned U.S. Pat. No. 5,169,365 granted Dec. 8, 1992 to Friedmann for "POWER TRAIN".

In addition to the electronic control unit 7, the means for automatically operating the clutch 2 and the transmission system 3 comprises the aforementioned means for transmitting signals to the input or inputs of the control unit 7 as well as two discrete actuating means 8 and 11 (hereinafter called actors for short) which respectively operate between the control unit 7 on the one hand, and appropriate input elements of the transmission system 3 and clutch 2 on the other hand. The control unit 7 can constitute an integrated unit which is designed to receive signals from the monitoring means including various sensors and/or electronic circuits, and to process or evaluate such signals for transmission to the actors 8 and 11 and, if necessary, to one or more additional signal receiving constituents of the power train.

FIG. 1 shows that the control unit 7 of the operating means for the automated clutch 2 and the automated transmission system 3 (i.e., for the actors 11 and 8) is further connected (by conductor means 22) with engine electronics 20 and (by conductor means 15) with a source of data such as transmission electronics 30. Alternatively, the engine electronics 20 and/or the transmission electronics 30 can be incorporated into (i.e., they can form part of) the control unit 7. Still further, it is possible to provide a discrete control unit for each of the actors 8 and 11. Reference may be had to the commonly owned copending German patent application Serial No. 195 04 847 and to the corresponding U.S. patent(s) and/or U.S. patent application(s).

It is also within the purview of the invention to provide a common control unit 7 for the actors 8 and 11 or a discrete control unit for each of these actors, or a common control unit or discrete control units with data and/or signal transmitting connections provided between such control unit(s) and the engine electronics (20) and/or the actor 8 and/or the actor 11 and/or the transmission electronics 30.

The sensor or sensors are or can be designed to furnish to the input(s) of the control unit 7 signals denoting various operational parameters (regarding the actual operating point) and/or other information which must be evaluated and/or processed for the transmission of appropriate signals to the actor 11 and/or 8. In lieu of connecting the control unit 7 with the outputs of various discrete sensors of a composite monitoring means (which can further include one or more electronic and/or other circuits), it is possible to connect the input(s) of the control unit 7 with various data supplying conductors or with a data bus.

The control unit 7 is equipped with one or more computers serving to receive, memorize, evaluate and process the incoming information as well as to permit the addressing and retrieval of the stored processed and/or unprocessed information, e.g., for transmission to the actor 8 and/or 11, to the engine electronics 20 and/or to other information receiving means.

The illustrated friction clutch 2 comprises the aforementioned input element or flywheel (counterpressure plate) 2a which is driven by the engine 1, and the aforementioned output element (clutch disc or clutch plate) 2c which transmits torque to an input element (e.g., a central shaft) of the transmission system 3 when the clutch 2 is maintained in an at least partially engaged condition and the engine 1 drives the flywheel 2a. The flywheel 2a can be a simple (such as one-piece) flywheel or a composite flywheel employing an engine-driven primary flywheel, a secondary flywheel which can transmit torque to the clutch disc 2c, and one or more dampers, slip clutches or the like between the primary and secondary flywheels. Reference may be had, for example, to commonly owned U.S. Pat. No. 5,374,218 granted Dec. 20, 1994 to Reik et al. for "ASSEMBLY FOR COMPENSATION OF FLUCTUATIONS OF TORQUE".

The flywheel 2a of the clutch 2 shown in FIG. 1 carries a standard starter gear 2b and can transmit torque to a cover or housing 2e which transmits torque to an axially movable pressure plate 2d. The latter is biased by a clutch spring 2f (such as a diaphragm spring). The actual input elements of the clutch 2 (namely the elements which can cause the clutch spring 2f and the plates 2a, 2d to change the condition of the clutch between a fully engaged condition, a fully disengaged condition and a plurality (e.g., an infinite number) of partially engaged conditions) comprises an axially movable bearing 10 (such bearing can bear upon radially inwardly extending tongues or prongs of the clutch spring 2f) and an element 9 which (when necessary) receives motion from the actor 11 to act upon the bearing 10 (or to permit the spring 2f to displace the bearing 10, depending upon whether the clutch 2 is to be fully engaged, partly engaged or disengaged). The clutch disc 2c has friction linings which are clamped (with or without slip) between the plates 2a, 2d when the clutch 2 is caused to assume an at least partially engaged condition.

If the clutch 2 is of the self-adjusting type, the pressure plate 2d and the clutch spring 2f can be automatically shifted toward the counterpressure plate 2a (namely relative to the housing 2e) through distances which are a function of the extent of wear at least upon the friction linings of the clutch disc 2c. As disclosed in the aforementioned U.S. Pat. No. 5,409,091, an automatically adjustable clutch further comprises means (e.g., at least one force- and/or distance-ascertaining sensor) for monitoring the extent of wear at least upon the friction linings and for thus ensuring that a compensation for wear takes place only when necessary and to an extent which is required to account for wear upon the friction linings (but preferably also upon certain other constituents of the automatically adjustable clutch).

The actor 11 between the control unit 7 and the input element 9 of the clutch 2 can include one or more driving units in the form of electric motors, electro-hydraulic prime mover means (which operates with a pressurized hydraulic fluid) and/or others. For example, the control unit 7 can directly control a master cylinder which, in turn, controls a slave cylinder serving to move the input element 9 and/or the bearing 10 against the opposition of the clutch spring 2f. Alternatively, the driving unit(s) of the actor 11 can be mechanically connected with the bearing 10 and/or with the input element 9 of the friction clutch 2.

The actor 8 can comprise one or more driving units (e.g., one or more electric motors receiving signals from the control unit 7) and one or more output elements 5 between the driving unit(s) and the input element(s) of the transmission system 3. As will be fully described hereinafter, the actor 8 can comprise two driving units (see the electric motors 103, 104 in FIG. 2) one of which initiates an automatic selection of a particular gear of the transmission system 3 and the other of which effects the actual shifting of the transmission system 3 into or from a selected gear. The transmission system 3 can constitute any one of a wide variety of transmission systems which can be utilized in the power train of FIG. 1 to receive torque from the friction clutch 2 (namely from the clutch disc 2c) and to drive the differential 4 in a manner determined by signals from the control unit 7 to the actor 8.

The driving unit or units of the actor 8 for the transmission system 3 can include or constitute one or more electric motors, such as d-c motors (e.g., brushless d-c generator motors), or a-c motors (such as asynchronous (induction) motors or switched reluctance motors or travelling wave motors).

One of the presently preferred automated transmission systems which can be utilized in the power train of FIG. 1 employs an input element in the form of a central gear selecting and shifting shaft which can select a particular gear by performing an axial movement and which can shift into or from a particular gear by carrying out an angular movement, or vice versa. The driving unit(s) of the actor 8 then serves or serve to initiate the required angular and/or axial movements of the central shaft in response to signals from the control unit 7.

Alternatively, the transmission system 3 can be of the type wherein a first input element (e.g., a rotary and/or axially movable shaft) can receive motion from a first driving unit or from a single driving unit to select a particular gear, and a second input element (e.g., a rotary and/or axially movable shaft) can receive motion from a second driving unit or from the aforementioned single driving unit to shift the transmission system into or from a selected gear. The arrangement can be such that each of the two shafts is mounted to perform an angular movement, one to select a desired gear and the other to shift into or from the selected gear.

Still further, a transmission system which is to be used in the power train of FIG. 1 can employ two axially movable rods one of which is to be displaced (e.g., by one of two driving units or by a single driving unit of the actor 8) to select a particular gear, and the other of which is to be displaced (by the other of two driving units or by the single driving unit of the actor 8) to shift into or from a selected gear.

The aforementioned shaft(s) and rods of the transmission systems (3) which can be utilized in the power train of FIG. 1 can constitute internal components of such transmission systems, i.e., they can be installed in the housing or case of the selected transmission system. Alternatively, such shaft(s) and rods can constitute external (accessible) parts which serve to transmit motion to the internal gear selecting and gear shifting elements of the selected transmission system. The shaft(s) and/or rods then constitute output elements of the driving unit(s) forming part of the actor 8. The internal gear selecting and/or shifting elements of the selected transmission system (namely the internal input elements which receive motion from the output element(s) of one or more driving units of the actor 8) can also constitute one or more axially and/or angularly movable shafts, rods or the like.

The reference character 12 denotes a signal transmitting connection between the control unit 7 and the actor 8; such connection can transmit signals from the control unit 7 to the actor 8 and/or in the opposite direction. For example, the conductor 12 can be connected with means for addressing signals stored in the memory or memories of the control unit 7 and for transmitting such signals to the driving unit(s) of the actor 8.

The conductors 13, 14 of FIG. 1 serve to connect (at least temporarily) the control unit 7 and/or the engine electronics 20 and/or the conductor 12 with two or more sensors (not shown). For example, at least one of the conductors 13, 14 can connect the control unit 7 with the electronic circuitry of an antiblock system (ABS) and/or with the electronic circuitry of an antislip system. Additional sensors which transmit (or can transmit) signals to the control unit 7 can include means for monitoring the condition of the motor vehicle and/or of certain specific constituents other than or including those already enumerated hereinbefore. Thus, the control unit 7 can receive signals denoting (or permitting the calculation of) the speed of the motor vehicle, the RPM of the engine 1, the RPM of the wheels 6, the position of the flap (valving element) of the throttle valve, the position of the gas pedal and/or others.

The conductor 15 of FIG. 1 can serve to connect the control unit 7 with a data bus, such as a CAN-bus which can supply system data pertaining to the motor vehicle and/or to specific electronic circuits of the vehicle. As a rule, the various electronic circuits are connected to each other by suitable computer units.

An automated transmission system 3 (i.e., a system which is connected with a control unit (7) by operating means including actuating means (8) arranged to operate between the element(s) of the driving unit(s) of the actuating means and one or more input elements of the transmission system) can be assembled and operated in such a way that it can be shifted into or from a selected gear in response to an initiative from the operator of the motor vehicle. FIG. 1 shows a gear selecting and shifting lever or rod 40 which can be pivoted and/or otherwise moved to any one of several positions denoting a selected gear. Furthermore, the control unit 7 can receive signals denoting an intention by the operator of the vehicle to shift the transmission system 3 into a different gear; e.g., such intention can be recognized by monitoring the direction and/or the magnitude of the force being applied to the combined selecting and shifting member 40. Still further, it is possible to employ an electronic shifting and/or selecting member for the transmission (to the control unit 7) of signals denoting the gear which is about to be selected and shifted into or which is intended to be selected by the operator of the motor vehicle.

Still further, the transmission system 3 can be automated in such a way that a particular gear is selected in dependency upon various operating parameters, i.e., at least the selection of a particular gear can be fully automatic. For example, a fully automated transmission system can be operated in response to parameters, characteristic curves or characteristic fields, or on the basis of sensor-supplied signals during certain predetermined stages of operation of the motor vehicle, all without any participation by the operator of the motor vehicle.

The gear selecting/shifting member 40 can be caused to select the neutral gear (N) in which the driving unit(s) of the actor 8 is(are) disconnected from the input element(s) of the transmission system 3. The character p denotes the parking position of the member 40, i.e., a position in which the power train is set to block any movements of the vehicle. If desired, the parking position P can be selected automatically, e.g., when the ignition key 51 is withdrawn from the keyhole of the schematically represented ingnition or starting system 50 for the engine 1 and the condition of the vehicle allows such immobilization. For example, the connection between the member 40 and the ignition system 5D can be selected in such a way that it is ineffective (i.e., the member 40 cannot be moved to the position P) when the vehicle is in motion, particularly at an elevated speed.

The positions of the member 40 which is shown in FIG. 1 include the aforementioned positions P and N, a position D in which the control unit 7 can automatically select and shift the transmission system 3 into or from a particular gear via actor 8, and several additional positions in which the operator of the vehicle has manually selected a reverse gear (R) and any one of several forward gears (e.g., 1 to 5).

FIG. 1 further shows a gas pedal 23 which cooperates with a sensor 24 (e.g., an electronic sensor) connected to the engine electronics 20 by a conductor 25 to transmit signals denoting the momentary position (angle or extent of depression) of the pedal 23. Signals from the sensor 24 can be processed by the engine electronics 20 to select, for example, the rate of fuel admission to the cylinders of the engine 1, the timing of fuel ignition, the duration of fuel injection periods and/or the position of the valving element (flap) of the throttle valve. The signal transmitting connection from the engine electronics 20 to the engine 1 comprises conductor means 21.

The aforementioned conductor 22 connects the engine electronics 20 with the ignition system 50 and with the control unit 7. The conduits 15, 22 further serve to connect the control unit 7 and the engine electronics 20 with the control electronics 30 for the transmission system 3.

The engine electronics 20 can be designed to control the position of the valving element (flap) of the throttle valve (shown in FIG. 1 but not referenced) of the engine 1. In such vehicles, the power train can operate without a direct mechanical connection to the gas pedal 23, i.e., the latter can be actuated electrically; in fact, a direct mechanical connection for actuation of the gas pedal might be undesirable.

The exact construction and mode of operation of the ignition or starter system 50 and its key 51 form no part of the present invention.

Figure 2:
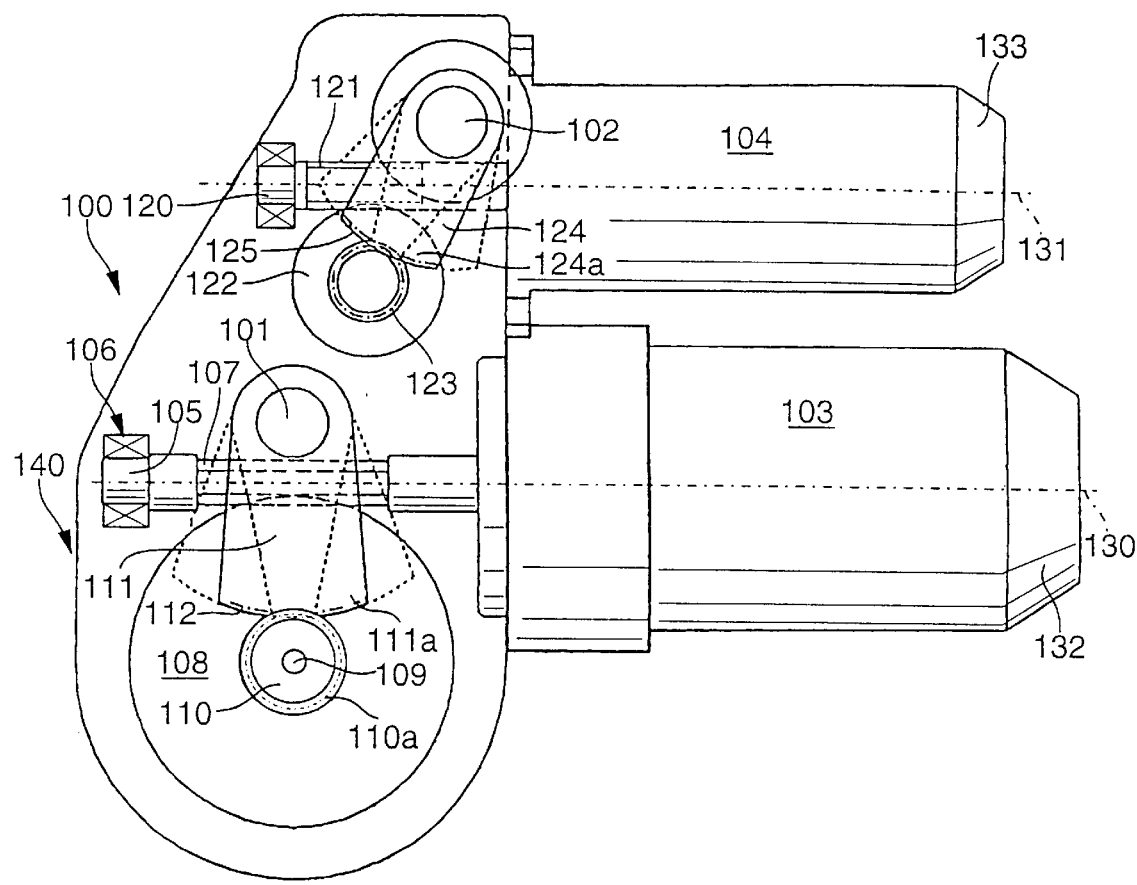
FIG. 2 is a schematic view of actuating means for an automated transmission system which can be utilized in the improved power train and comprises two parallel rotary input elements, one for the selection of a particular gear and the other for shifting into and from the selected gear.

FIG. 2 is a schematic partly elevational and partly sectional view of an actor 100 which receives signals from and transmits signals to a control unit (such as the control unit 7 of FIG. 1) and is designed to select the gears and to shift into and from selected gears of an automated transmission system (such as the transmission system 3 of FIG. 1). The transmission system which is operated or actuated by the actor 100 of FIG. 2 is of the type having a first input element (e.g., a shaft) which must perform a movement to select a particular gear and a second input element (e.g., a shaft) which must perform a movement to shift into or from a selected gear.

A first output shaft 101 of the actor 100 is arranged to transmit motion to the shifting input element of the transmission system, and a second output shaft 102 of the actor 100 serves to transmit motion to the gear selecting input element of the transmission system which is operated by the actor 100. The arrangement is such that each of the shafts 101, 102 must be caused to perform an angular (rather than axial) movement in order to displace the corresponding input element of the transmission system. The means for rotating the shaft 101 through required angles includes a driving unit 103 (such as an electric motor receiving signals from the control unit) and one or more transmissions (hereinafter called gearings to distinguish from the transmission system). The means for rotating the shaft 102 comprises a driving unit 104 (e.g., an electric motor) and one or more gearings between the unit 104 and the respective input element of the transmission system.

Figure 2A:
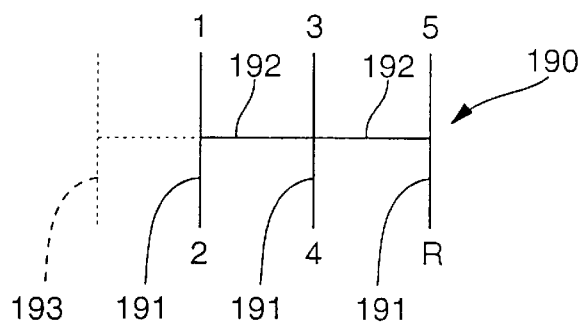
FIG. 2a is a diagrammatic view of the gate of a transmission system which can be utilized in the improved power train.

FIG. 2a shows a gear shifting gate 190 with gear shifting paths or tracks 191 and a gear selecting path or track 192. In order to select a particular gear of the transmission system embodying the gate 190, a member (such as the lever 40 shown in FIG. 1) must be moved along the path 192 into register with a selected shifting path 191, and such member is thereupon moved from the path 192 into the sleected path 191 in order to shift the transmission system into the selected gear. FIG. 2a shows a reverse gear R and five forward gears 1 to 5. The reverse gear R can be transposed to the position 193 which is indicated by a dotted line; the rightmost gate 191 then serves solely to shift from the selecting gate 192 into and from the forward gear No. 5.

It is clear that the transmission system employing the gate 190 of FIG. 2a is but one of numerous transmission systems which can be associated with the actor 100 of FIG. 2 for use in the improved power train such as the power train of FIG. 1. For example, the number of forward gears can be reduced to less than five (e.g., to four) or increased to more than five (e.g., to six). Furthermore, the distribution of tracks or paths for the forward gears and the reverse gear can depart from that which is shown in FIG. 2a.

Referring again to FIG. 2, the driving units 103, 104 for the respective input shafts 102, 101 of the transmission system which is operated by the actor 100 have output shafts 105, 120, respectively. The driving units 103, 104 can constitute electric motors, e.g., d-c motors, a-c motors, travelling wave motors or others.

The output shaft 105 of the driving unit 103 is journalled in a suitable bearing 106 and carries or is of one piece with a worm 107 which mates with a worm wheel 108 on a shaft 109. The worm wheel 108 is coaxial with and is affixed to or of one piece with a gear 110 (e.g., a spur gear) which has teeth 110a meshing with the teeth 112 of a gear segment 111a forming part of a lever or arm 111 affixed to and arranged to turn the shaft 101 to an extent and in a direction determined by the signals transmitted to the driving unit 103 by the control unit (such as the control unit 7 in the power train of FIG. 1). It will be seen that the motion transmitting connection between the output shaft 105 of the driving unit 103 and the input element 101 of the transmission system associated with the actor 100 includes a composite gearing including a bevel gearing 107–108 and a spur gearing 110–111a.

The worm gear 108 and the spur gear 110 can be rotatably mounted on the shaft 109. The spur gear 108 can be replaced with a bevel gear and the configuration of teeth (112) on the gear segment 111a of the lever 111 is then changed accordingly. The non-rotatable connection between the lever 111 and the shaft 101 can be established by providing one of these parts with an annulus of teeth extending into tooth spaces defined by the other of these parts. It is also possible to make the lever 111 of one piece with the shaft 101 or to provide a welded or other suitable permanent connection between them.

The composite gearing 107–108, 110–111a can turn the shaft 101 in a clockwise or in a counterclockwise direction if the driving unit 103 is reversible. This can cause the shaft 101 to shift the transmission system into or from a selected gear.

The output shaft 120 of the driving unit 104 is journalled in a suitable bearing and is rigid and coaxial with a worm 121 mating with a worm wheel 122 which is rotatably mounted on a shaft parallel to the shaft 109. The worm wheel 122 is coaxial and rigid with a spur gear or bevel gear 123 having teeth meshing with the teeth 125 of a gear segment 124a forming part of a lever 124 which is non-rotatably secured to the input shaft 102 of the transmission system. The shaft 102 can be turned to select a desired gear of the transmission system which is associated with the actor 100 and further comprises the gear shifting output element or shaft 101.

The axis 130 of the output shaft 105 is at least substantially parallel to the axis 131 of the output shaft 120. The same applies for the elongated housings or casings 132, 133 of the respective driving units 103, 104. However, it is equally possible to design the actor 100 in such a way that the axes 130, 131 make a right angle or an oblique angle, i.e., an angle other than zero. For example, the axes 130, 131 can make an angle of between 30° and 150°, preferably an angle at least close to 90°.

The axes 130, 131 of the output shafts 105, 120 of the driving units 103, 104 can but need not be located in a common plane. For example, the axes 130, 131 can be located in two separate planes which are parallel to the plane of FIG. 2, or such axes can be located in two discrete planes which make an oblique angle or a right angle. In other words, the worm wheels 108, 122 may but need not be coplanar.

In accordance with a further feature of the invention, at least a portion of the control electronics and/or power electronics can be confined in the actor 100. However, it is equally possible to provide a first housing for the actor 100 and a discrete second housing for the control electronics and/or power electronics.

The housing 140 of the actor 100 can be provided with a flange which is secured to the case of the transmission system including the input shafts 101, 102. Alternatively, the housing 140 can be secured to the transmission case by a set of screws, bolts or other threaded or unthreaded fasteners.

The transmission system including the input elements 101, 102 can be a conventional gearbox with interruption of tensile force or traction force. The actor 100 can constitute an add-on assembly which is attached to the transmission case in lieu of or in addition to a manually operable gear selecting and shifting assembly to thus ensure that the transmission system can be operated automatically in response to signals from a control unit (such as the control unit 7 of FIG. 1).

The housing 140 of the actor 100 carries the housings or casings 132, 133 of the driving units (electric motors) 103 and 104. This housing 140 has suitable openings for the output shafts 105, 120, and the two composite gearings 107–108, 110–111a and 121–122, 123–124a are or can be confined in the housing 140. Still further, the housing 140 is provided with suitable openings (e.g., in the form of bores, holes or windows) for portions of the input elements 101, 102 of the transmission system which is associated with the actor 100.

Alternatively, the actor 100 can be modified or replaced by an actor which is constructed and assembled in such a way that it comprises two output elements extending from the actor housing (such as 140) and into the case of a transmission system to transmit motion to the corresponding input elements (such as 101, 102) of the transmission system. The connections between such output elements and the respective input elements of the transmission system can constitute or include form-locking, friction-locking and/or other suitable connections.

FIGS. 3–3a, 4–4a and 5–5d illustrate various forms of a first embodiment of an emergency facility which can be put to use in the event of a malfunctioning or a total breakdown of an automated transmission system (such as 3) and/or an automated torque transmitting system (such as the friction clutch 2). For example, a malfunctioning can involve an interruption of the supply of electrical energy to the control unit (such as 7) or a defectiveness of a source (such as a car battery or a generator) of electrical energy so that the current-consuming elements of the control unit and/or of the means for transmitting signals to the control unit and/or other current consuming elements can no longer perform their intended functions and the actor or actors are no longer capable of operating the respective automated system or systems. For example, the battery of a motor vehicle can become exhausted while the vehicle is parked on a downwardly or upwardly sloping surface in a narrow garage. The corrective undertaking(s) can be carried out manually or by power-operated means.

The following are certain situations which warrant resort to emergency undertakings to enable the affected motor vehicle to move again under its own power or by resorting to a towing vehicle. The emergency undertakings can be performed manually by carrying out certain measures which alter the condition of the power train employing a defective or totally disabled automated torque transmitting system and/or a defective or totally disabled automated transmission system. The undertakings can involve the use of mechanical accessories or implements which, depending upon the nature and/or severity of the defect, involve (a) changing the condition of the automated torque transmitting system (such as a friction clutch) from a fully or partially engaged to a disengaged condition, and/or (b) changing the condition of the automated torque transmitting system from disengaged to partly or fully engaged condition, and/or (c) shifting the automated transmission system out of a gear, and/or (d) shifting the automated transmission system into a particular gear.

In many instances, at least one of the above-enumerated undertakings (a) to (d) can be carried out in a surprisingly simple manner, e.g., by the expedient of establishing or terminating a mechanical connection in or for an automated transmission system and/or an automated friction clutch, multiple-disc clutch, torque converter with a lockup clutch or another automated torque transmitting system.

It can also happen that two actors (such as 8 and 11) or two operating arrangements each-including an actor become defective or totally disabled at the same time. For example, such situation can develop in the event of a failure of the electrical system or lack of adequate electrical energy for the motor vehicle or for the automated transmission. A typical example of such undesirable situation is an exhaustion or breakdown of the car battery while the motor vehicle is at a standstill and the transmission system is shifted into parking gear (P). A similar situation can develop as a result of damages imparted to electric cables by certain animals (e.g., martens) which seek heat under the hood of a parked motor vehicle and gnaw at the insulating sheaths of electric cables. Other emergency situations can develop as a result of defectiveness of the control unit (7) and/or as a result of defectiveness of the actor(s), e.g., of one or more electric motors (such as 103, 104) of an actor (such as 100).

Still further, failure of a single sensor or of two or more sensors which transmits or transmit signals to the control unit (or to the control unit as well as to one or more signal processing or displaying or utilizing circuits or the like) can necessitate an emergency undertaking. The same holds true for the failure of a data bus (e.g., a CAN-bus), i.e., such failure or failures can also necessitate resort to one or more emergency undertakings which can result is an elimination of the defect(s), a partial elimination of the defect(s) and/or the establishment of a situation which renders it possible to operate the motor vehicle in a very narrowly defined manner or, at the very least, to allow for the advancement of the motor vehicle to a particular location (such as off a road), to an authorized and/or safe parking area, to a garage in the home of the owner of the affected motor vehicle, or to a repair shop.

The following are several examples of the failure of various signal generating components which might warrant or which necessitate resort to an emergency undertaking in accordance with the instant invention:

Failure of a signal denoting the actuation or completion of actuation of a brake;

failure of a sensor which is provided to generate signals denoting the actuation of an automated transmission system or the gear which has been selected by the transmission system; and/or failure of a sensor which is designed to generate signals denoting the actuation and/or the condition of an automated torque transmitting system (such as the friction clutch 2 in the power train of FIG. 1).

In the event of the failure of means for generating CAN signals or of the failure of a CAN-bus, the control unit no longer receives signals indicative of the engine torque, the engine RPM and/or ABS signals (such as the RPM of the wheels). Under such circumstances, the clutch can be engaged by a time-dependent ramp or function while the transmission system is in gear. Furthermore, the clutch can be disengaged as a function of time, for example, in response to the actuation of a brake.

In the event of a failure of a position sensor which indicates actuation of the clutch and/or of the transmission system, temporary supplying of electrical energy to a motor or a temporary actuation of a driving unit can be resorted to for the ascertainment of the position normally denoted by the defective sensor by resorting to a model. Such model takes into consideration typical positions, speeds and/or accelerations as well as forces which develop in the course of an actuation; this enables the model to ascertain the actual position (normally denoted by signals from the defective position detector or sensor) on the basis of at least some of the thus obtained data. Certain positions can be calculated or estimated by resorting to switches and/or other types of digital sensors.

The following are some of the situations which can cause, for example, failures of one or more actors, such as the actor 8 or 11 or the actors 8, 11 in the power train of FIG. 1:

(1) The vehicle comes to a halt, for example, as a result of defective battery, while the transmission system is in gear and the clutch is disengaged; the defective battery causes a complete breakdown of the actor(s) so that the vehicle cannot be moved under its own power or by a towing vehicle.

(2) The actor (such as 11) for the automated torque transmitting system (such as 2) becomes defective while the torque transmitting system is engaged but the actor (8) for the transmission system (3) is operative and the motor vehicle is located on an (upwardly or downwardly) sloping road surface; this, too, prevents any movements of the affected vehicle.

In accordance with one feature of the invention, the vehicle is equipped with means for manually disengaging the torque transmitting system (clutch) by manually influencing the input element(s) such as the bearing 10 and/or the element 9 in the clutch 2 of FIG. 1. Once the clutch is disengaged, the vehicle can be set in motion, for example, by pushing or pulling it to a selected destination. All that is necessary is to shift the transmission system into neutral gear (N). Manual disengagement of the clutch can be effected by directly influencing the input element or elements (9, 10) of the clutch or by moving the output element (s) of the actor (11) which is associated with the clutch, (3) The actor (11) for the clutch (2) can become defective while the clutch is maintained in the disengaged condition. Under such circumstances, the motor vehicle can be towed away; however, it cannot be advanced under its own power.

In accordance with the instant invention, the power train can be provided with means for manually engaging the clutch so that the engine of the affected vehicle can be used to advance the vehicle to a selected destination. Such manual engagement can involve an at least partial engagement of the clutch by means which influence (displace) the input element or elements (9, 10) of the clutch.

(4) The actor (8) for the transmission system (3) can become defective while the actor (11) for the clutch is operative. The defect of the actor (8) for the transmission system can develop while the transmission system is in neutral gear or in any other gear, e.g., only a gear (such as reverse) which is not suitable for the (forward) advancement of the vehicle under its own power. However, the vehicle can be towed away as soon as the clutch is disengaged. Moreover, and in accordance with a further feature of the invention, manual influencing of one or more mechanical parts of the transmission system and/or of the actor for the transmission system can shift the transmission system into a gear (e.g., a forward gear) which renders it possible to start the engine and drive the vehicle (forwardly) to a selected destination.

If the power train of a motor vehicle comprises an automated transmission system which can shift into a selected gear only automatically (by the corresponding actor) or at the initiative of the operator of the vehicle, partial or total failure of the actor for the transmission system can entail that the transmission of power by the power train cannot be interrupted on purpose. Such situation can develop, for example, when certain parts of the actor for the automated transmission system become defective or totally disabled, when at least one of these parts reacts (functions) in an unexpected (undesirable) manner, and/or when the sensor or sensors which monitor the actor for the transmission system transmit misleading (inaccurate) signals concerning the condition and/or mode of operation of such actor. As already mentioned above, the monitoring means of the power train can include numerous sensors which monitor the operation of the actor or actors and/or the operation of an automated system and transmit signals to the control unit (7) or to the control unit as well as to one or more other signal receiving and/or processing arrangements (such as the engine electronics 20 and/or the transmission electronics 30).

In order to ensure that a motor vehicle wherein one or more constituents of the power train (particularly the actor or actors and/or the system(s) operated by such actor or actors) become defective, either in part or completely, it is now provided that the transmission of power by the power train be interrupted or rendered possible, depending upon the nature of the defect. Thus, it is now proposed and made possible to undertake certain emergency measures or steps which render it possible to set the affected motor vehicle in motion with resort to its own prime mover or by utilizing another vehicle (such as a towing truck). For example, an emergency undertaking can involve shifting the transmission system into a low (such as first or second) forward gear or into reverse gear to thus enable the affected vehicle (with or without assistance from a second vehicle) to reach a selected destination, e.g., a repair shop.

FIGS. 3, 3a, 4 and 4a illustrate the details of a separable and (at least under certain circumstances) reestablishable or reengageable connection which is provided between an actor (300) having a sleeve-like output element 302 and an automated transmission system having an input element 301 coaxial with the output element 302. The input element 301 can constitute a central gear shifting shaft or a rod or any other suitable part which can effect the selection of a particular gear and/or the shifting into and from the selected gear.

The input shaft 301 of the automated transmission system is exactly or at least substantially coaxial with the output element 302 of the actor 300. The output element 302 can be moved by the driving unit or by one driving unit (not shown) of the actor 300 to move the input element 301 axially or angularly, depending upon the design of the automated transmission system. The elements 301, 302 can extend from the case 303 of the transmission system and/or from the housing of the actor 300 so that such parts or elements are accessible when needed, namely to afford access to a separable form-locking connection which is constructed, assembled and installed between the parts 301, 302 in such a way that it can transmit (to the input element 301) axial as well as angular movements. When the actor 300 and the transmission system including the case 303 operate properly, the parts or elements 301, 302 are fixedly secured to each other.

If the actor 300 becomes defective, the connection between the parts 301, 302 is interrupted so that the transmission system can be shifted into and that it can thereupon remain in a selected gear. The separable form-locking connection comprises a locking element in the form of a bolt 304 and a spring-biased retaining member 305 which normally cooperates with the bolt 304 to transmit motion between the parts or elements 301, 302. The bolt 304 can be pulled (see FIG. 5 and 5a) to thereby extract the retaining member 305 from its bore or hole 306 in the input element 301 (FIG. 5a). The directions of movement of the bolt 304 to and from its operative position are indicated by a double-headed arrow 307.

By rotating the knurled head 308 of the bolt 304, the latter can be locked in the separated condition of the connection 304, 305. The direction of rotary movement of the bolt 304 to its locked position is indicated by an arrow 309 (FIG. 5c); the input element 301 is then separated from the output element 302 and the position of the thus separated input element 301 can be changed by a manually operable implement or tool 330 (FIG. 4) or 331 (FIG. 4a) in order to shift the transmission system including the input element 301 into a selected gear.

The elements or parts 301; 302 can be separated from each other when the actor 300 is self-locking as far as the transmission of force and torque to the transmission system including the case 303 is concerned. This is advisable and advantageous on several grounds, for example, to achieve savings in energy and to reduce the generation of heat during manual adjustment of the transmission system as well as to ensure that, under certain circumstances, the transmission system does not shift into a different gear except when so desired or initiated by the person or persons in charge.

Figure 5:
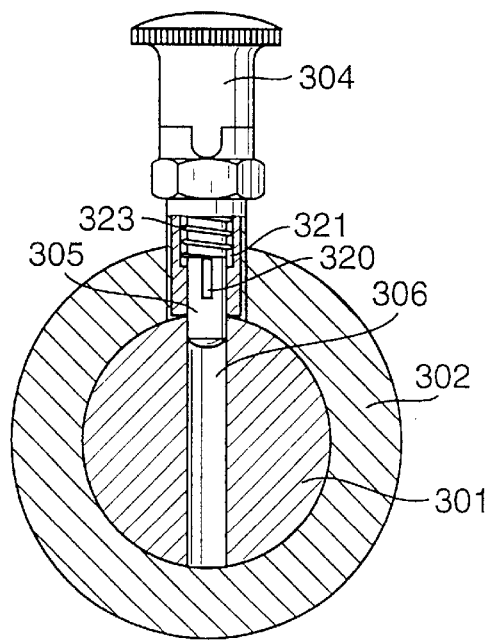
FIG. 5 is an enlarged partly central sectional view of the separable connection which is shown in FIG. 3.
Figure 5A:
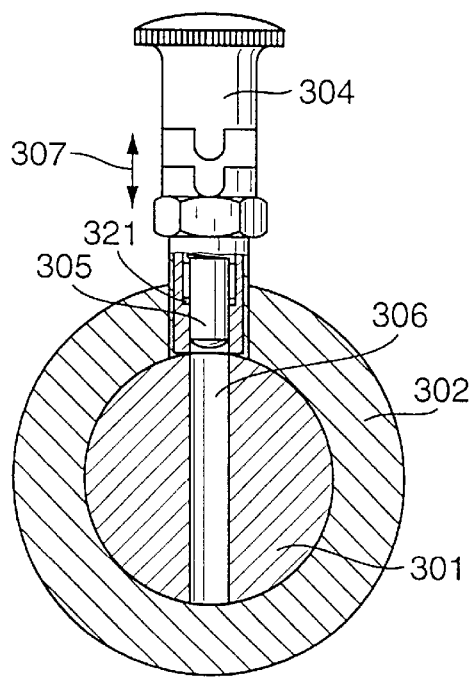
FIG. 5a illustrates the structure of FIG. 5 but with the connection deactivated (separated) so that the input element of the automated transmission system can be moved relative to, rather than with, the output element of the actuating means.

As can be seen in FIG. 5, the bolt 304 has profiled portions or flanks 320. When the head 308 of the bolt 304 is held in the position of FIG. 5, the flanks 320 are received in complementary sockets or recesses 321 of the retaining member 305 so that the latter is held in the bore 306 and the elements 301, 302 are properly connected to each other. At least one energy storing element 323 (e.g., a coil spring shown in FIGS. 5 and 5a) is provided to bias the retaining member 305 into the bore 306.

Figure 3:
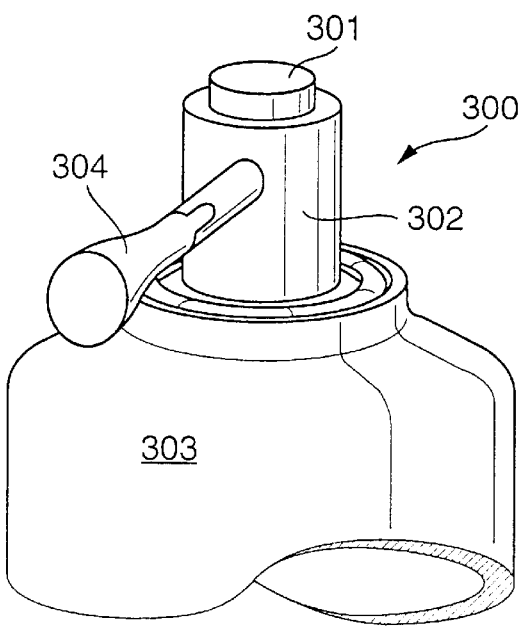
FIG. 3 is a fragmentary perspective view of an actuating means, of an input element of an automated transmission system normally receiving motion from a rotary output element of the actuating means, and of one embodiment of a separable connection between the output element of the actuating means and the input element of the transmission system.
Figure 3A:
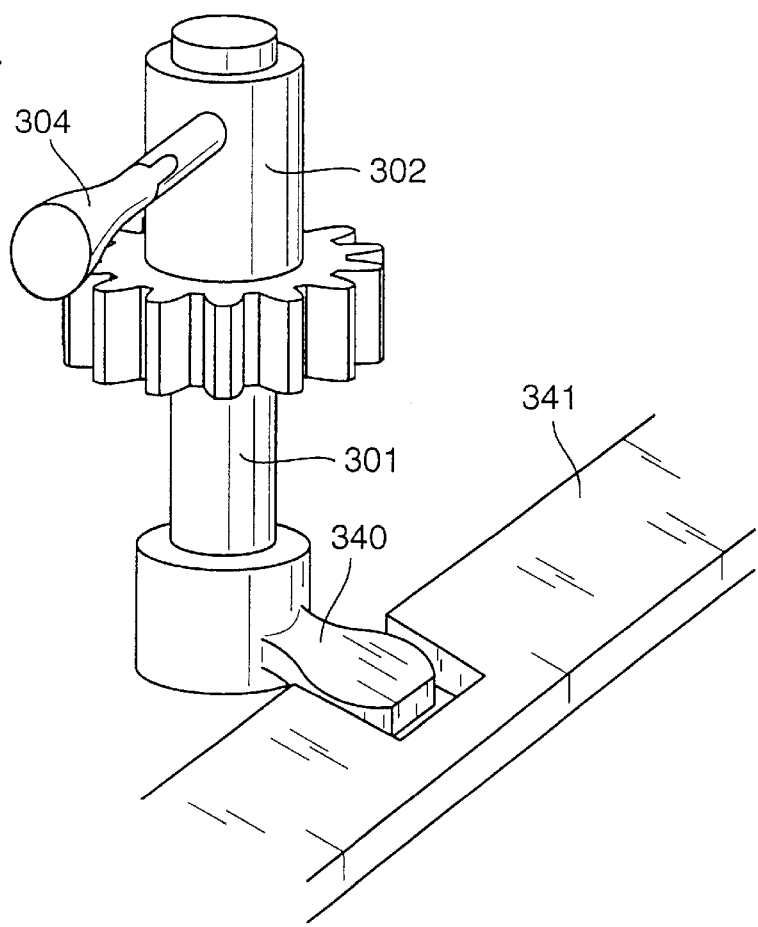
FIG. 3a illustrates the structure of FIG. 3 but with the case of the transmission system omitted.
Figure 5B:
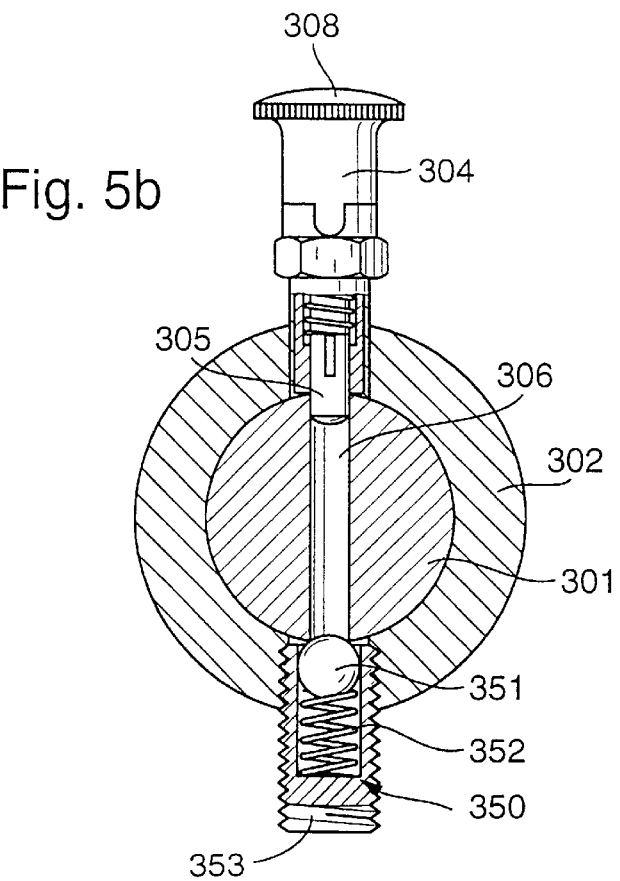
FIG. 5b illustrates the structure of FIG. 5 plus a second separable connection between the output element of the actuating means and the input element of the automated transmission system.
Figure 5C:
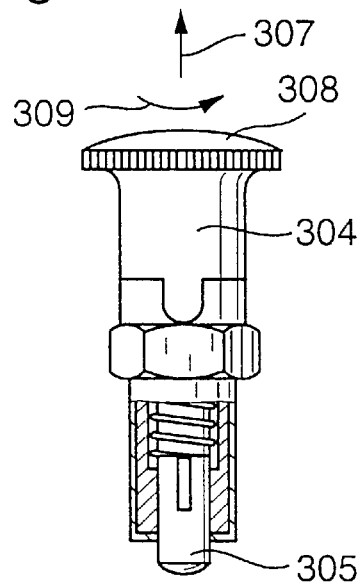
FIG. 5c shows the connection of FIG. 5 prior to mounting between the input element of an automated system and the output element of the actuating means for such automated system.
Figure 5D:
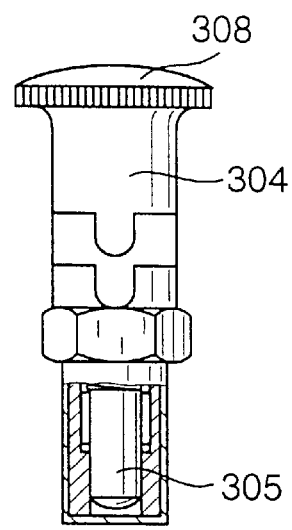
FIG. 5d shows the connection of FIG. 5c but with the parts of the connection in different positions relative to each other.

If the head 308 of the bolt 304 is turned (see FIG. 5a), the flanges 320 no longer extend into the groove or grooves 321 so that the retaining member 305 cannot enter the bore 306 and the connection between the elements or parts 301, 302 is interrupted. Reference may also be had to FIGS. 5b, 5c and 5d. As already mentioned above, and as shown in FIGS. 4 and 4a, the input element 301 is then engageable by an implement 330 or 331 for the purpose of changing its angular position with the result that the transmission system including the case 303 is manually shifted into a selected gear. As can be seen in FIG. 3a, the input element 301 is provided with a radially extending arm 340 projecting into a recess of a reciprocable rail 341 in the transmission case 303. The rail 341 can shift the transmission system into a selected gear in response to turning of the input element 301 by the implement 330 or 331 or by another suitable (manually operated or motorized) implement.

The rail 341 may but need not directly shift the transmission system into a selected gear. For example, the case 303 can contain a sleeve or muff (not shown) which receives motion from the rail 341 and serves as a means for actually shifting the transmission system into or from a selected gear. The motion transmitting connection between the rail 341 and the just discussed sleeve or muff can constitute a form-locking, a frictional and/or any other suitable connection.

At least one of the implements 330, 331 can constitute a tool which is normally kept in the trunk or elsewhere in a motor vehicle, such as a passenger car, a van or a truck. For example, the implement 330 can constitute a tool which is used to exchange a wheel having a flat tire with an operative wheel. Alternatively, one of the implements 330, 331 can constitute a tool which is used to mount or remove a spark plug.

FIG. 4 shows a profiled (e.g., hexagonal) head 332 which is provided on or is connectable with the input element 301 and can be received in a complementary socket of the implement 330.

FIG. 4a shows that the accessible end of the input element 301 can be provided with a diametrically extending slot 333 for a complementary projection or blade of the respective implement 331.

Many other types of form-locking or other separable connections between the input element 301 and a manually operable or a motor-driven implement (corresponding to the implement 330 or 331) can be utilized with equal or similar advantage.

By way of example, the input element 301 can be moved to an angular position in which the automated transmission system including the parts 301, 303 is in neutral gear. This ensures that the transmission system (in neutral gear) cannot transmit any forces, i.e., that the power train embodying such transmission system cannot transmit any power.

However, it is equally possible to cause the implement 330 or 331 or another suitable implement to shift the transmission system into a gear other than neutral, e.g., into the first or second forward gear (of a total of, for example, four, five or six forward gears). This renders it possible to set the vehicle in motion even if the transmission system cannot be shifted into any other gear (except by again resorting to an implement of the type shown in FIG. 4 or 4a or an analogous implement) as long as the clutch is at least partially engaged. For example, the motor vehicle can be started and brought to a halt by starting or arresting the prime mover. Thus, if the clutch operates satisfactorily but the transmission system must be shifted into a desired gear in a manner as described, for example, with reference to FIG. 4 or 4a, the motor vehicle can reach a selected destination under its own power.

FIG. 5b shows that, if desired, the input element 301 of the automated transmission system and the output element 302 of the actor 300 can be separably coupled to each other by the aforementioned connection 304, 305 and/or by a second connection including a spherical member 351 which is installed in a sleeve-like housing 353 mounted in or on the output element 302 and containing a resilient element (e.g., a coil spring) 352 which biases the spherical member 351 into a socket of the input element 301, such as the adjacent end of the diametrically extending bore 306 for the retaining member 305. A pushbutton 350 is threaded into the tapped bore or hole of the sleeve-like housing 353 to stress the energy storing element 352 in order to establish a motion transmitting connection between the elements or parts 301, 302. If this connection is to be rendered inoperative, the pushbuttom 350 is removed or retracted, the energy storing element 352 is permitted to dissipate energy, and the spherical member 351 permits rotation of the elements or parts 301, 302 relative to each other, for example, by resorting to any available tool which can engage the sleeve-like housing 353 to turn the input element 301 relative to the output element 302 until the transmission system including the input element 301 is shifted into a selected gear.

The connection including the spherical member 351 can be designed to permit shifting of the transmission system into a selected gear without changing the axial position of the pushbutton 350. All that is necessary is to engage the sleeve-like housing 353 in order to apply to the input element 301 a torque which suffices to expel the spherical element 351 from the adjacent end of the bore 306 so that the input element 301 can turn relative to the element 302. The resistance which the detent including the sphere 351 offers to rotation of the input element 301 relative to the output element 302 depends on the selected bias of the energy storing element 352.

The structure including the parts 350 to 353 of FIG. 5b can perform the additional function (or the sole function) of ensuring that the connection 304, 305 holds the elements or parts 301, 302 against undesired or untimely angular movements relative to each other without any or without any appreciable play. Such connection without any play is desirable and advantageous because it guarantees the accuracy of signals generated by one or more sensors which monitor the position(s) of one or more component parts of the actor 300 and/or of the automated transmission system including the case 303 and the input element 301. Signals generated by the just discussed sensor or sensors are truly representative of the positions and/or other conditions and/or parameters of the monitored parts.

The sphere 351 can be replaced with a cone or another suitable detent which connects the elements or parts 301, 302 to each other with a force which is a function of the bias of the energy storing element 352 and/or another suitable spring, and which permits (when necessary) the input element 301 to turn relative to the output element 302 in order to shift the transmission system including the case 303 into a selected gear, either manually or by resorting to a suitable power-operated tool.

Of course, if an actor is arranged to transmit motion to several input elements of an automated transmission system or an automated torque transmitting system (reference may be had again to the input shafts 101, 102 of the automated transmission system which is operated by the actor 100 of FIG. 2), each such input element can be separably coupled to the respective output element of the associated actor by at least one connection, e.g., by two connections of the type shown in FIG. 5b.

It is further possible to separably couple the input element of an automated transmission system or an automated torque transmitting system with an output element of an actor by one or more removable bolts, screws or other suitable threaded fasteners, by a sliding bolt, by a catch or by any other suitable mechanical part which permits rapid separation of normally coupled input and output elements in the event of an emergency such as a malfunctioning or a total breakdown of an actor, a transmission system or a torque transmitting system.

Figure 5E:
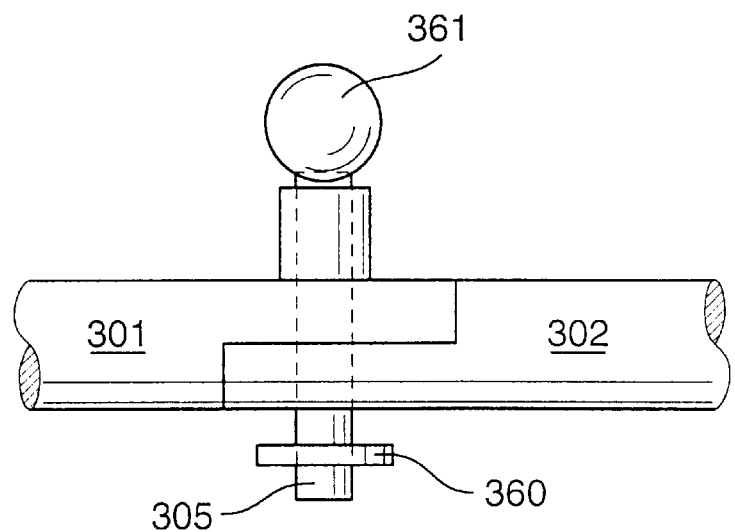
FIG. 5e is a somewhat schematic elevational view of a third separable connection between the input element of an automated system and the output element of actuating means for such automated system.

Referring to FIG. 5e, there is shown a further separable connection between an output element 302 of an actor and an input element 301 of an automated system, e.g., a transmission system. The elements or parts 301, 302 are provided with axially parallel surfaces which are (but need not be) flat or substantially flat, which abut each other and which are normally held against movement relative to each other by one or more coupling elements, e.g., by a diametrically extending (preferably spring-biased) bolt or stud or screw 305 having an extraction-facilitating head 361 and being held against unintentional separaton from the elements or parts 301, 302 by a cotter pin 360, another pin or any other suitable locking or retaining part.

Figure 6A:
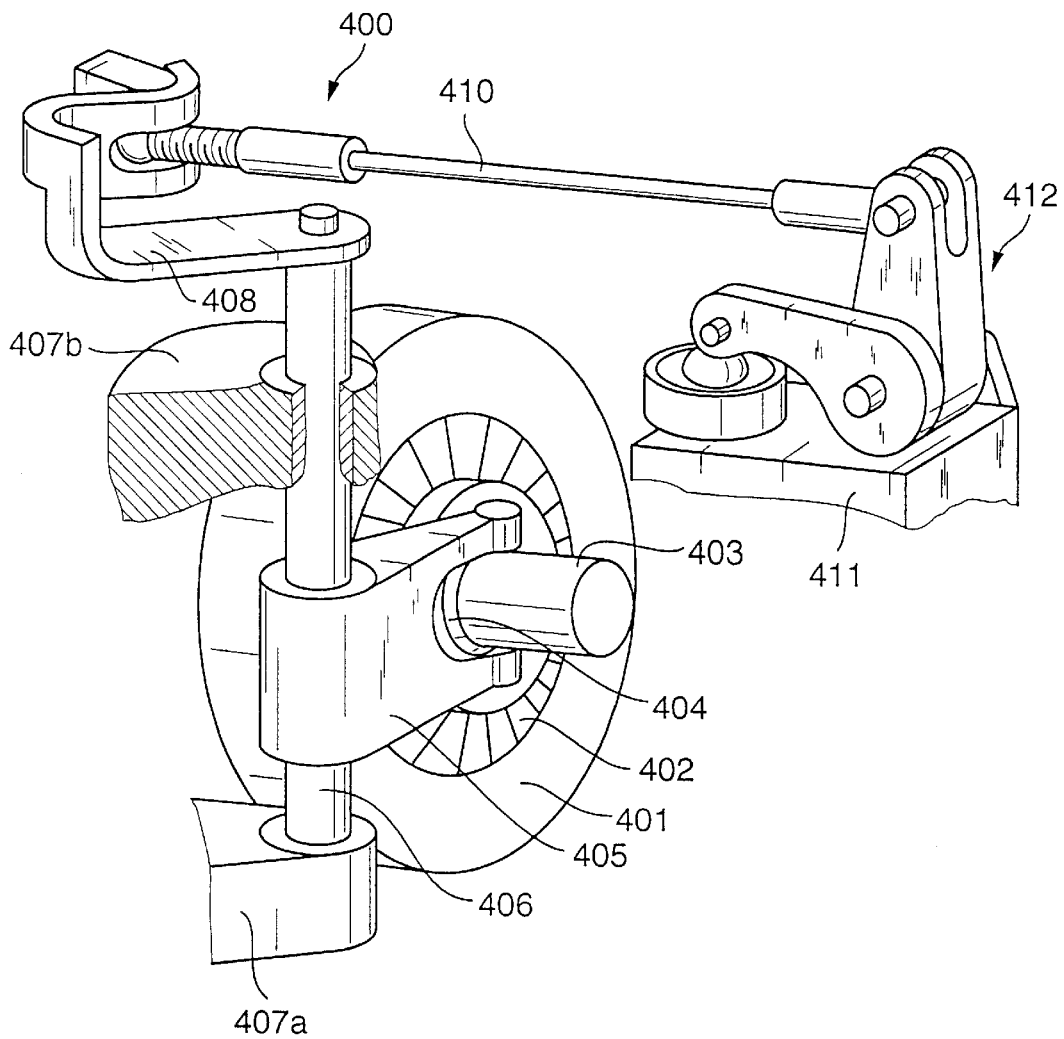
FIG. 6a is a fragmentary perspective partly sectional view of a separable and adjustable connection between the output element of an actor and the condition-changing (such as disengaging) element of an automated friction clutch.
Figure 6B:
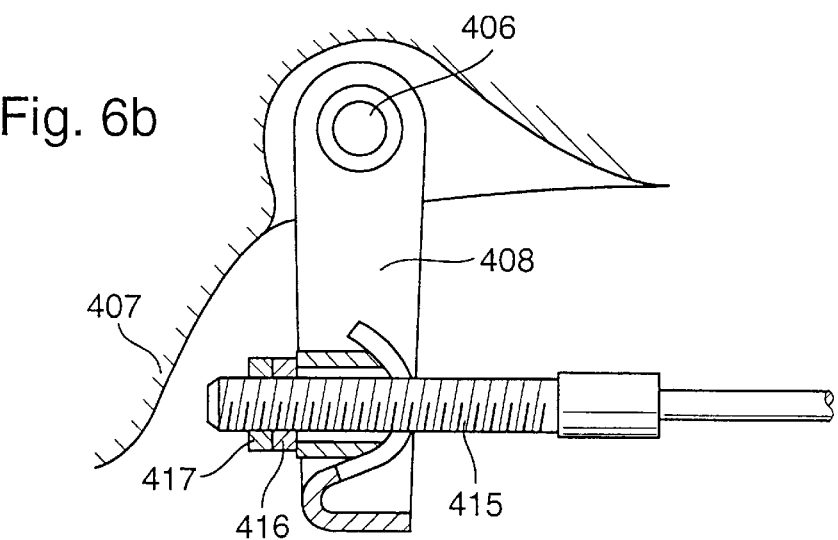

FIGS. 6a and 6b show a preferably separable connection between an automated friction clutch 401 and an actor 411 in a power train 400. The clutch 401 can be of the type shown in FIG. 1; FIG. 6a merely shows a diaphragm spring 402, a disengaging bearing 404 which can act upon the radially inner end portions or tips of the radially inwardly extending prongs of the diaphragm spring 402, and a pivotable input member (disengaging fork) 405 on a shaft 406 journalled in axially spaced-apart bearings 407a, 407b. The improved connection can establish a mechanical or hydromechanical or partly mechanical and partly pneumatic link between a pivotable output element 412 of the actor 411 and the shaft 406 for the fork 405, and such conection includes an elongated rod or bar 410 connecting the output element 412 of the actor 411 with a lever 408 at one end of the shaft 406, e.g., in a manner shown in FIG. 6b, namely by an elongated externally threaded bolt 415 mating with a nut 416 which is releasably secured in a selected axial position by a lock nut 417. The lever 408 and the bolt 415 can pivot relative to each other.

By selecting the effective length of the bolt 415 (i.e., of the rod or bar 410), the manufacturer of the motor vehicle embodying the power train 400 can ensure that, when the actor 411 is defective or idle (i.e., when the output element 412 of this actor is held in a predetermined position), the connection 410, 415, 416, 417, 408, 406 automatically maintains the clutch 401 in a desired (disengaged, partly engaged or fully engaged) condition. Such condition can be changed by the simple expedient of manipulating the nuts 616, 417, i.e., by changing the distance between the output element 412 of the actor 411 and the lever 408 on the shaft 406.

The rigid rod or bar 410 can be replaced with a Bowden wire, with one or more cables, with a fluid-operated device (e.g., a single-acting or double-acting hydraulic or pneumatic cylinder and piston unit) or with any other suitable motion transmitting arrangement, preferably a component which permits an adjustment of the connection, i.e., a selection of that condition of the clutch 401 which corresponds to a predetermined position of the output element 412 of the actor 411. The connection can be designed to push or pull the lever 408 in response to movements of the output element 412 relative to the housing of the actor 411.

The clutch 401 need not be of the type shown in FIGS. 1 and 6a; for example, the clutch can be designed to interrupt or not to interrupt the transmission of torque while its condition is being changed.

The reference character 403 denotes in FIG. 6a the input element of a transmission system (e.g., an automated transmission system corresponding to the system 3 of FIG. 1) which receives torque from the clutch disc (not shown) of the clutch 401.

The nature of the adjustable coupling (415, 416, 417) between the member 410 and the lever 408 is preferably selected in such a way that this coupling enables the person or persons in charge to select any desired condition of the clutch 401 for any desired position of the output element 412 relative to the housing of the actor 411.

Figure 7A:
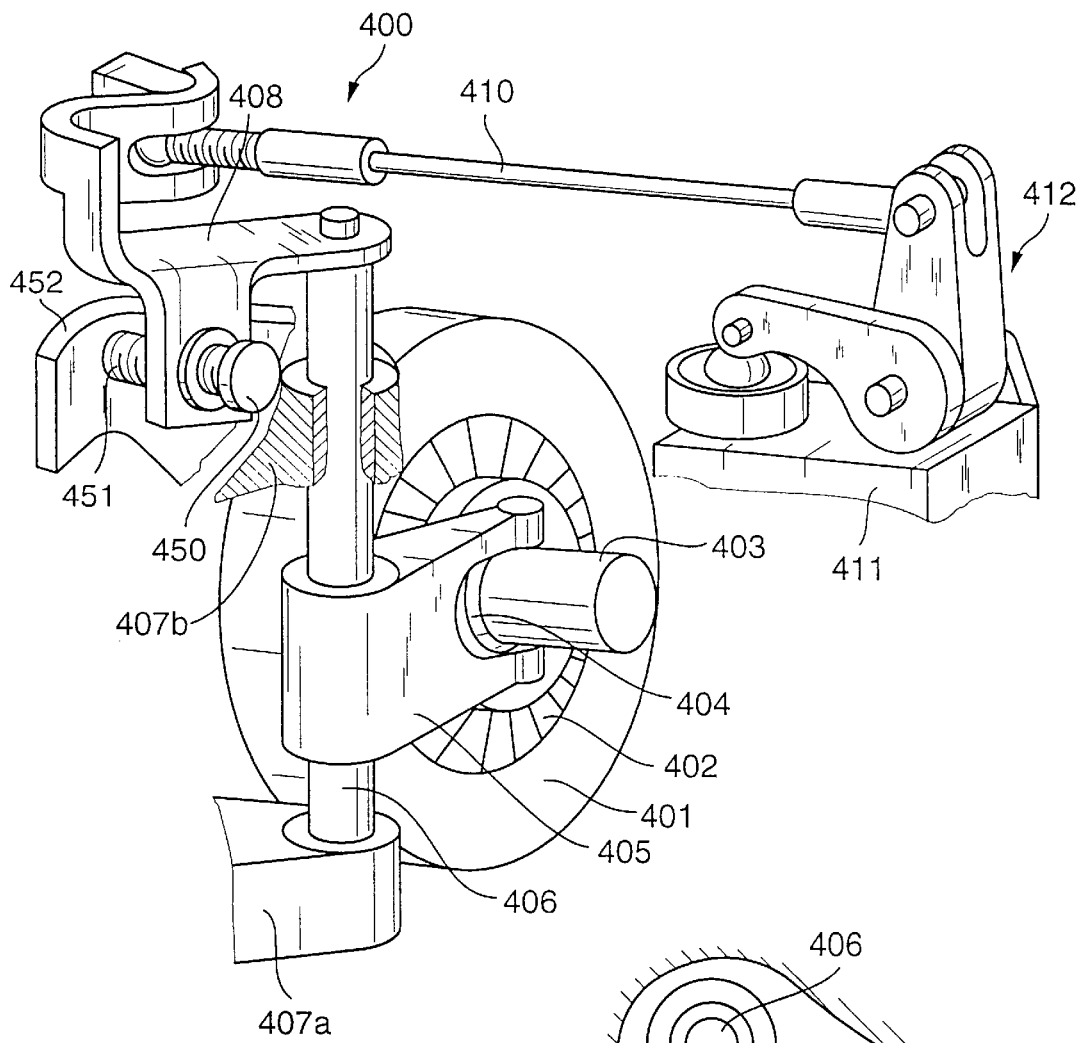
FIG. 7a is a fragmentary perspective partly sectional view of a separable and adjustable connection constituting a modification of the connection which is shown in FIGS. 6a and 6b.
Figure 7B:
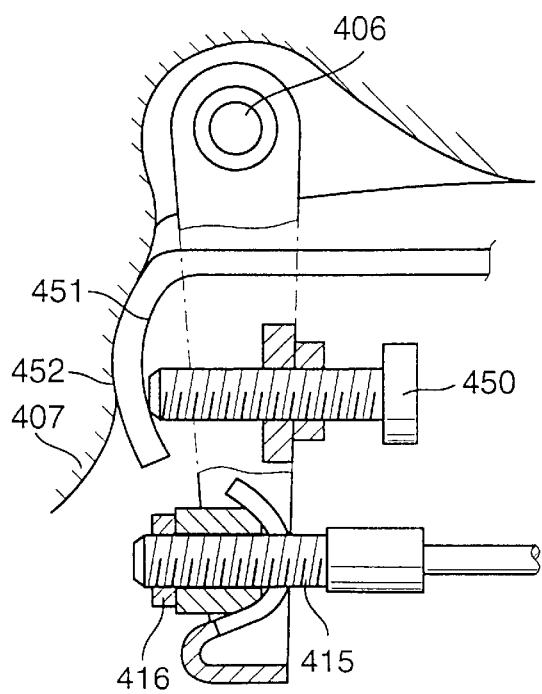

FIGS. 7a and 7b illustrate a portion of a power train 400 with a separable and adjustable connection provided between the mobile output element 412 of an actor 411 and a fork-shaped input element 405 of an automated friction clutch 401. The connection of FIGS. 7a and 7b constitutes a modification of the structure which is shown in FIGS. 6a and 6b. The input shaft of a manually or automatically shiftable transmission system is shown at 403. All such parts of the power train 400 of FIGS. 7a, 7b which are identical with or clearly analogous to the corresponding parts of the power train of FIGS. 6a and 6b are denoted by similar reference characters.

One end portion of the rockable shaft 406 for the fork-shaped input element 405 is connected with a lever 408 which is non-adjustably coupled to the rod 410. The latter can be replaced by a Bowden wire, by one or more cables or by a fluid-operated assembly and can be designed to push or pull the lever 408 to a position corresponding to that of the output element 412 of the actor 411.

The lever 408 carries an adjusting element 450 here shown as a screw or bolt which can abut a stop 451 provided on a stationary part 452, e.g., the case of the transmission including the input element 403. The clutch 401 is disengaged (i.e., it cannot transmit torque from the prime mover of the power train 400 to the input element 403) when the adjusting element 450 abuts the stop 451. If the actor 411 is out of commission, the clutch 401 can be disengaged in response to axial movement of the adjusting element 450 or in response to turning of the shaft 406 for the fork-shaped disengaging element 405 by means of a suitable implement, not shown in FIGS. 7a and 7b. For example, the implement can constitute or resemble a crank and can be a component part of equipment which is normally stored in the trunk of a motor vehicle. Such implement can be designed to engage the fork-shaped element 405 or the lever 408 in lieu of directly engaging the shaft 406. Furthermore, the implement can be a battery-operated (i.e., motorized) tool or a tool which can be plugged into a standard outlet.

The stop 451 need not necessarily be provided on the case 452 of the transmission system; for example, such stop can be provided on or it can form part of a bracket or another suitable support for the actor 411.

The connection between the output element 412 of the actor 411 and the fork-shaped input element 405 of the clutch 401 can be designed in such a way that, when the clutch is fully disengaged, the rod 410 (or its equivalent, such as a cable) can be detached from the output element 412 and/or from the lever 408 to thus permit an adjustment of the clutch 401 (e.g., to a partly engaged condition) independently of the actor 411. As shown in FIG. 7b, separation of the rod 410 from the lever 408 can be carried out by removing or by deactivating the coupling including the bolt 415 and the nuts 416, 417. Such disengagement of the rod 410 from the lever 408 renders it possible to change the condition of the clutch 401 in the inoperative condition (i.e., in the event of failure) of the actor 411.

In accordance with a modification, the adjusting element 450 or an equivalent thereof can be provided between the part 410 and the output element 412 of the actor 411. Thus, the exact location of the adjusting element is not crucial, as long as the adjusting element can be set to locate the input element 405 in a position corresponding to the selected (such as disengaged) condition of the automated clutch or another torque transmitting system. Thus, the adjusting element can be mounted in an actor for one of the automated systems, on the actor for a single automated system, on an automated or manually operable system, or in a connection between an actor and the associated automated system or systems.

It is further possible to fully automatize the operation of a system which receives motion from an actor. Moreover, and referring again to the actor 100 of FIG. 2, gearings (such as the worm gearing 107–108) can be utilized to change the direction of transmission of motion from the output shaft (such as 105 in FIG. 2) of a driving unit (13) to the input element (such as 101) of an automated system (e.g., a transmission system) which is operated by the actor. In FIG. 2, the axis of the input element 101 is normal or substantially normal to the axis (103) of the output shaft 105 of the actor 100.

Furthermore, it is possible to employ one or more gearings (such as 107–108 and 110–111a) which are designed to permit rotation of the input element (such as 101) of an automated system with the exertion of a small or extremely small force. This will be described in greater detail with reference to FIG. 11. In the case of an automated transmission system, such expedient can be resorted to for the selection of as well as for shifting into or from a particular gear.

If an actor (such as a substitute for the actor 100) is provided only with a single driving unit (such as the electric motor 103) and one more gearings (such as 107–108, 110–111a) designed to shift an automated transmission system into a given gear, it is not possible to manually select and/or shift into a particular gear. However, it is possible to shift such automated transmission system from a particular gear into a neutral gear. On the other hand, if the actor (such as 100) is further provided with a second driving unit (such as the electric motor 104) and with one or more additional gearings (such as 121–122 and 123–124a) for automatic selection of any desired gear, it is possible to manually shift into a selected gear, e.g., in a manner as already described with reference to FIGS. 3 to 5d, i.e., by transmitting motion directly to the input element (301) of an automated system.

All that is necessary is to disengage the input element (301) from the output element (302) of the actor (300) and to thereupon manipulate the input element 301 in order to select a particular gear for an automated transmission system or a particular condition for an automated clutch or another torque transmitting system. Such manipulation can be carried out by a manually operated implement (such as 330 or 331) or by a power-operated (e.g., battery-operated) device (not shown). The connection (such as 304, 305) must be accessible and readily separable in order to enable the input element (301) to move independently of the output element (302), i.e., independently of an actor (300) with which it is normally connected and which normally initiates a change in gear or condition. It is then immaterial whether or not the normal connection (such as 107–108, 110–111a) between the output element (103) and the input element (101) is or is not of the self-locking type.

Upon separation from the associated output element (such as 105 or 302), the thus freed input element (such as 101 or 301) can be moved by a manually operated implement (such as 330 or 331), by a power-operated implement (e.g., a motor for the implement 330 or 331), or by utilizing suitable energy storing means which is caused to dissipate energy in order to move an implement (such as 330 or 331) or to directly move the released input element (such as 101 or 301). One mode of utilizing energy storing means will be described with reference to FIG. 17a. Of course, a separation of an input element of an automated system from an output element of a driving unit in an actor will take place, or should take place, only in the event of an emergency, e.g., when the power train happens to be out of commission at a location which is not suitable or desirable for the affected motor vehicle and/or its occupant(s), i.e., when it is desirable to cause the affected vehicle to leave such location under its own power or by being moved by another (e.g., a towing) vehicle.

If a power train employs a control unit (such as 7), an actor (such as 8), and an automated transmission system (such as 3), the incorporation of a separable connection between the output element of the actor and the input element of the automated transmission system brings about numerous important advantages including the following:

It is possible to lock the vehicle with the transmission system in parking gear.

The input element of the transmission system can be separated from the output element of the actor in order to permit a towing of the affected motor vehicle to a selected location (the separation can be short-lasting or the connection can be reestablished (e.g., automatically) after the elapse of a given interval of time).

The input and output elements can be separated from each other in order to enable the motor vehicle to advance to a selected location under its own power.

The transmission system can be shifted into a selected gear during (temporary or continued) separation of the input and output elements from each other in order to enable the motor vehicle to be towed or to advance under its own power to a selected location.

The above enumerated modes of operating an affected motor vehicle can be achieved in a number of ways including resorting to a special actor of the type to be described with reference to FIG. 14. The solution can involve gaining access (directly or indirectly) to the input element or another component part of a driving unit in an actor. Alternatively, one can gain direct or indirect access to the input element of an automated system, e.g., to the central gear shifting shaft or rod of an automated transmission system; this might be of advantage regardless of whether the novel connection between the output element of an actor and the input element of an automated system comprises one or more self-locking or no-self-locking devices such as bevel gearings and/or other types of gearings. Reference may be had again to FIGS. 3 to 5e.

Of course, it is equally advantageous to gain direct or indirect access to the input element of an automated torque transmitting system, such as a friction clutch, regardless of whether or not the normal connection between an output element of an actor and an input element of the automated clutch comprises one or more devices or mechanisms (such as gearings) which may but need not be self-locking. Upon disconnection from the actor, the condition of an automated clutch or another torque transmitting system can be changed (e.g., the clutch can be caused to assume a disengaged condition) in any suitable manner including manually, with a power-operated implement and/or by resorting to one or more energy storing elements (reference may be had to FIGS. 7a and 7b). The just discussed manipulations can be carried out regardless of whether the automated clutch is a push-type clutch (the clutch 401 of FIGS. 7a, 7b is assumed to be a push-type clutch), or a pull-type clutch. In push-type clutches, the diaphragm spring or another clutch spring normally maintains the clutch in the engaged condition in that it causes the pressure plate to bear upon the adjacent set of friction linings of the clutch disc so that the other set of friction linings is urged against and receives torque from the engine-driven counterpressure plate (e.g., a flywheel corresponding to the flywheel 2a in the clutch 2 of FIG. 1). It is also possible to employ a push- or pull-type clutch which embodies one or more energy storing elements serving to normally maintain the clutch in a partly engaged condition.

Figure 8:
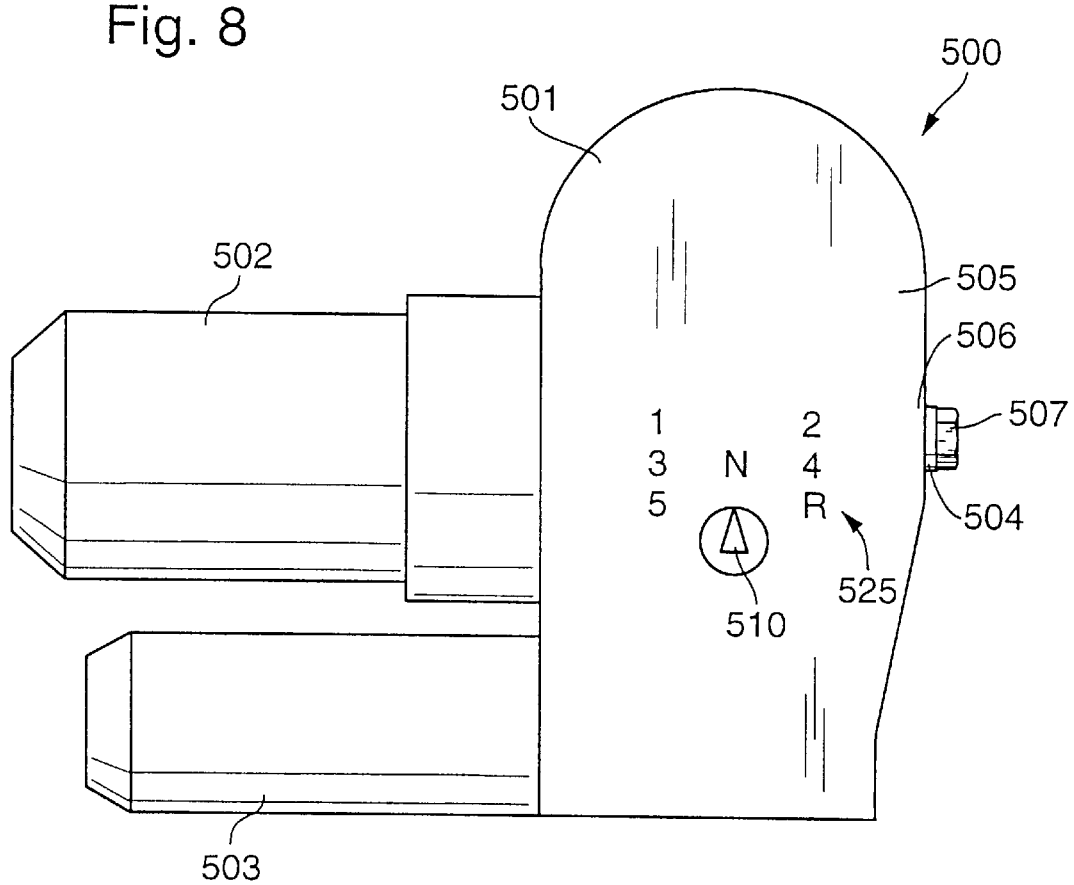
FIG. 8 is a schematic elevational view of an actor which is provided with means for indicating the position of an input element of an automated system and with means for manually or motorically changing the position of the input element in the event of a failure or complete breakdown of one or more constituents of the power train employing the actor of FIG. 8.

Referring to FIG. 8, there is shown a portion of a power train 500 which includes an actor 501 for an automated transmission system. The actor 501 comprises two driving units 502, 503 (such as electric motors). The driving unit 503 can serve to transmit motion to a first input element which selects a desired gear of the transmission system, and the driving unit 502 can transmit motion to a second input element which shifts the transmission system into or from a selected gear.

The driving units 502, 503 can also include or constitute fluid-operated motors.

The automated transmission system which has input elements receiving motion from the output elements of the driving units 502, 503 can but need not be constructed in a manner as shown in FIG. 2a. For example; the driving unit 502 can shift the transmission system into any one of several gears (note the paths 191 in FIG. 2a), and the driving unit 503 can move a selecting member (such as the member 40 shown in FIG. 1) along the path 192 of FIG. 2a into register with a selected path 191. By way of example, the driving unit 502 can be utilized to shift the member 40 along the left-hand path 191 from the forward speed gear No. 1 or 2 into neutral (path 192), and the driving unit 503 then takes over to shift the member 40 along the path 192 into register with the path 191 leading to shifting (by 502) into reverse gear R. When the transmission system is in neutral gear, the member 40 is located in the path 192 of FIG. 2a.

The actor 501 can be replaced with an actor having a single driving unit 502 or 503, and such single driving unit can serve to transmit motion for the selection of gears as well as for shifting into or from selected gears. Such driving unit can include, or can transmit motion to, a single gearing or to a composite gearing which initiates gear selecting and gear shifting operations. A transmission system which is actuated by such actor with a single driving unit can employ a standard gear shifting and selecting drum or roller.

Reference may also be had to the assignee's PCT/DE patent application Serial No. 96/01292 and to the corresponding U.S. patent(s) and/or patent application(s).

The driving unit 502 of the actor 501 includes an otput shaft 504 which extends from the housing 505 of the actor and is journalled at least in a bearing (location indicated by the character 506) within such housing. The exposed or accessible end portion 507 of the output shaft 504 is profiled (e.g., it can have a hexagonal outline), and such profiled end portion 507 can be form-lockingly (non-rotatably) engaged by a crank or a wrench or by any other suitable and available tool or implement which can be manipulated by hand or by an auxiliary motor to change the angular position of the shaft 504. For example, such change can be carried out in order to shift the automated transmission system into neutral gear, into a forward gear or into reverse.

Figure 8A:
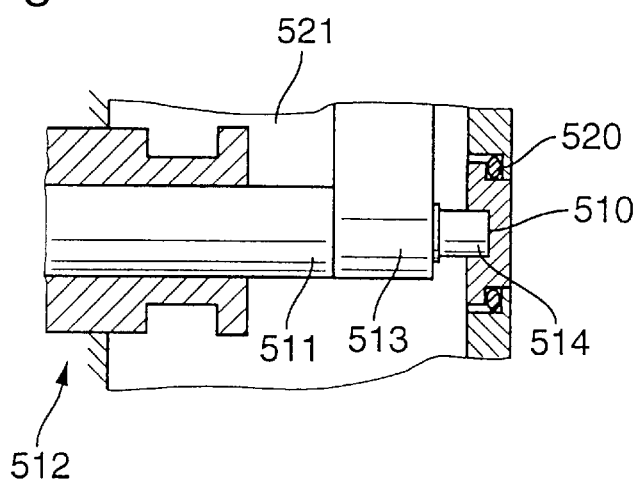
FIG. 8a is a fragmentary sectional view of an automated system which is operated by the actor of FIG. 8.

FIGS. 8 and 8a further show a pointer, hand, index or finger 510 which is operatively connected with a mobile element of the actor 501 or with any other relevant mobile element (e.g., of a gearing receiving motion from the actor 501) to indicate the momentarily selected or active gear of the automated transmission system which is controlled by the actor 501. An analogous index or pointer can receive motion from a component part of an actor (such as 11 in FIG. 1) for an automated torque transmitting system (such as the friction clutch 2 of FIG. 1) to indicate the momentary (engaged, partly engaged or disengaged) condition of such torque transmitting system.

FIG. 8a shows a portion of an automated transmission 512 having an input element (e.g., a shaft) 511 which receives motion from the output shaft 504 by way of a form-locking or another suitable connection 514. The connection 514 can comprise a male detent on the output shaft 504 and a complementary female detent on the input element 511 or vice versa. The pointer or index 510 can receive motion directly from the shaft 504, directly from the input element 511, or from the form-locking connection 514, as long as it can indicate the selected gear of the transmission 512, i.e., the actual angular position of the input element 511.

A sealing element 520 (such an an O-ring) is provided to seal an internal chamber or space 521 of the housing 505 from the surrounding atmosphere; this prevents impurities from penetrating into the housing 505 and/or the escape of lubricant from such housing. The element 520 seals the annular gap which is provided for the stem of the pointer or index 510 in the region of the form-locking connection 514.

FIG. 8 further shows a scale 525 which is provided at the exterior of the housing 505 adjacent the pointer or index 510 to facilitate rapid visual determination of the selected gear of the transmission system 512. It is clear that the rotary index or pointer 510 can be replaced with a reciprocable or otherwise movable pointer which can be caused to move relative to a suitably lettered, numbered and/or otherwise graduated or calibrated scale to indicate the selected or active gear of the transmission system 512.

FIGS. 8 and 8a illustrate but one of a host of means for audibly and/or visually and/or otherwise indicating the momentarily selected gear of an automated transmission system. For example, the index or pointer 510 can be mounted directly on the output shaft 504 of the driving unit 502. Alternatively, and if the actor for an automated transmission system employs a single output element which is set up to perform angular movements (e.g., to shift into or from selected gears) as well as axial movements (e.g., to select a particular gear), the (articulate) connection between the index or pointer and the single output element can be such that the output element can move axially relative to the index or pointer but the latter shares all angular movements of the output element; this can be achieved by mounting the hub of the index or pointer on an axially splined portion of the single output element.

Still further, it is possible to rigidly secure the index or pointer to an axially and angularly movable output element of an actor externally of the housing of such actor so that the axial position of the index or pointer denotes the nature of the gear selecting operation and that the angular position of the same index or pointer indicates the selected gear. It is then advisable to employ a suitable bellows between the axially and angularly movable index or output element on the one hand, and the housing of the actor on the other hand to thus prevent entry of impurities into and the escape of lubricant from such housing.

An index or pointer can be provided on the output element(s) of each actor or a single actor and/or on the input element or elements of each automated system or a single automated system. Such pointer or pointers can visually represent (demonstrate) the condition of an automated torque transmitting system, the selection of a particular gear in an automated transmission system and/or the actually selected gear. The output element or elements of the actor or actors can be set up to perform angular and/or other movements (such as axial or reciprocatory movements).

As already mentioned above, the locus where an index or pointer or an input or output element which transmits motion to the index or pointer extends from the housing of an actor, from the housing of an automated torque transmitting system or from the case of an automated transmission system is preferably sealed by an O-ring (such as the sealing element 520 shown in FIG. 8 or the sealing element 543 shown in FIG. 8c), by bellows or in any other suitable way. However, and since a long-lasting leakproof seal is likely to cause frictional losses (e.g., due to pronounced frictional engagement with an axially movable and/or rotary shaft), such seals can be omitted if an actor and/or an automated system is provided with a suitable coupling which is normally idle but can be activated when necessary to point out the condition of an automated clutch or the selected gear of an automated transmission system when the need arises, e.g., when an actor and/or the clutch and/or the transmission system becomes defective or is out of commission.

If the actor for an automated transmission system is not a self-locking actor, the transmission system is preferably designed to afford direct access to its input element or elements for the purpose of manually or motorically shifting such transmission system into a desired gear in the event of failure of one or more actors or one or both automated systems.

If the actor for an automated transmission system is not of the self-locking type or if the self-locking action of such actor is not very pronounced, so that the application of a reasonable force to an output element of such actor can suffice to move the electric motor or another driving unit of the actor, an output element of the actor can be mounted in such a way that it extends from the actor housing or can be reached in such housing by a suitable implement in order to change the position of the output element and hence the position(s) of the associated input element(s) of the automated transmission system until the transmission system is shifted into a desired gear. Alternatively, the input element (s) of the transmission system can extend from the transmission case to allow for a shifting into a selected gear even though any movement of the input element(s) of the transmission system is possible only in response to the exertion of a force which is required to change the angular position(s) of the corresponding output element(s) provided that such force need not be very pronounced which is the case if the driving unit or units of the actor are not of the self-locking type or the self-locking action is not very pronounced.

It will be seen that a manually or motorically induced shifting of an automated transmission system into a desired gear can be carried out even in the absence of a separable connection between an output element of an actor and an input element of the associated automated transmission system or torque transmitting system. Such modifications can also employ one or more pointers or indices and scales to thus facilitate the shifting of a transmission system into a selected gear in the event of malfunction or to facilitate a changing of the condition of an automated clutch in the event of a malfunction. Still further, the accessible input and/or output element(s) can be provided with detachable or permanently installed extensions which facilitate the application of a manually operable or power-operated implement in the event of a malfunction or a total breakdown of one or more actors and/or automated system or systems.

Figure 8B:
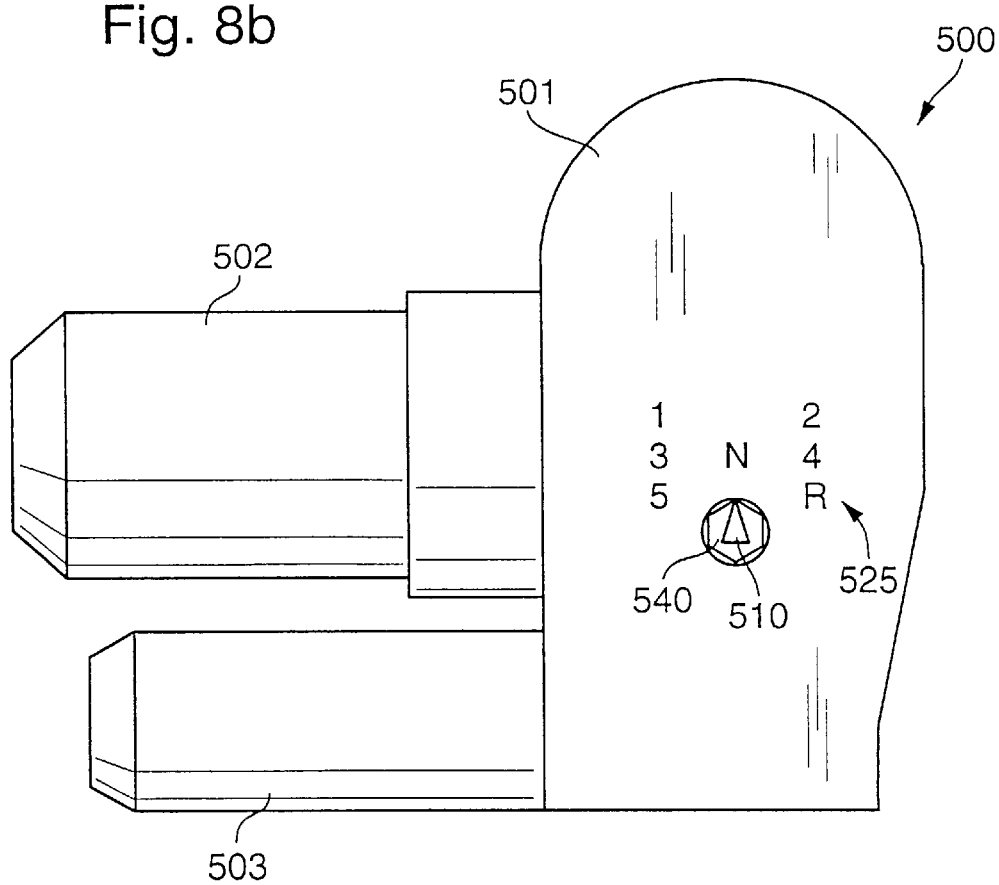
FIG. 8b is a schematic elevational view of an actor which constitutes a modification of the actor of FIG. 8.
Figure 8C:
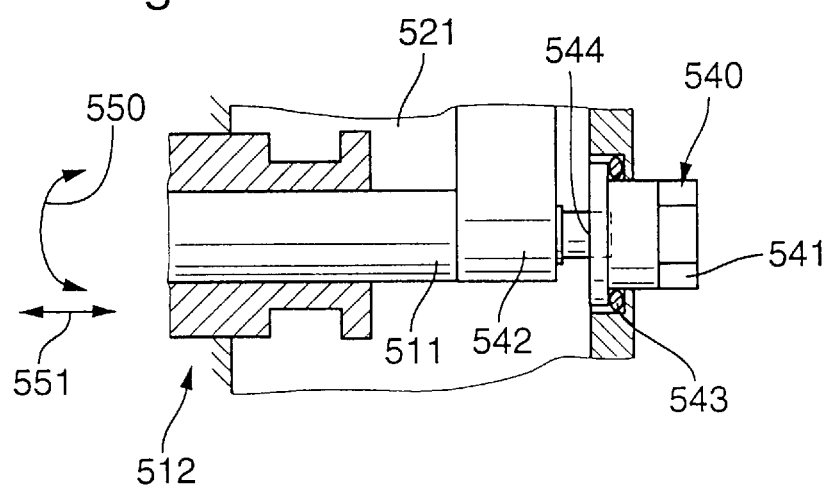
FIG. 8c is a fragmentary sectional view of an automated system which is actuated by the actor of FIG. 8b.

FIG. 8b shows an actor 501 forming part of a power train 500 and including a housing 505 which carries two driving units 502, 503 and rotatably mounts an actuating or motion transmitting element 540 having a profiled peripheral surface 541 (see FIG. 8c) which can constitute a hexagonal surface. FIG. 8c further shows a friction bearing 542 (which can be replaced with a ball bearing, a needle bearing or any other suitable antifriction bearing). The aforementioned O-ring 543 establishes a seal between the element 540 and the adjacent portion of the housing 505.

The element 540 and the input (gear selecting and gear shifting) element 511 of an automated transmission system 512 are two discrete parts which are coupled to each other by a tolerance compensating joint 544. This joint ensures that the input element 511 can rotate and move axially relative to and in the friction bearing 542 but that the element 540 shares all angular movements of the element 511. The profiled portion 541 can be engaged by a manually or power-operated implement to turn the input element 511 as well as the index or pointer 510 and to thus indicate the angular position of the element 511, i.e., the selected gear, and this is pointed out by the index 510 which is movable relative to a suitably graduated or calibrated scale 525 at the outer side of the housing 505 of the actor 501.

The structure of FIGS. 8b and 8c can be modified by making the element 540 of one piece with the element 511. The element 540 then shares the angular movements (double-headed arrow 550 in FIG. 8c) which are needed to shift the transmission 512 into or from a selected gear as well as the axial movements (arrow 551) which are performed by the input element 511 to select a particular gear.

As already mentioned hereinbefore in connection with the description of FIGS. 8 and 8a, it is possible to make a central gear selecting and shifting element (e.g., a shaft) longer so that it extends from the housing 505 of the actor 501 and its exposed end portion is then provided with a profile (see the profile 507 in FIG. 8) which can be engaged and the combined gear selecting and shifting element moved in a desired direction. Thus, one can move the output element of an actor in order to thereby influence the condition of an automated clutch or select a gear in an automated transmission system. Adequate sealing of the housing of such actor is optional but desirable. Moreover, the just described and other previously described expedients can be resorted to in power trains wherein the actor or actors comprise one or more driving units which may but need not always constitute or include electric motors, i.e., changes in angular and/or axial positions of various input and/or output elements (with or independently of each other) by manually or power-operated means can be effected in all or nearly all types of actors and/or the associated automated systems.

Figure 12:
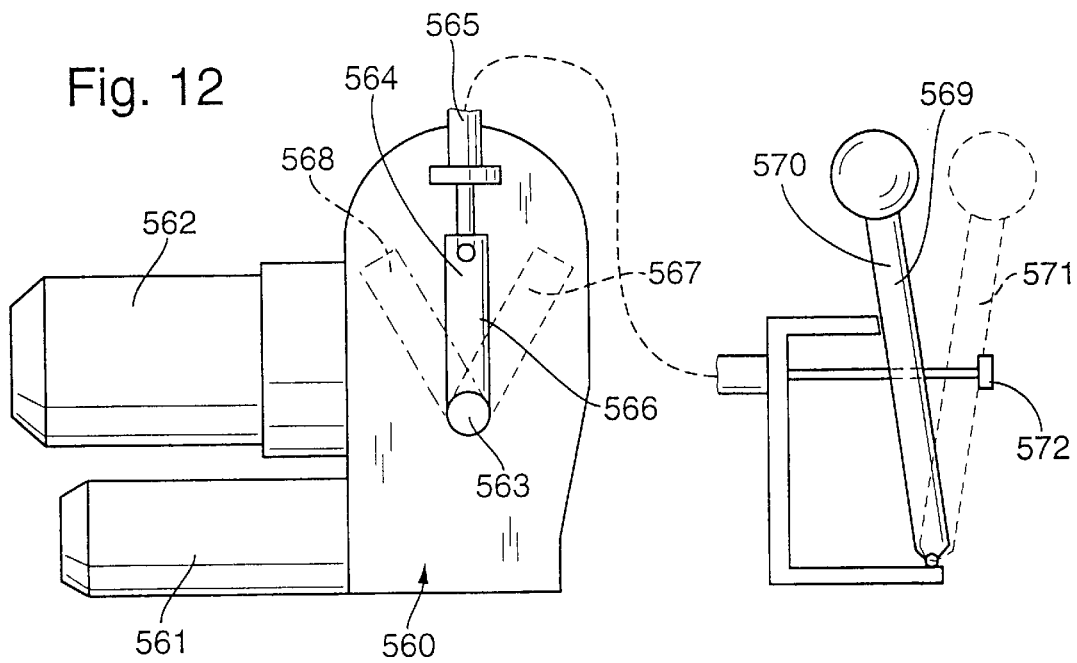
FIG. 12 is a schematic elevational view of an actor and of means for changing the angular position of an input element, which is normally moved by an output element of an actor, by the operator of the motor vehicle through the medium of a Bowden wire.

Referring now to FIG. 12, there is shown an embodiment which renders it possible to mechanically shift an automated transmission system out of a particular gear from a remote location, e.g., by the operator of the motor vehicle while the operator continues to occupy the driver's seat. The actor 560 has two driving units 561, 562 one of which serves to transmit motion to a gear shifting shaft 563 of an automated transmission system. The shaft 563 is rigidly connected with a lever 564 which is accessible at the exterior of the housing of the actor 560 and can be pivoted from the solid-line (central) position 566 to the right-hand position 567 or to the left-hand position 568 (both indicated by broken lines), as viewed in FIG. 12. The means for moving the shaft 563 between the three positions includes a Bowden wire 565 and a pivotable actuating member or lever 569 (corresponding to the member 40 shown in FIG. 1) which can be manipulated by and is within reach for the operator of the motor vehicle. For example, the member 569 can be accessible at the dashboard of a motor vehicle, and this member is operatively connected with one end portion 572 of the cable in the sheath of the Bowden wire 565. The lever 569 is pivotable between a first end position 570 (shown by solid lines) and a second end position 571 (indicated by broken lines).

If the lever 564 is acted upon by a force having or exceeding a certain magnitude, it is maintained in the solid-line position 566 of FIG. 12; such position of the lever 564 can correspond to an angular position of the input element 563 in which the transmission system including the input element 563 is in neutral gear. The lever 563 can be forced to such central or neutral (solidline) position 566 irrespective of whether it was previously maintained in the position 567 (e.g., in the first, third or fifth forward gear) or in the position 568 (e.g., in one of the second and fourth forward gears or in the reverse gear R, see also FIG. 2a).

Instead of being accessible at the dashboard, the lever 569 can be mounted under the hood of a motor vehicle, e.g., on the engine block or on the chassis. It is also possible to locate the lever 569 in the trunk or in the passenger compartment(s) of the motor vehicle.

The operation of the structure which is shown in FIG. 12 is as follows:

If the transmission system is in neutral gear (i.e., if the lever 564 occupies the central position 566) and no intervention (as a result of a malfunction or a total breakdown) is necessary, the lever 569 is held in the solid-line position 570. To this end, the lever 569 can be normally (releasably) locked in the position 570 by a suitable detent or is permanently (but yieldably) biased to the position 570 by one or more springs or other suitable energy storing elements. The end portion 572 of the cable in the sheath of the Bowden wire 565 is or can be disengaged from the lever 569 (in the position 570).

If the actor 560 has shifted the transmission system including the input element 563 into a gear other than neutral, the lever 564 is pivoted to the position 567 or 568 and the slack between the end portion 572 of the cable of the Bowden wire 565 and the lever 569 (still in the position 570) is reduced. Nevertheless, the Bowden wire is not actuated, i.e., it does not oppose a pivoting of the lever 564 from the position 566 to the position 567 or 568.

If (e.g., in response to the detection of a malfunction) the lever 564 is to be returned from the position 567 or 568 to the position 566 (to thus shift the transmission system into neutral gear), the operator of the vehicle or another person pivots the lever 569 from the position 570 to the position 571 whereby the lever 569 acts upon the end portion 572 of the cable of and causes the Bowden wire 565 to shift the transmission system (including the input element 563) into neutral gear by causing the lever 564 to leave the position 567 or 568 and to assume the position 566.

It will be seen that the structure which is shown in FIG. 12 can shift the automated transmission system into neutral gear from any of the other gears, i.e., regardless of whether the lever 564 was previously held in the position 567 or 568.

In addition to performing the aforedescribed function of shifting the automated transmission system into neutral: gear in the event of an emergency, the lever 564 can be designed to perform the functions of the manually operable gear selecting and shifting member 40 in the power train of FIG. 1. This modification exhibits the advantage that the motor vehicle need not be provided with a separate member (569)

which is actuated only in the event of an emergency as the sole means for shifting an automated transmission system into neutral gear (by way of the corresponding actor 560). The embodiment of FIG. 12 exhibits the advantage that the Bowden wire 565 renders it possible to install the actor 560 at a location which is not readily accessible and/or at any desired practical distance from the driver's seat.

In accordance with a further embodiment of the present invention, the element which is to be manipulated by hand or is to be engaged by a manually manipulatable implement can be acted upon by one or more energy storing elements in such a way that one can establish a nonpermanent force-locking or form-locking connection with the part to be shifted and/or otherwise moved, e.g., with the shaft of a motor or with the shaft of a transmission system (such as a central gear shifting shaft). For example, the bias or the resistance of one or more energy storing elements must be overcome in order to permit a selection of a particular gear or the placing of an automated clutch into a desired condition but the energy storing element or elements acts or act as a locking device to prevent accidental adjustments in the absence of the application of a force which overcomes the bias or resistance of the energy storing element(s) when the situation demands a manually initiated gear shift and/or a manually initiated change in the condition of a clutch due to a malfunction or complete breakdown of an actor and/or an automated transmission system or torque transmitting system.

Figure 9:
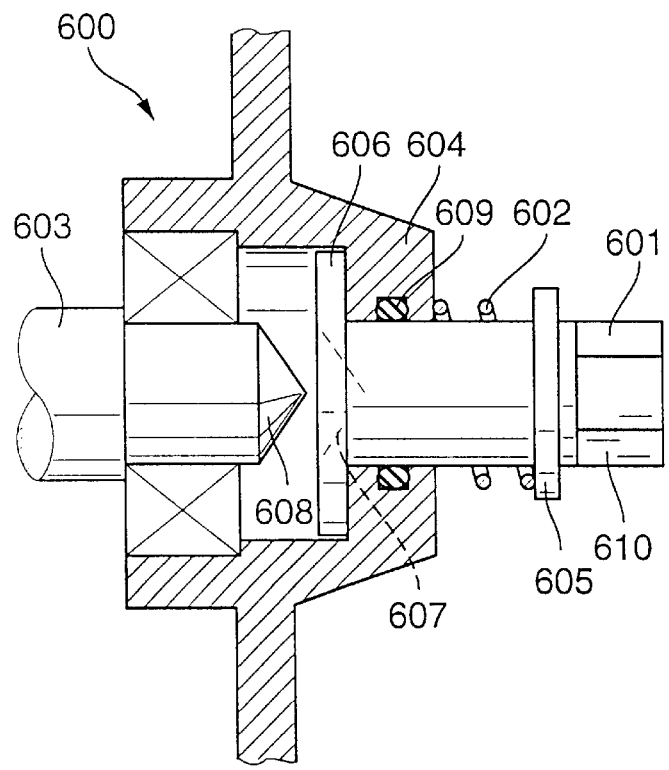
FIG. 9 is a fragmentary sectional view of an actor wherein the means for changing the position of an output element of the actor is normally disengaged from the output element.

FIG. 9 shows a portion of an actor 600 in the power train of a motor vehicle. An accessible actuating element 601 is biased by an energy storing element 602 in the form of a coil spring in a direction axially of and away from the adjacent end of an output element 603, e.g., the shaft of an electric motor constituting one driving unit or the single driving unit of the actor 600. The spring 602 reacts against the housing 604 of the actor 600 and bears against a retainer in the form of a collar 605 on the actuating element 601. The latter has a profiled portion 610 which can be engaged by a manually operated or power-operated implement to depress the element 601 against the resistance of the spring 602 so that the inner end of the element 601 comes into adequate frictional or form-locking engagement with the output element 603; thus, the latter can be rotated by the element 601 as soon as the resistance of the spring 602 is overcome. FIG. 9 shows that the output element 603 has a conical tip 608 which can be received in a complementary conical socket 607 at the inner axial end of the element 601 when the latter is depressed and thus deforms the spring 602. An annular sealing element 609 in the housing 604 of the actor 600 sealingly engages the periheral surface of the element 601 to prevent the penetration of impurities into and/or the escape of lubricant from the interior of the housing 604.

The collar 605 can constitute a separate part (e.g., a split ring) which is held in a circumferential groove of the element 601 by snap action. Alternatively, the collar 605 can form an integral part of the element 601. A stop 606 at the inner axial end of the element 601 prevents the latter from becoming completely separated from the housing 604. The stop 606 can be of one piece with the element 601.

If the collar 605 is a split ring, the element 601 can be inserted to the position of FIG. 9 from the interior of the housing 604, the spring 602 is then slipped onto the outwardly extending portion of the element 601, and the split ring 605 is attached to the element 601 adjacent the profiled portion 610 to maintain the spring 602 in a stressed condition sufficient to normally hold the element 601 in the illustrated position in which the socket 607 is remote from the conical tip 608 of the output element 603. The latter can transmit torque and/or axial movements to a gear selecting or gear shifting input element of an automated transmission system or to a condition-changing element of an automated torque transmitting sysem.

If the stop 606 is separable from the element 601, the latter can be inserted into the housing 604 from the outside and can be of one piece with the collar 605. The stop 606 and the element 601 are then provided with complementary (such as male and female) detent elements which can engage each other to reliably couple the inner end of the properly inserted element 601 to such separable stop. For example, the inner end of the element 601 can carry an external thread which can be brought into mesh with an internal thread of a separately produced stop 606.

As can be seen in FIG. 9, the actuating element 601 is out of contact with the output element 603 as long as the actor 600 and/or the automated system which is associated with this actor operates properly. However, the element 601 can be used to rotate the element 603 in the event of an emergency; all that is necessary is to depress the element 601 against the opposition of the spring 602 into frictional or force-locking torque-transmitting engagement with the tip 608 of the output element 603.

The profiled portion 610 of the actuating element 601 can be engaged, depressed and turned by a wrench, by a crank, by a lever, by a motorized implement or in any other suitable manner.

Figure 10:
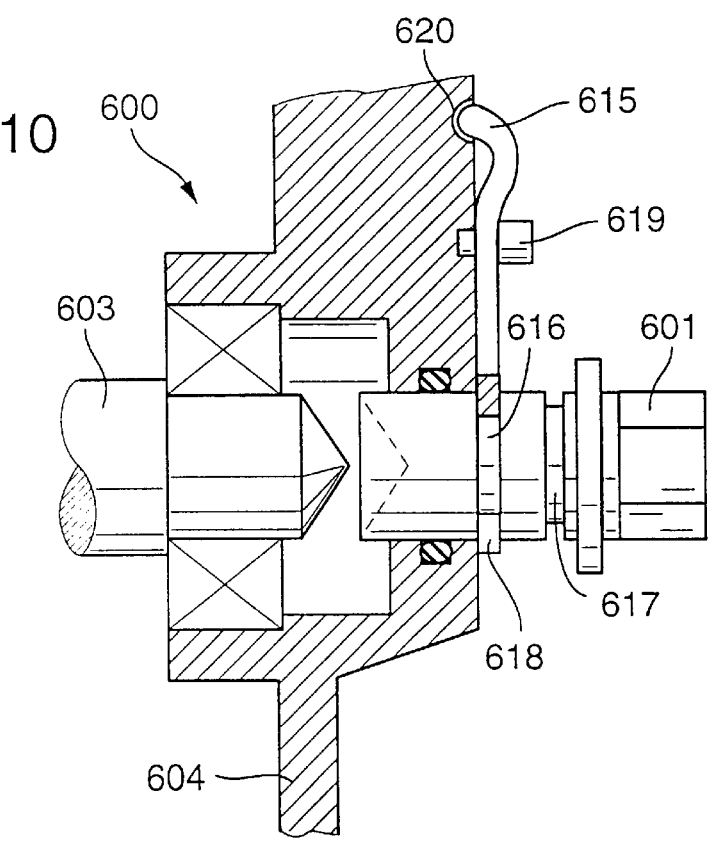
FIG. 10 illustrates a modification of the structure which is shown in FIG. 9.

FIG. 10 shows a portion of a modified actor 600 having a housing 604 and a rotary output element 603. The actuating element 601 is surrounded by an O-ring or another suitable seal in the housing 604 and is normally locked in the housing 604 by a rigid or resilient locking member 615 having a head receivable in a socket 620 at the outer side of the housing 604 and a forked end portion 618 extending into a circumferential groove 616 of the actuating element 601 when the latter is not in use. A screw, bolt or another suitable fastener 619 releasably secures the locking member 615 to the housing 604.

If the actuating element 601 is to be put to use as a means for rotating the output element 603 to a certain angular position in which the automated transmission system (not shown) receiving motion from the output element 603 has been shifted into a selected gear (or in which an automated clutch having an input element receiving motion from the output element 603 has assumed a predetermined (fully engaged, partially engaged or disengaged) condition), the first step involves removing the fastener 619 and thereupon extracting the free end of the locking member 615 from the socket 620 of the housing 604. The forked portion 618 of the member 615 is thereupon withdrawn from the groove 616 of the actuating element 601. The latter is thereupon pushed toward the interior of the housing 604, i.e., into engagement with the tip of the output element 603. Such engagement can be reinforced by thereupon inserting the forked portion 618 of the locking member 615 into a second circumferential groove 617 of the element 601 and by reattaching the locking member 615 to the housing 604 by means of the fastener 619. The preferably resilient locking member 615 (this member can be made of resilient metallic sheet stock or of resilient wire) then biases the abutting ends of the elements 601, 603 against each other with a frictional force (or frictionally and form-lockingly) so that, when the profiled end of the actuating element 601 is rotated by a wrench or by another implement, the element 601 turns the output element 603 to a desired angular position, e.g., to a position in which an automated transmission system is in neutral gear or in which an automated clutch is disengaged.

The features which are shown in FIGS. 9 and 10 can be combined, i.e., the actuating element 601 of FIG. 10 can be provided with the stop 606 and collar 605, it can cooperate with a spring 602, and it can be locked in the idle and/or in the operative position by a locking member 615. However, such combination need not necessarily employ a resilient locking member (such as 615).

The structure of FIG. 9 and/or 10 can be utilized in many other types of power trains and in combination with many types of actors. For example, the actuating member 601 can be used to impart axial and/or angular movements to a shaft, to a sleeve or to another axially and/or angularly movable part which serves to select a particular gear and/or to shift into a selected gear an automated transmission system and/or to select a desired condition for an automated clutch or another torque transmitting system. The output element which can be coupled with and can receive motion from the actuating element 601 or an equivalent actuating element can be used to impart any one of the following movements: (a) a simple gear selecting movement, (b) a simple gear shifting movement, (c) a combined gear selecting and gear shifting movement, (d) a single condition selecting or changing movement, (e) a combined condition and gear selecting movement, (f) a combined condition selecting and gear shifting movement, and (g) a combined condition selecting, gear selecting and gear shifting movement. Thus, one can resort to the actuating element 601 in conjunction with an actor which actuates a single input element (e.g., a central gear shifting shaft) of a transmission system, one or both input elements of a transmission system, and/or the input element of an automated torque transmitting system.

If an actor employs one or more electric motors, its space requirements are frequently such that the output element(s) of its motor(s) is or are not readily accessible. This can create problems if one were to utilize an actuating element (such as 601) which must be accessible for the application of a manually or power-operated implement to its profiled portion 610. Therefore, it is often desirable or advisable to connect a manually or otherwise manipulatable actuating element to a portion other than an end portion (such as 608) of an output element of a hard-to-reach actor.

It is also advisable to connect an actuating element with the output element (such as a shaft) of an actor by means of a step-down transmission which renders it possible to change the position of the output element with the exertion of a small or relatively small force and/or with a transmission which multiplies the movement of the actuating element so that a relatively small movement of the actuating element suffices to effect larger movements of the driven (output) element of the actor. For example, a single revolution of the actuating element should result in two or more revolutions of the torque-receiving output element of the actor.

Figure 11:
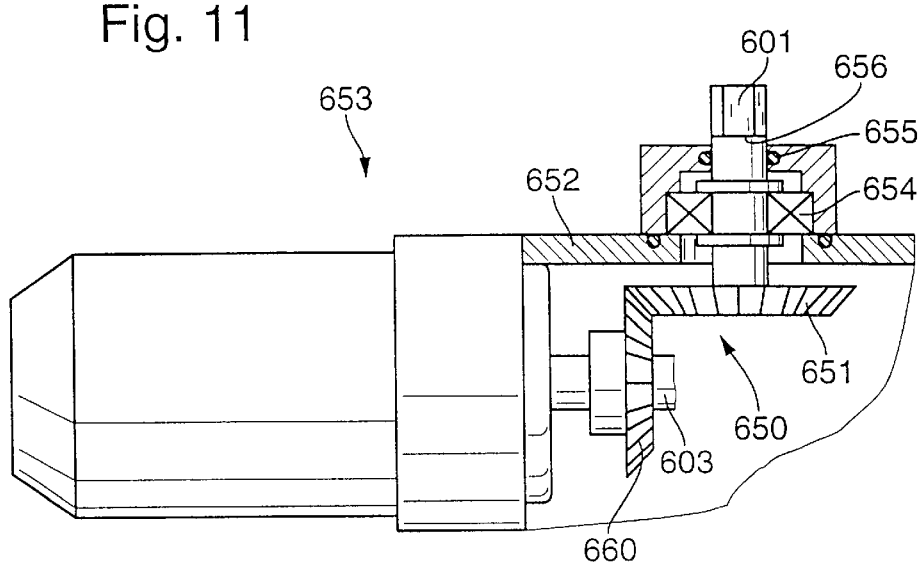
FIG. 11 is a fragmentary partly elevational and partly sectional view of an actor having an output element which can be turned by a manually operated or power-operated actuating element through the medium of a gearing.

FIG. 11 shows that the output element (e.g., a shaft forming part of an electric motor) of a driving unit in an actor can be rotated by an actuating element 601 by way of a gearing 650 in the form of a bevel gearing having a large-diameter bevel gear 651 affixed to and rotatable by the actuating element 601 and a smaller-diameter bevel gear 660 affixed to and serving to rotate the output element 603. The bevel gear 660 meshes with and can be driven by the bevel gear 651.

The axis of the actuating element 601 is normal to the axis of the output element 603, and the actuating element 601 can be mounted in an intermediate portion of the housing 652 of the actor 653 or of the electric motor embodying the output shaft 603. This often constitutes a very simple but highly satisfactory solution of the problem of gaining access to the output element 603 in a hard-to-reach actor 653 or in an actor wherein an axial end of the output element 603 is difficult to reach or cannot be reached at all.

It is clear that the bevel gearing 650 can be replaced with any other suitable gearing which can serve the same purposes or at least one of the purposes accomplished by the utilization of the gearing 650, namely the possibility of placing the axis of the actuating element 601 at an oblique angle or at a right angle to the axis of the output element 603, of positioning the element 601 at a location other than at an axial end of the output element 603, and/or of multiplying the movements of the actuating element 601 (so that, for example, the output element 603 must turn through an angle of 180° in response to a much smaller angular movement of the actuating element 601). For example, the bevel gearing 650 can be replaced with a gearing employing spur gears, combinations of spur and contrate (face) gears or others.

The element 601 of FIG. 11 is mounted in an antifriction ball bearing 654 and is surrounded by an O-ring 656 or another suitable sealing element. The accessible profiled end of the actuating element 601 can be engaged by a manually or power-operated implement (not shown). Te ball bearing 654 is mounted in the housing 652 and constitutes but one of various bearings (such as a needle bearing, a friction bearing, a roller bearing or the like) which can be utilized to reduce friction between the actuating element 601 and the mounting means therefor.

It is further clear that the mounting of the actuating element 601 can be such (reference may be had to FIG. 9 or 10) that this element is normally out of contact with the output element 603, i.e., that it is necessary to overcome the bias or resistance of one or more resilient elements before the element 601 can begin to rotate the element 603. This reduces the likelihood that the element 603 would encounter pronounced frictional resistane to rotation when the power train including the actor 653 operates in a satisfactory manner, i.e., when it is not necessary to resort to the element 601 in order to change the angular position of the element 603 in the event of a malfunction or a total breakdown of the actor 653 and/or of an automated system which is associated with such actor. Thus, when the operation of the actor 653 or of any other parts of the power train embodying the actor 653 is normal, and the element 601 is separated from the element 603, the latter need not overcome the inertia of the element 601 in order to be set in rotary motion for the purpose of influencing an associated automated clutch and/ or an associated automated transmission system. It is to be borne in mind that, in the actor 653 of FIG. 11, the shaft 603 must normally rotate the bevel gears 660, 651and the actuating element 601; rotation of the element 601 can take place by overcoming friction between the element 601 on the one hand, and the bearing 654 and the sealing element 655 on the other hand. The actuating element 601 includes the shaft 656 of the bevel gear 651.

The bearing 654 is optional, i.e., it can be omitted especially if the element 601 is normally out of contact with the element 603 due to the incorporation of the feature(s) shown in FIG. 9 and/or 10. Moreover, the element 603 need not form part of an electric motor but can constitute the output element of any other suitable driving unit in the actor 653. Still further, the element 601 of FIGS. 9, 10 and 11 can be utilized to impart motion to the input element of an automated or non-automated torque transmitting system or transmission system, i.e., it need not be used exclusively in conjunction with an actor.

If an actor is provided with a self-locking gearing (an actor 100 with four gearings 107–108, 110–111a, 121–122 and 123–124a was described with reference to FIG. 2) which can transmit torque to an input element of an associated automated system, one cannot resort to actuating means of the type shown, for example, in FIGS. 9, 10 and 11 because the gearing can be driven only by a driving unit of the actor and any attempt to rotate an output element of an actor embodying a self-locking gearing or an input element normally receiving motion from such output element could cause serious damage in addition to necessitating the exertion of very large forces.

Figure 13:
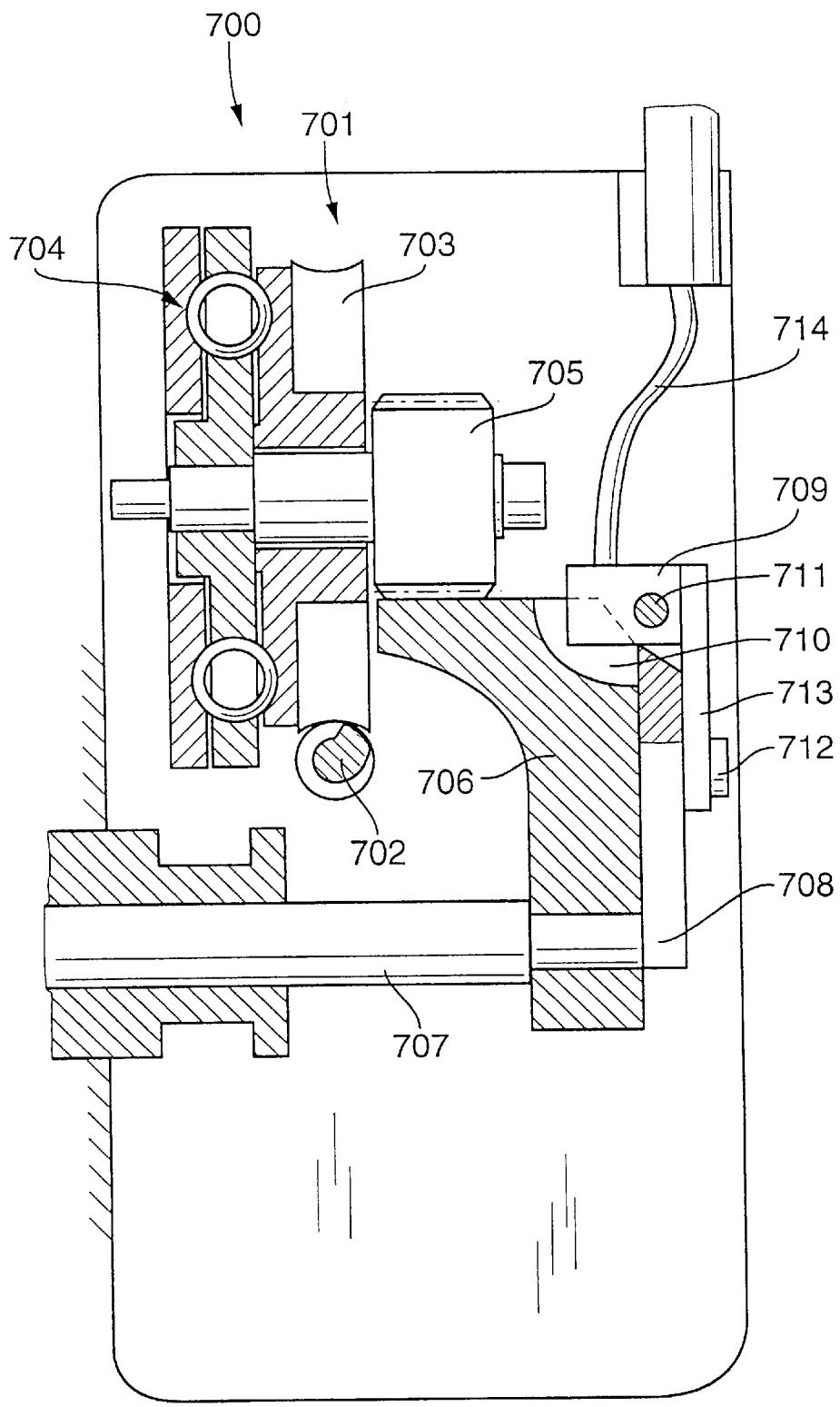
FIG. 13 is a fragmentary partly elevational and partly sectional view wherein the self-locking action of a driving

In accordance with a further feature of the present invention, and as shown in FIG. 13, the self-locking system of an actor 700 can be disengaged (i.e., unlocked or rendered inoperative) in order to enable a manually manipulatable actuating element to chage the position of the output element of such actor. The actor 700 of FIG. 13 is assumed to comprise at least one driving unit (not shown), such as an electric motor having a rotary output element which drives a self-locking gearing 701. The latter comprises a worm gearing including a worm 702 and a worm wheel 703 meshing with the worm 702. This worm is mounted on the output shaft of the electric motor (see, for example, the output shaft 105 and the worm 107 in the actor 100 of FIG. 2).

A resilient component 704 couples the worm wheel 703 with the shaft of a pinion 705 in mesh with a gear segment on a lever 706 rotatably mounted on an extension of an input shaft 707 of an automated system, e.g., a shaft corresponding to the shaft 406 in FIG. 6a). This is in contrast to rigid mounting of the lever 408 on the shaft 406 of FIG. 6a. If the lever 706 is to turn the input shaft 707, it must be coupled to a second lever 708 which is of one piece with or is rigidly secured to the shaft 707. The bevel gearing 702, 703 and the spur gearing 705, 706 are then ready to change the angular position of the shaft 707 in order to change the condition of an automated clutch (see FIG. 6a) or to select or shift an automated transmission system into a selected gear (see FIG. 2).

The means for separably coupling the levers 706, 708 to each other comprises an entraining or coupling element or member 709 which form-lockingly extends into a complementary recess 710 of the lever 706. The entraining member 709 is angularly movably mounted in the adjacent free end portion of the lever 708, e.g., by a pin-shaped pivot member 711. A leaf spring 713, which is affixed to the lever 708 by a rivet 712 or the like, serves to engage a plane edge face of the entraining member 709 and to normally maintain the member 709 in its recess 710 so that the levers 706, 708 are non-rotatably coupled to each other and the connection between the output shaft of the electric motor and the input shaft 707 is self-locking.

The entraining member 709 is connected with the free end of the cable in the sheath of a Bowden wire 714 having a handle which is accessible at the exterior of the housing of the actor 700. If the handle is pulled by a person in charge, the Bowden wire 714 extracts the entraining element 709 from the recess 710 against the opposition of the leaf spring 713 so that the output shaft of the electric motor (i.e., the worm 702) and/or the input shaft 707 can be turned (manually or motorically) independently of each other and in any of the previously described manners (for example, the shaft 707 can be rotated in a manner as described with reference to FIGS. 9 and 10).

Alternatively, the Bowden wire 714 can act in a manner as described in connection with the Bowden wire 565 in the actor 560 of FIG. 12, i.e., as soon as the coupling 709, 710 between the levers 706, 708 is rendered inoperative (disengaged), the Bowden wire 714 can automatically move the lever 708 (which then corresponds to the lever 564 of FIG. 12) to an angular position (corresponding to the position 566 of the lever 564) in which the input shaft 707 (corresponding to the shaft 563 of FIG. 12) maintains an automated clutch in a desired (engaged, partially engaged or disengaged) condition or maintains an automated transmission system in a predetermined (e.g., neutral, first or second) gear.

It is advisable to design and to cause the levers 706, 708 and the member 709 to cooperate in such a way that the member 709 can enter the recess 710 only in a single angular position of the levers 706, 708 relative to each other. Thus, the connection between the levers 706, 708 (i.e., between the output element of the electric motor and the input element 707 of an automated system) can be reestablished as often as desired. In other words, once the cause of malfunction has been eliminated and the electric motor is restarted to turn the lever 706 by way of the two gearings or transmissions 702–703 and 705–706, the torque transmitting connection between the output element of the electric motor and the input element 707 is reestablished automatically (because the member 709 can reenter the recess 710 under the bias of the leaf spring 713) as soon as the lever 706 reaches the single predetermined angular position relative to the lever 708 of the input element 707. An automatic reestablishment of a manually or automatically interrupted connection constitutes a highly desirable and advantageous feature of the present invention.

It is further advisable that an actuation of the Bowden wire 714 in a sense to extract the member 709 from the recess 710 result in the generation of a signal which is transmitted to the control unit for the actor 700. This can be achieved by resorting to a switch which can be installed in such a way that it transmits to the control unit (such as 7) a signal when the member 709 leaves the recess 710 or when the handle of the Bowden wire 714 is pulled by hand. The control unit then ensures that the electric motor is started slowly, i.e., that the lever 706 is pivoted slowly until it reaches the predetermined position in which its recess 710 is again ready to receive the member 709 under the bias of the leaf spring 713. Alternatively, the connection between the control unit and the electric motor of the actor 700 can be set up in such a way that the lever 706 is caused to turn slowly (i.e., that it is slowed down) only when it approaches the predetermined position in which it can be recoupled with the lever 708.

It is further clear that the actor 700 of FIG. 13 can be provided with several Bowden wires or analogous motion transmitting means, e.g., with a first Bowden wire (such as 714) which serves to disengage the coupling 709, 710 between the levers 706, 708, and a second Bowden wire (corresponding to the Bowden wire 565 of FIG. 12) which thereupon causes or permits the input element 707 to assume a predetermined angular position (e.g., corresponding to the shifting of an automated transmission system into neutral gear).

Figure 14:
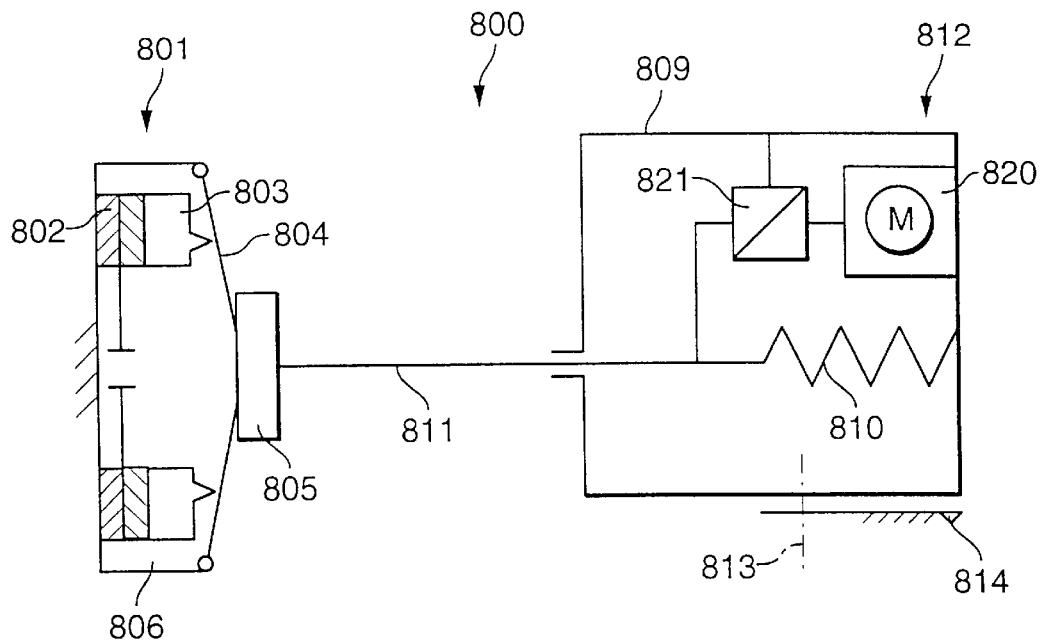
FIG. 14 is a fragmentary schematic partly elevational and partly sectional view of an automated clutch and a diagrammatic view of a modified actor which can change the condition of the clutch.

Referring to FIG. 14, there is shown a push-type automated friction cutch 801 which is installed in a power train 800 and comprises a clutch disc 802 serving to transmit torque to the input element of a transmission system (such as the system 3 in the power train of FIG. 1), a pressure plate 803 which is axially movably installed in and is rotatable with a clutch housing or cover 806, a clutch spring (such as a diaphragm spring) 804 which can maintain the clutch 801 in an at least partially engaged condition by biasing the pressure plate 803 against the adjacent set of friction linings of the clutch disc 802 (whereby the other set of friction linings of the clutch disc is pressed against the engine-driven counterpressure plate (not shown) corresponding to the flywheel 2a of the clutch 2 shown in FIG. 1), and clutch-engaging/disengaging means including a bearing 805 which can displace the radially innermost portions or tips of the resilient prongs or tongues of the spring 804 to thus maintain the clutch 801 in an at least partially engaged condition.

The purpose of an actor 812 is to move the bearing 805 axially and thus influence the bias of the clutch spring 804. This actor includes a housing 809 confining a spring 810 (e.g., a stressed coil spring) which acts upon a motion transmitting connection 811 between the actor 812 and the bearing 805. In accordance with a feature of the actor 812, the housing 809 further contains means for disengaging the clutch 801 by pulling the connection 811 away from the clutch spring 804 so that the latter can become separated from the pressure plate 803 or exerts a lesser (e.g., negligible) force upon the pressure plate 803 in order to ensure that the clutch 801 can assume a disengaged condition in which it does not influence rotation of the input element of a transmission system (3 in FIG. 1) which normally receives torque from the clutch disc 802 when the clutch 801 is caused to assume an at least partially engaged condition.

The clutch spring 804 can be designed, mounted and stressed in such a way that it normally maintains the clutch 801 in a partly engaged condition by bearing upon the pressure plate 803 with a force which suffices to maintain the plate 803 in frictional engagement with the clutch disc 802 but the components 802, 803 can slip relative to each other. The purpose of the actor 812 is then to either fully disengage the clutch 801 by causing the connection 811 to pull the bearing 805 and the latter causes the clutch spring 804 to become fully disengaged from the pressure plate 803, or to fully engage the clutch 801 by causing the spring 804 to bear upon the pressure plate 803 with a force which is required to prevent the clutch disc 802 from slipping relative to the pressure plate and/or vice versa.

The actor 812 comprises a motor 820 (e.g., an electric motor) and a transmission 821 between the motor 820 and the connection 811.

The connection 811 is stressed (axially) when the clutch 801 assumes an at least partially engaged condition because the connection 811 then urges the bearing 805 toward the pressure plate 803 so that the bearing stresses the clutch spring 804. If a coupling 813 between the housing 809 and the frame 814 or another part (such as the engine block) of the motor vehicle is disengaged or released, the actor 812 can be shifted toward or away from the clutch 801, i.e., the coupling 813 renders it possible to select the initial bias of the spring 810. Reference may be had to commonly owned pending German patent applications Serial Nos 196 23 484 and 196 27 980 (as well as to the corresponding U.S. patent(s) and/or allowed U.S. patent application(s)) which describe various embodiments of an actor which can be utilized with the clutch 801 of FIG. 14.

If the power train including the structure of FIG. 14 becomes defective or breaks down completely, e.g., due to the failure of the means for supplying electrical energy, due to the falure of the actor(s), due to the failure of the automated system(s) cooperating with the actor(s), due to the failure of one or more sensors which transmit signals to the control unit(s), due to the failure of the control unit(s) and/or for any other reason or reasons which can adversely affect the operation of the automated system(s), it is advisable to interrupt the transmission of power by the power train for reasons which were fully explained hereinbefore. The primary reason is that such remedial undertakings render it possible to advance the motor vehicle to a desired location under its own power or by resorting to another vehicle. As far as the interruption of a power train in the region of an automated clutch and the associated actor is concerned, reference may be had, for example, to the embodiment of FIGS. 7a, 7b as well as to the embodiment of FIG. 14.

As concerns various embodiments of novel power trains employing automated transmission systems with (a) uncoupled actors, (b) coupled actor(s) which initiates or initiate the selection of condition of a clutch as well as shifting into and from particular gears, (c) coupled actor(s) which initiates or initiate the selection of the condition of a clutch as well as the selection of gears for a transmission system, or (d) coupled actor(s) which initiates or initiate the selection of the condition of a clutch as well as the selection of and shifting into particular gears, there can develop problems which can be remedied or eliminated or counteracted by the simple expedient of influencing the actor or actors. On the other hand, it is also possible that a particular problem cannot be overcome or remedied or eliminated by the aforementioned expedient of influencing only the actor or actors of the power train. For example, and as already discussed hereinbefore in connection with the embodiments of FIGS. 7a, 7b, 14, it might become necesary to gain access (manually or otherwise) into a clutch in order to interrupt the transmission of power by a power train and/or to gain access into a transmission system in order to shift into a particular gear, such as neutral gear.

The following embodiments are designed to provide for a mechanical interruption of power flow in a power train including at least one clutch operating actor (reference will be had again to FIG. 14) and/or by supplying external energy for the purpose of causing the clutch to assume a disengaged condition and/or by causing a disengaged clutch to remain in such (disengaged) condition and/or by proceeding in a manner to be described with reference to FIG. 17a (namely to mechanically release energy stored in the actor for a clutch).

Certain of the above outlined embodiments of the invention exhibit additional desirable and advantageous features, such as other possible applications. For example, it is possible to carry out an initial adjustment or setting of an actor for an automated clutch and/or to interrupt the connection between a clutch engaging or disengaging member (such as a fork) and a clutch engaging or disengaging shaft or rod in order to ensure an uninterrupted engagement of the clutch for the duration of travel or transport of an affected motor vehicle to a selected destination (FIG. 14).

Referring again to FIG. 14, the automated clutch 801 can be installed in series with an automated transmission system (such as the system 3 in the power train of FIG. 1) which can be actuated by its own actor (such as the actor 8 in FIG. 1). If the actor or actors for the automated transmission system become defective, it is necessary to fully disengage the clutch 801; this is carried out by the actor 812. The power train of the motor vehicle is then interrupted and the vehicle can be towed away. On the other hand, if the actor 812 happens to become defective, the actor or actors for the transmission system can be operated to shift the transmission system into neutral gear, again for the purpose of interrupting the power train and of thus enabling a towing vehicle to advance the affected vehicle to a selected destination. An exception is that situation which develops when the power train is stressed to such an extent that it is not possible to shift the transmission system into neutral gear. Such situation can develop when the teeth of the axially movable sleeve in the synchronizing system cannot be disengaged from the teeth of a gear ratio selecting sprocket so that the transmission system cannot be shifted into neutral gear.

As described, for example, in German patent application Serial No. 196 27 980, certain emergency situations can develop in automated transmission systems with means for selecting as well as shifting into and from particular gears when the source of electrical energy is exhausted or in the event of a disruption of the connection between such source and the actor(s) for the transmission system and/or the control unit for the actor(s). Still further, an emergency situation can develop when the actor(s) for the automated transmission system becomes or become defective simultaneously with the actor(s) for the automated clutch and/or when the clutch actuating connection(s) becomes or become defective jointly with the gear shifting mechanism and/or when the control unit(s) fails or fail to detect the defectiveness of one or more actors and/or one or more connections between the actor(s) and the respective system or systems.

If the transmission system in the power train of a motor vehicle is automated, i.e., if it is operated by one or more actors, not only as regards the selection but also as regards the shifting into or from a particular gear, a failure of the actor(s) for such transmission system prevents the carrying out of any undertakings for the purpose of facilitating the transport of the affected motor vehicle to a desired location. For example, such emergency situations can develop as a result of the failure of the source of electrical energy and/or of the connection between such source and the actor or actors for the automated transmission system or between such source and the control unit, in response to the failure of the actor(s) for the clutch and/or for the transmission system and/or in response to the failure of the connection(s) between an actor and the respective system.

If the power train comprises an automated transmission system and one or more actors therefor, failure of the actor(s) for the clutch and for the selection of and/or shifting into or from a particular gear can be counteracted by causing the actor for an automated clutch to disengage the clutch and to thus permit a towing vehicle to move the affected vehicle to a desired location. Alternatively, if the actor or actors for the automated clutch and for the selection of a gear become defective, the person in charge can shift the transmission system into neutral gear in order to establish circumstances which are required for a towing of the vehicle. If the actor(s) for the clutch and for the transmission system becomes or become defective during selection of a gear, the transmission system is already in neutral gear. As concerns the interruption of the power train, an automated transmission system and the associated actor(s) behave not unlike a non-coupled actor and need not be discussed separately.

As disclosed in the aforementioned German patent application Serial No. 196 27 980, if the actor(s) for the automated clutch of a motor vehicle is or are provided in a power train which further comprises an automated transmission system with mechanical transfer elements, it is possible to install an additional mechanism which is manipulated by hand by resorting to an implement in order to interrupt the power flow between the clutch and the respective actor(s) and/or disengages the clutch and fixes the clutch in the disengaged condition.

Figure 15:
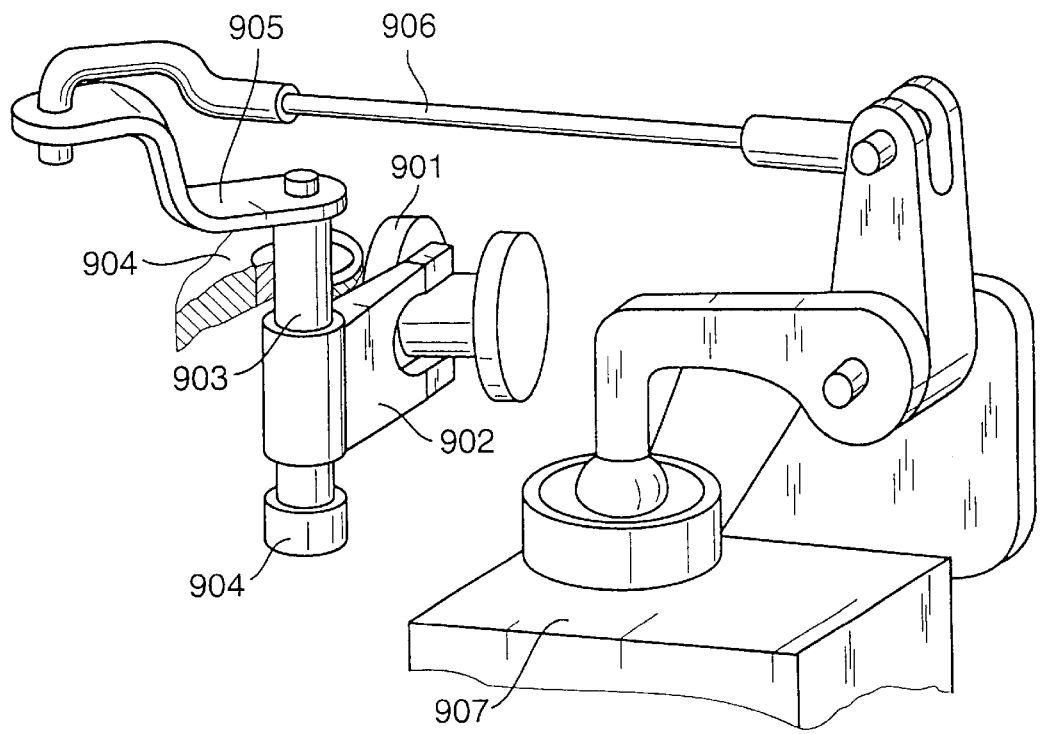
FIG. 15 is a perspective view of a connection between the output element of an actor and the input element of an automated clutch.

FIG. 15 shows a mechanical connection between an actor 907 and an engaging/disengaging bearing 901 for an automated clutch. The bearing 901 can be acted upon by an input element in the form of a fork 902 mounted on a rockable shaft 903 which is journalled in bearings installed in the case 904 of a transmission system. The connection comprises a lever 905 which is affixed to one end portion of the shaft 903 and is attached to an output element of the actor 907 by a motion transmitting member (e.g., rod) 906 of preferably adjustable length. The output element of the actor 907 can change the angular position of the shaft 903 and of the fork 902, and hence the axial position of the bearing 901, i.e., the condition of the friction clutch.

The following passages of this specification will deal with various emergency steps which can be carried out in the event of a malfunctioning or complete breakdown of a power train. Thus, a mechanical intervention in the event of an emergency can take place at the shaft 903, at the lever 905 (which is rigid with the shaft 903) or at the motion transmitting member 906 between the output element of the actor 907 and the lever 905 or between the shaft 903 and the fork 902.

Figure 16:
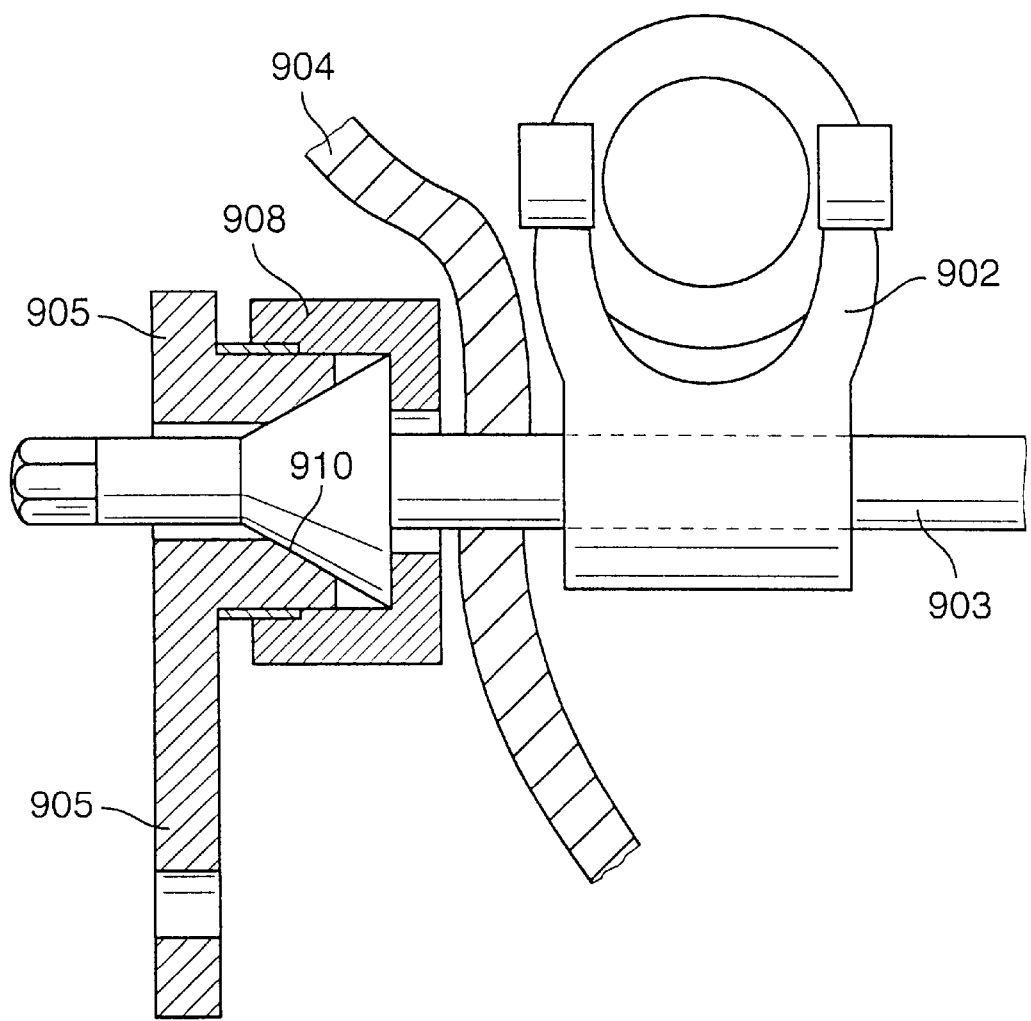
FIG. 16 shows a separable coupling between certain parts of the connection which is shown in FIG. 15.

FIG. 16 shows that the lever 905 and the shaft 903 for the fork 902 are separably coupled to each other by a connection which can be established and terminated by a coupling or actuating element in the form of an internally threaded cap 908 normally meshing with an externally threaded projection of the lever 905. The shaft 903 includes a frustoconical connecting or coupling portion 910 which bears against the conical surface in a conical socket of the aforementioned projection of the lever 905 when the actuating or coupling element 908 is tightened. The shaft 903 and the lever 905 are then in frictional engagement with each other, and such engagement suffices to ensure that the lever 905 can change the angular position of the shaft 903 and fork 902 (i.e., the axial position of the bearing 901) when the actor 907 of FIG. 15 is to select a different condition of the clutch including the bearing 901.

It is clear tha the conical portion 910 can be provided with ribs, teeth or analogous projections extending into complementary recesses of the lever 905 to establish a form-locking connection between the lever 905 and the shaft 903, i.e., to even more reliably ensure accurate and predictable adjustments of the friction clutch in response to pivoting of the lever 905 by the motion transmitting element 906 and the output element of the actor 907 shown in FIG. 15.

If the connection including the parts 903, 905, 906, 908 of FIGS. 15–16 is to be interrupted, the element 908 is loosened so that the lever 905 and the shaft 903 can turn relative to each other. An implement, e.g., a wheel changing wrench, is thereupon caused to engage the profiled left-hand end portion of the shaft 903 (as viewed in FIG. 16) to turn the shaft 903 until the clutch including the bearing 901 assumes a fully disengaged condition. The lever 905 is then moved to an angular position in which, upon reattachment of this lever to the shaft 903 by the element 908, the clutch remains in the disengaged condition to thus ensure that the vehicle can be towed to a selected location.

In order to support the lever 905 in the disengaged condition of the clutch, one can proceed as follows: If the connection between the actor 907 and the shaft 903 is mechanically stable and self-locking, the motion transmitting member 906 suffices to ensure retention of the clutch in the disengaged condition. On the other hand, if the mechanical connection is defective (e.g., the member 906 can be replaced with a cable which can become defective, namely weaker than required), or if the connection between the actor 907 and the clutch is not self-locking, the lever 905 can be propped against a stable part, e.g., against the case 904 of the transmission system.

An established connection can be secured by self-locking action or by a discrete locking element, e.g., by a piece of sheet metal. Furthermore, the self-locking or other type of locking of a connection can establish the initial positions of the parts forming the connection. Moreover, and as already pointed out above, an interruption of connection (such as that shown at 908 between the shaft 903 and the lever 905 of FIG. 16) can be resorted to for the purpose of selecting the condition of the clutch (such as a fully disengaged condition) during the entire interval of time which is required to tow a disabled vehicle to a selected locale, e.g., to a repair shop.

Figure 16A:
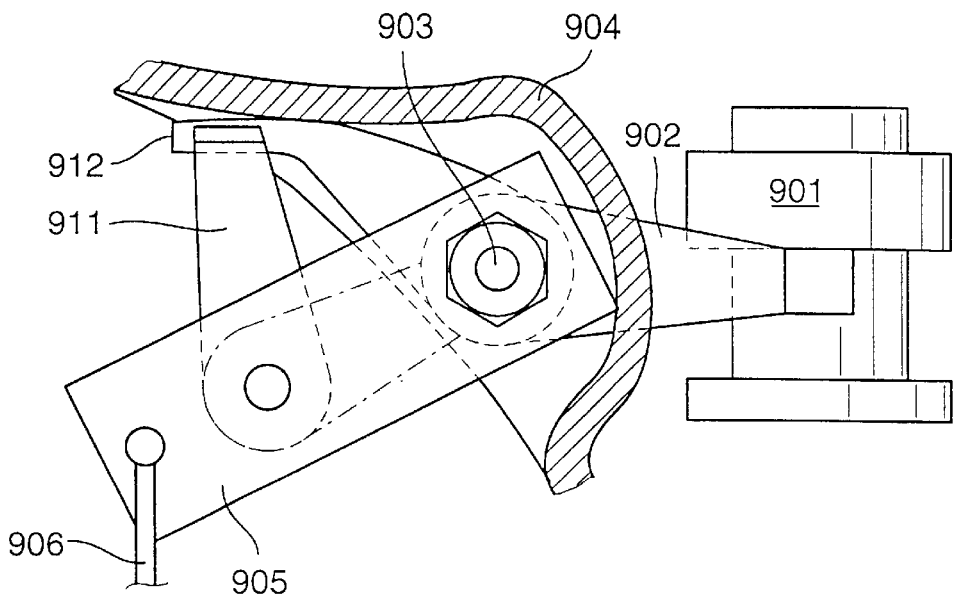
FIG. 16a illustrates a modification of the structure which is shown in FIGS. 15 and 16.

The connection which is shown in FIG. 16a and is established between the lever 905 and the actor (not shown) via cable, rod or an analogous motion transmitting part 906 is designed to enable the lever 905 to pivot in a direction to place the clutch (via bearing 901) into a fully disengaged condition. By engaging the polygonal (profiled) end portion of the shaft 903 with a suitable tool, and by thereupon changing the angular position of the shaft, one can change the condition of the clutch from a fully engaged condition, through a series of partly engaged conditions, and to a fully disengaged condition. The lever 905 carries a pivotable brace or link or stop 911 which is thereupon caused to engage the transmission case 904 and to thus lock the clutch in the fully disengaged condition. In order to fix the brace 911 in the solid-line position of FIG. 16a, the case 904 can carry a suitable retainer or catch 912 to engage and hold the free end of the part 911 until a person in charge decides to unlock the shaft 903, i.e., to again permit the clutch to assume a partly or fully engaged condition. It is also possible to secure the brace 911 to the case 904 by one or more screws or other suitable fasteners.

Figure 16B:
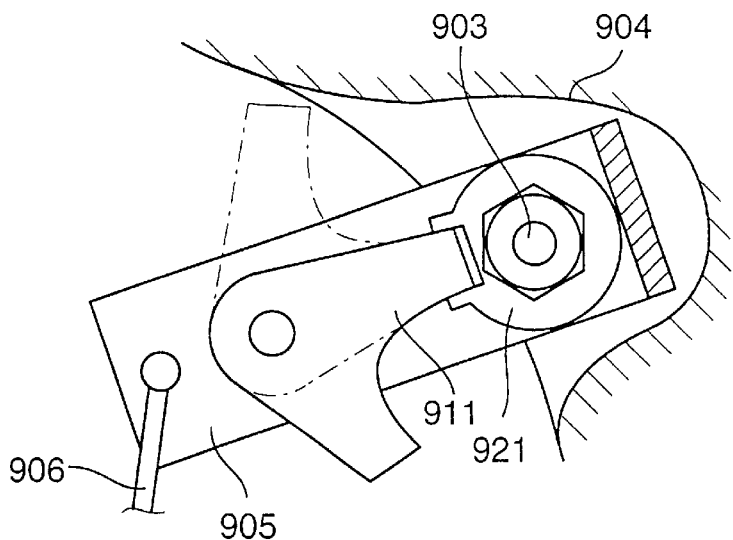
Figure 16C:
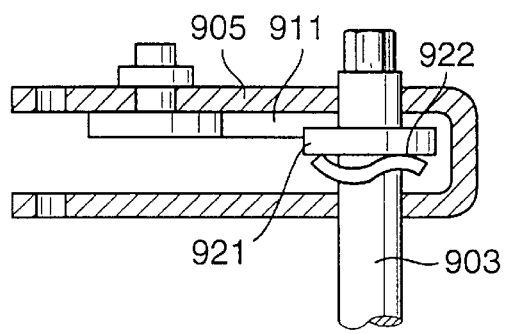
FIG. 16c is a sectional view of the structure which is shown in FIG. 16b.

It is advisable to provide stops or locks for the two end positions of the lever 905. FIGS. 16b and 16c show one presently preferred mode of designing and installing such locks or stops. There is shown an annular retainer 921 which is biased by a corrugated spring 922 to engage the adjacent end portion of the brace 911 and hold it in the inoperative position, i.e., out of contact with the transmission case 904. If an implement is caused to engage the profiled end portion of the shaft 903 and to push this shaft downwardly (as viewed in FIG. 16c) against the resistance of the corrugated spring 922, the retainer 921 is disengaged from the lever 905 and the shaft 903 can be turned to a position corresponding to the desired condition of the clutch. Moreover, the brace 911 is free to be pivoted to the phantom-line position of FIG. 16b and to engage the transmission case 904 to thus lock the lever 905 in the desired angular position.

The brace 911 of FIGS. 16a to 16c can be moved between two end positions. On the other hand, FIG. 17a shows a part 1009 and FIG. 17b shows a threaded element 1056 each of which can be resorted to in order to maintain a part corresponding to the lever 905 in any one of a desired number of different positions. However, the elements 1009 and 1056 do not serve to transmit motion but merely to fix a part corresponding to the lever 905 in a desired position.

Figure 17A:
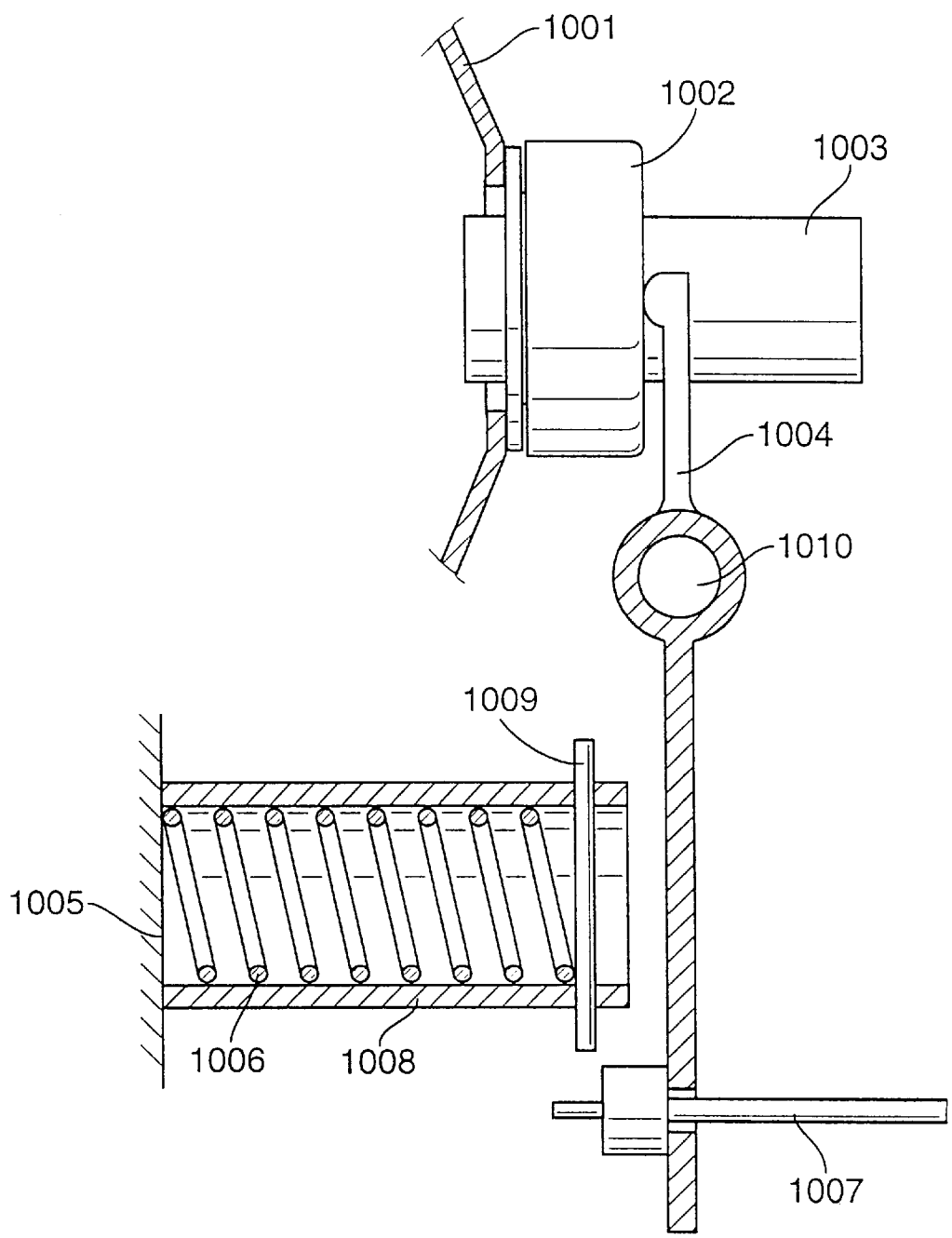
FIG. 17a is a fragmentary partly elevational and partly sectional view of another connection between an actor and an automated clutch.
Figure 17B:
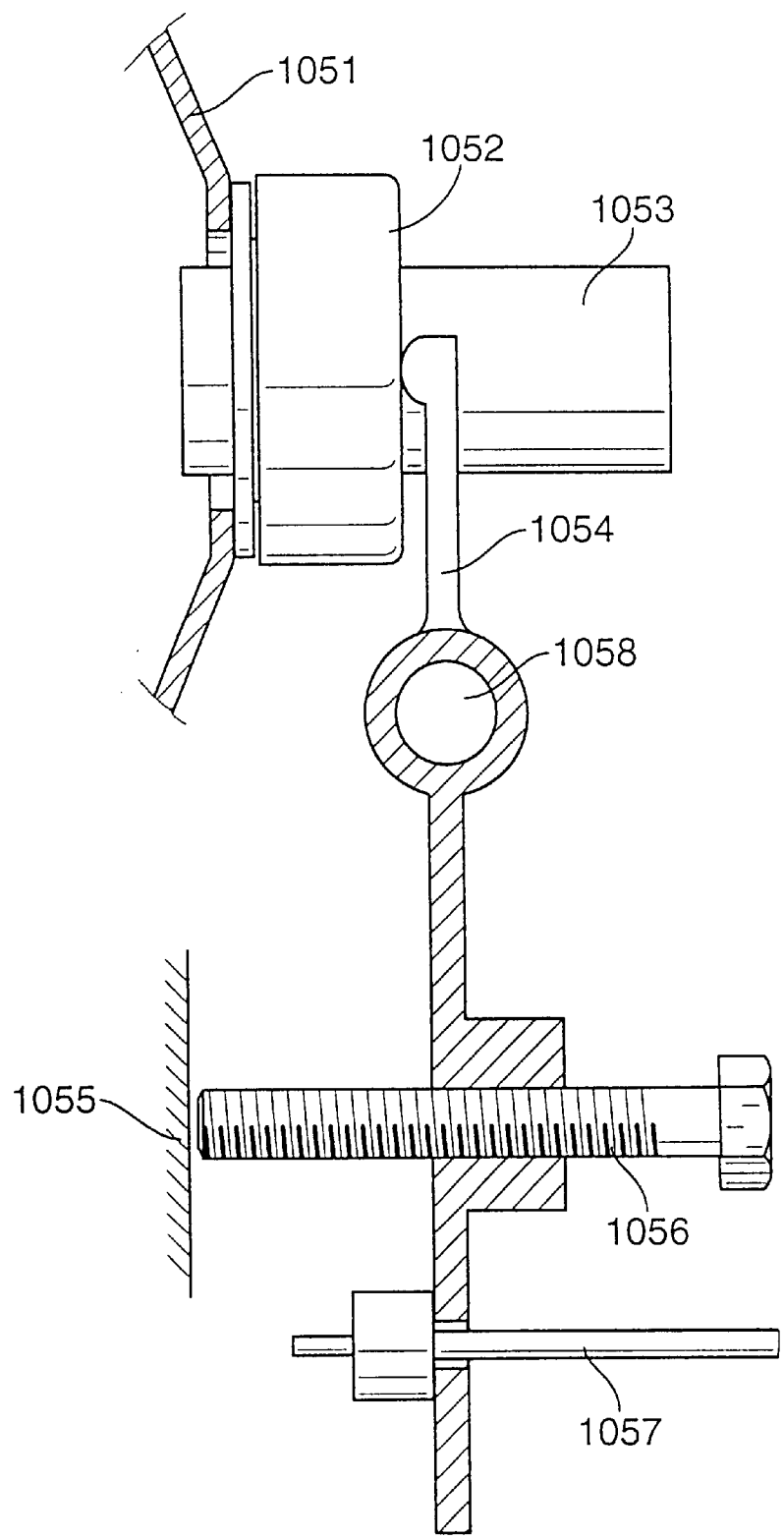

Referring to FIG. 17a, there is shown a portion of an automated clutch, namely a set of prongs or tongues 1001 forming part of a diaphragm spring in a friction clutch, and a disengaging element 1002 (e.g., a bearing) which is movable along a guide 1003 to displace the radially inner portions of the prongs 1001 to a desired extent, depending upon the selected or desired condition of the clutch. A disengaging lever 1004 (corresponding to the member 9 shown in FIG. 1) is pivotable at 1010 by way of a cable 1007. Depression of the radially inner portions of the prongs 1001 entails a change of the condition of the clutch toward the disengaged condition.

FIG. 17a further shows the case 1005 of a transmission system; this case carries a tubular casing or enclosure 1008 for a coil spring 1006. A diametrically extending pin 1009 is mounted in the enclosure 1008 to maintain the spring 1006 in an axially stressed condition, i.e., the spring 1006 stores energy when the pin 1009 is in place. The amount of energy which is stored by the stressed spring 1006 exceeds the amount of energy which is necessary to disengage the clutch (including the prongs 1001 of the diaphragm spring) via lever 1004. Thus, if the pin 1009 is withdrawn from the casing 1008, the expanding spring 1006 turns the lever 1004 counterclockwise (as viewed in FIG. 17a) and thus causes the shorter arm of the lever 1004 to disengage the clutch via bearing 1002.

A cable 1007 is connected to the longer arm of the lever 1004; this cable is further connected with or forms part of the output element of an actor for the automated clutch including the parts 1001, 1002. When the output element (1007) of the actor for the clutch is at a standstill but the lever 1004 is pivoted by the spring 1006, the cable 1007 is not under tension.

The spring 1006 can be used alone, or it can be utilized jointly with or it can be replaced by a spring of the type shown at 810 in FIG. 14.

FIG. 17b shows the structure of FIG. 17a except that the parts 1006, 1008, 1009 are replaced with an elongated externally threaded element 1056 meshing with the longer arm of the lever 1054 and being rotatable to move its tip against the transmission case 1055 to thereupon begin to pivot the lever 1054 (as at 1058) in a direction (counterclockwise) to shift a disengaging bearing 1052 alog its guide 1053 and to thus cause the diaphragm spring including the prongs 1051 to ensure that the clutch assumes its disengaged condition in which the vehicle can be towed away.

The externally threaded element 1056 has a polygonal head which can be engaged by a wrench, by a crank for bolts which secure the hubs of vehicle wheels to the respective axles, or by a power-operated implement. The cable 1057 of FIG. 17b performs the same function as the cable 1007 in the structure of FIG. 17a. This cable (1057) is not stressed when the lever 1054 is pivoted by the rotating element 1056 in cooperation with the transmission case 1055.

FIGS. 18, 19, 20a and 20b illustrate modified designs of the means for disengaging an automated clutch (by an axially movable bearing 1101) in the event of a malfunction in order to enable a towing vehicle to advance the disabled vehicle to a desired location. A lever 1105 can be pivoted at 1103 in order to shift the bearing 1101 along its guide by way of a lever 1102 on the lever 1105. A pivot member 1114 on the lever 1105 is rigid with a disc cam 1109 which can be turned about the axis of the member 1114 by resorting to an implement which is to be manipulated by the operator of the vehicle or by another person in order to engage and turn the hexagonal (or otherwise profiled) head of the member 1114.

Figure 18:
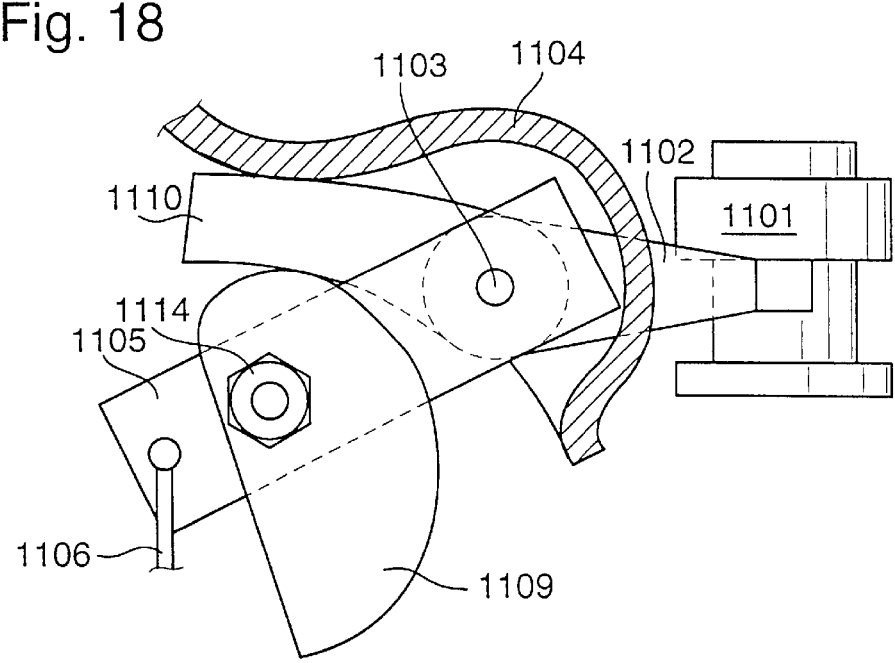
FIG. 18 is a fragmentary partly elevational and partly sectional view of still another connection between an actor and an automated clutch.

When the member 1114 is actuated to turn the disc cam 1109, the latter acts upon an anvil 1110 which abuts the transmission case 1104, and the lever 1105 is pivoted relative to the transmission case 1104 (as at 1103) to move the lever 1102 upwardly, as viewed in FIG. 18, and to disengage the clutch via bearing 1101.

The cable 1106 of FIG. 18 constitutes or cooperates with the output element of an actor to normally change the condition of the automated clutch by pivoting the lever 1105 at 1103 (when necessary). The clutch is disengaged by the lever 1105 in response to manual rotation of the cam 1109 by way of the pivot member 1114 in the event of a malfunction, e.g., when the actor including or cooperating with the cable 1106 is incapable of disengaging the clutch by way of such cable.

The clutch can be maintained in the disengaged condition by self-locking action between the parts 1101 to 1103, 1105, 1109 and 1114, e.g., by mounting the cam 1109 in such a way that it is locked in an end position corresponding to the disengaged condition of the clutch or in any other desired condition of the clutch including or being acted upon by the bearing 1101.

Figure 19:
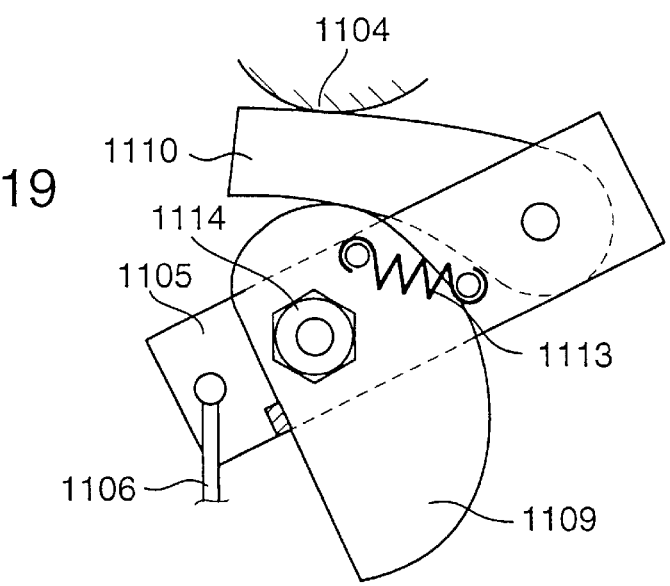
FIG. 19 illustrates a first modification of the structure which is shown in FIG. 18.

Alternatively, and as shown in FIG. 19, the locking of the clutch in its disengaged condition can be effected or assisted by a spring 1113 which urges a lobe of the cam 1109 against the anvil 1110 so that the latter bears against the transmission case 1104 while the cam 1109 assumes an angular position beyond its dead-center position. Still further, it is possible to employ a detent or safety device 1111 which is shown in FIG. 20a and is biased by a corrugated spring 1112 (reference may be had to the description of FIGS. 16b and 16c).

Figure 20A:
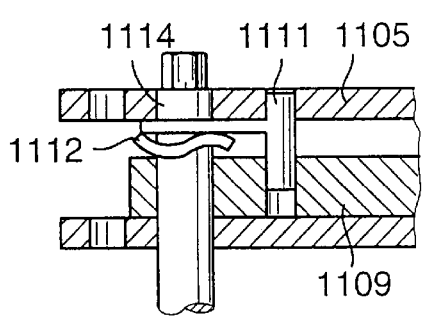
FIG. 20a illustrates a second modification of the structure which is shown in FIG. 18.
Figure 20B:
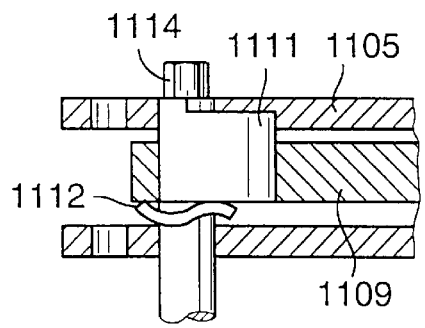
FIG. 20b illustrates a third modification of the structure which is shown in FIG. 18.

FIG. 20b shows a modification of the structure of FIG. 20a. Thus, the corrugated spring 1112 is installed to bias the cam 1109 and the safety device 1111 against the lever 1105. A turning of the cam 1109 can take place in response to engagement of the profiled end portion of the pivot member 1114 by a suitable implement, by thereupon moving the member 1114 axially to stress the spring 1112, and by thereafter turning the member 1114 and the lever 1105 until the clutch reaches; and assumes its disengaged condition.

It is preferred to provide means for locking the cam 1109 against rotation when the operation of the power train is normal, i.e., when the actor can change the condition of the clutch (by way of the bearing 1101) by pulling the cable 1106 or an equivalent motion transmitting part. The cam 1109 can be locked in a manner as shown in FIG. 19, 20a or 20b, i.e., by resilient means (1113 or 1112) and/or by rigid locking or blocking or arresting means of any suitable design.

Figure 21:
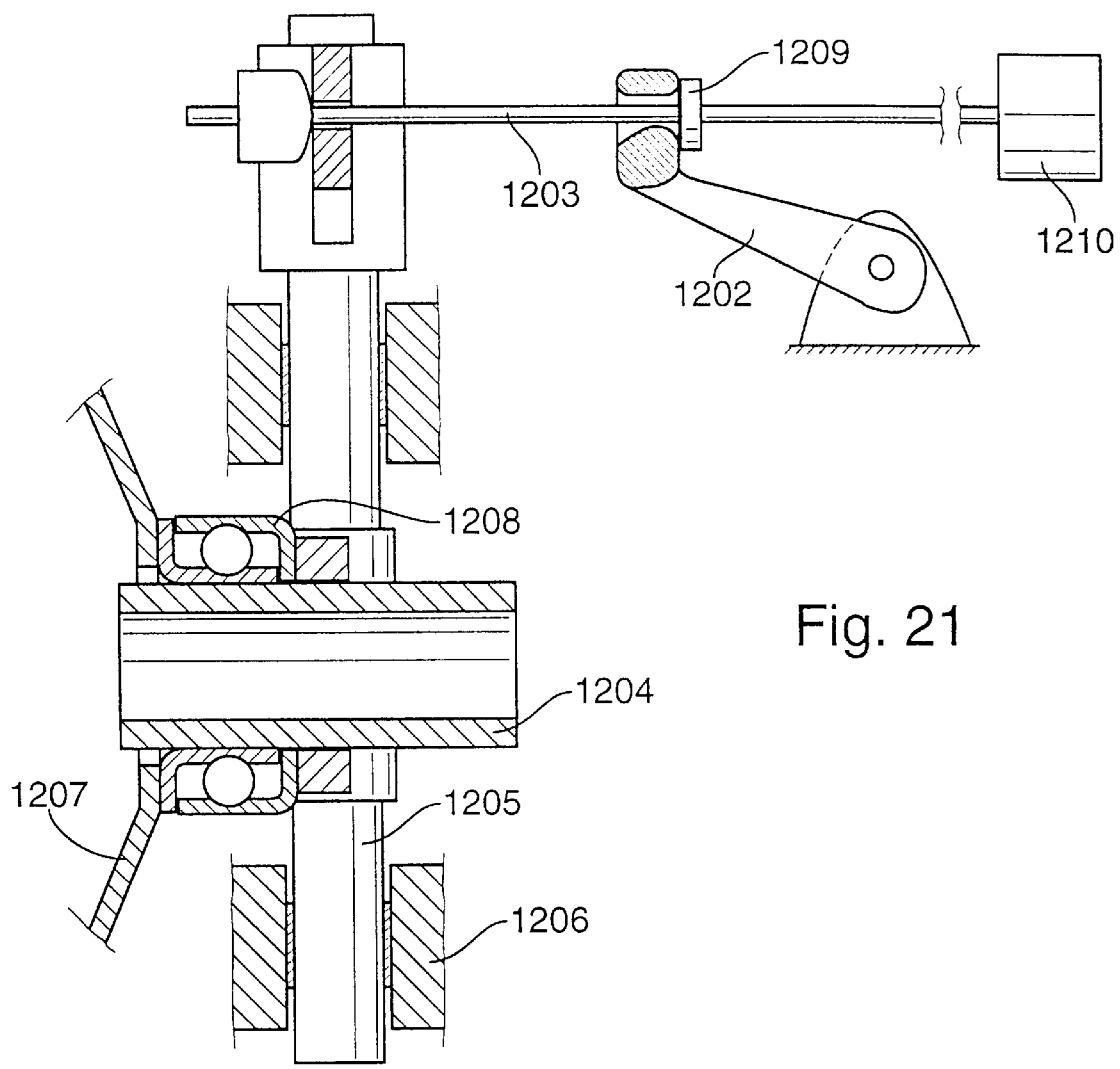
FIG. 21 is a fragmentary partly elevational and partly sectional view of another connection between an actor and an automated clutch.
Figure 21A:
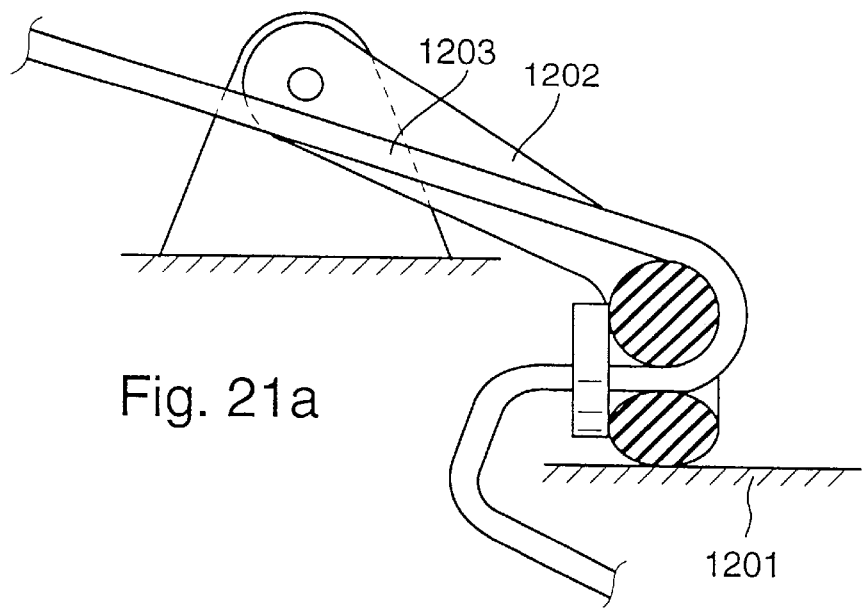
FIG. 21a illustrates a detail in the structure of FIG. 1 showing certain parts in positions they assume subsequent to a manual influencing of the connection between the actor and the clutch.

FIGS. 21 and 21a illustrate the manner of influencing a mechanical output element of an actor 1210 for a clutch including a diaphragm spring 1207 tiltable by a disengaging bearing 1208. The latter is movable along a guide 1204, either in response to the bias of the diaphragm spring 1207 or in response to pivoting of a lever 1200 mounted on a shaft 1205 which is journalled in the case 1206 of a transmission system and is turnable relative to the case 1206 by a cable 1203 constituting or connected to the output element of the actor 1210.

If the actor 1210 is defective so that it cannot change the condition of the clutch, such condition can be changed by a lever 1202 which can be pivoted (by hand or otherwise) to engage and entrain an abutment 1209 on the cable 1203. The lever 1202 can be pivotably mounted on the actor 1210, on the transmission case 1206 or elsewhere in the motor vehicle. A stop 1201 (FIG. 21a) on the transmission case 1206 limits the extent of displacement of the cable 1203 by the lever 1202. Thus, when the abutment 1209 strikes the stop 1201, the clutch is disengaged and the actor 1210 cannot influence the cable 1203.

The lever 1202 assumes an over-the-dead center position when the abutment 1209 reaches the stop 1201; this ensures that the lever 1202 is locked in such position to thereby reliably hold the clutch in the disengaged condition, e.g., during the time interval which is needed or anticipated to be necessary in order to tow the affected vehicle to a repair shop or to another destination.

Each of FIGS. 22, 23, 23a and 23b illustrates a composite clutch disengaging lever. A first part 1305 of the lever is rigidly connected with a shaft 1303, and a second part 1315 is provided with a bearing which can be coaxial with the shaft 1303. If the second part 1315 is pivoted by the output element of an actor for the clutch (such as by a cable 1306), an activating element 1316 transmits motion to the part 1305. Inversely, the element 1316 can serve to transmit motion from the part 1305 to the part 1315.

The illustrated element 1316 is an elongated externally threaded element, and this element can be rotated to pivot the part 1305 relative to the part 1315 in order to thus disengage the clutch by way of a fork 1302 and a disengaging bearing 1301. The parts 1303, 1305, 1315, 1316 are mounted in or on the case 1304 of a transmission system. The part 1305 of the composite lever 1305, 1315 can turn the shaft 1303, and the latter can turn the fork 1302 to thus move the bearing 1301 against the prongs or tongues (not shown) of a diaphragm spring in the automated friction clutch.

Figure 22:
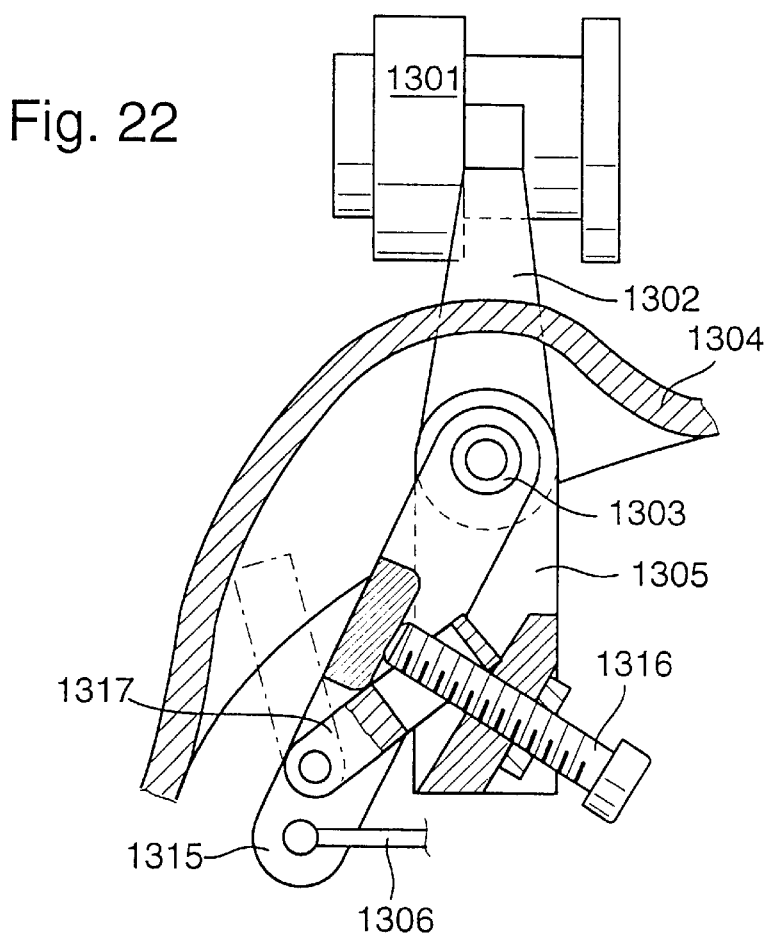
FIG. 22 is a partly elevational and partly sectional view of still another connection between an actor and an automated clutch in the power train of a motor vehicle.

The components which are shown in FIG. 22 can be fixedly held in their selected positions by a rigid output element (as a substitute for the cable 1306) of the actor, especially if such components are to establish a self-locking action.

If the actor is damaged (e.g., if the cable 1306 is destroyed, either in part or entirely), or if the motion transmitting connection between the actor and the clutch does not include any self-locking structure, the part 1315 of the composite lever 1305, 1315 can be braced (by a member 1317) against the transmission case 1304.

The threaded element 1316 can be replaced with a rotary cam to pivot the part 1305 relative to the part 1315 in the event of a malfunction in order to cause the clutch to assume and to remain in its inoperative (or other selected) condition. Furthermore, the element 1316 or the aforementioned cam can be replaced with a wedge.

If the part 1315 of the composite lever 1305, 1315 is to be propped against the transmission case 1304, the threaded element 1316 must have a considerable length. Therefore, and in order to be in a position to employ a relatively short element 1316, it is often advisable to provide a bracing or propping member 1317 which is pivotally connected to the part 1315 of the composite lever 1305, 1315 and is pivotable into and away from abutment with the transmission case 1304. In the absence of a defect, the bracing member 1317 can be non-movably secured to the part 1315 of the composite lever.

The threaded element 1316 can further serve as a means for initial setting of the actor including or connected with the cable 1306. Still further, it is possible to retract or to completely detach the element 1316 in order to enable the clutch including the bearing 1301 to assume a fully engaged condition if such condition is required to ensure that the affected motor vehicle can reach a selected destination under its own power or with assistance from a towing vehicle.

Figure 23:
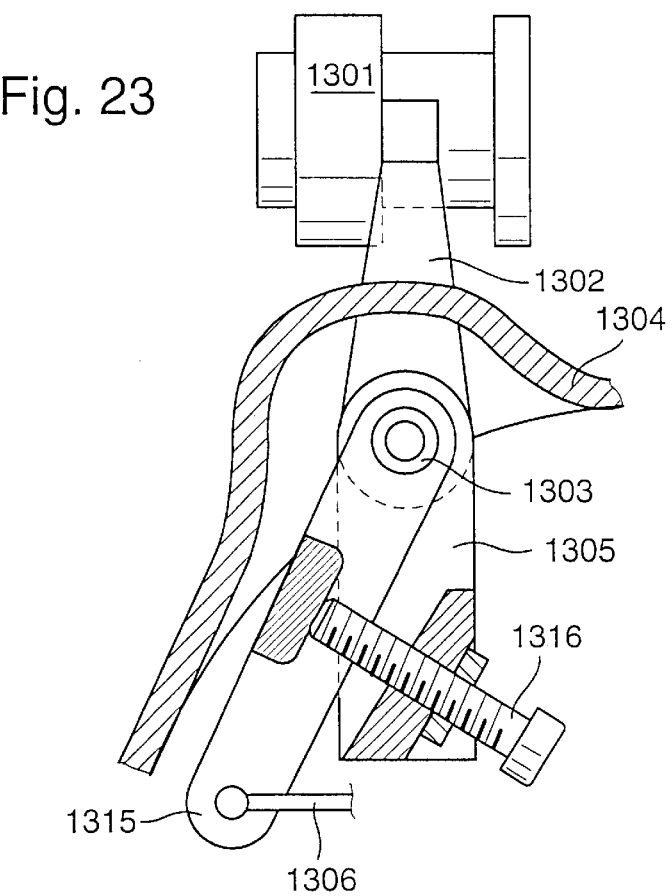
FIG. 23 illustrates a first modification of the structure which is shown in FIG. 22.

FIG. 23 shows that the bracing member 1317 can be omitted; its function can be taken over by the part 1315 and the element 1316.

Figure 23A:
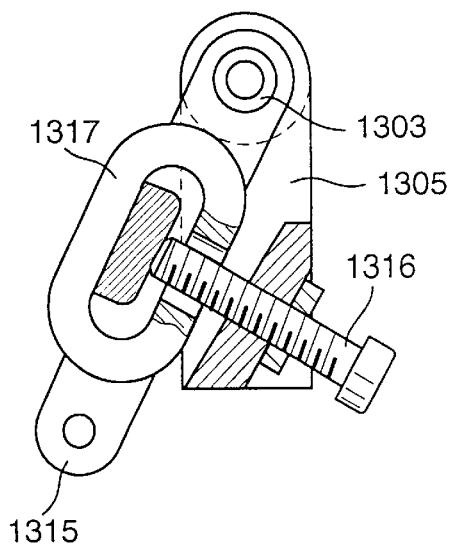
FIG. 23a illustrates a second modification of the structure which is shown in FIG. 22.
Figure 23B:
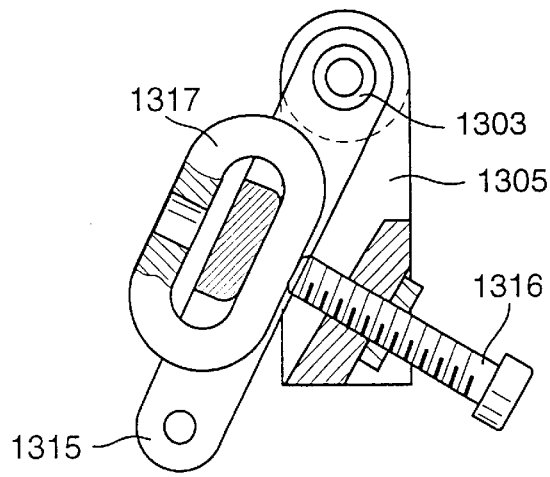
FIG. 23b illustrates a third modification of the structure which is shown in FIG. 22.

FIGS. 23a, 23b show two different bracing members 1317. In FIG. 23a, the member 1317 is movably mounted on the part 1315 and is traversed by the element 1316 so that the latter can act directly upon the part 1315. In FIG. 23b, the member 1317 is movably mounted on the part 1315 and is engageable and movable by the tip of the element 1316.

Figure 24:
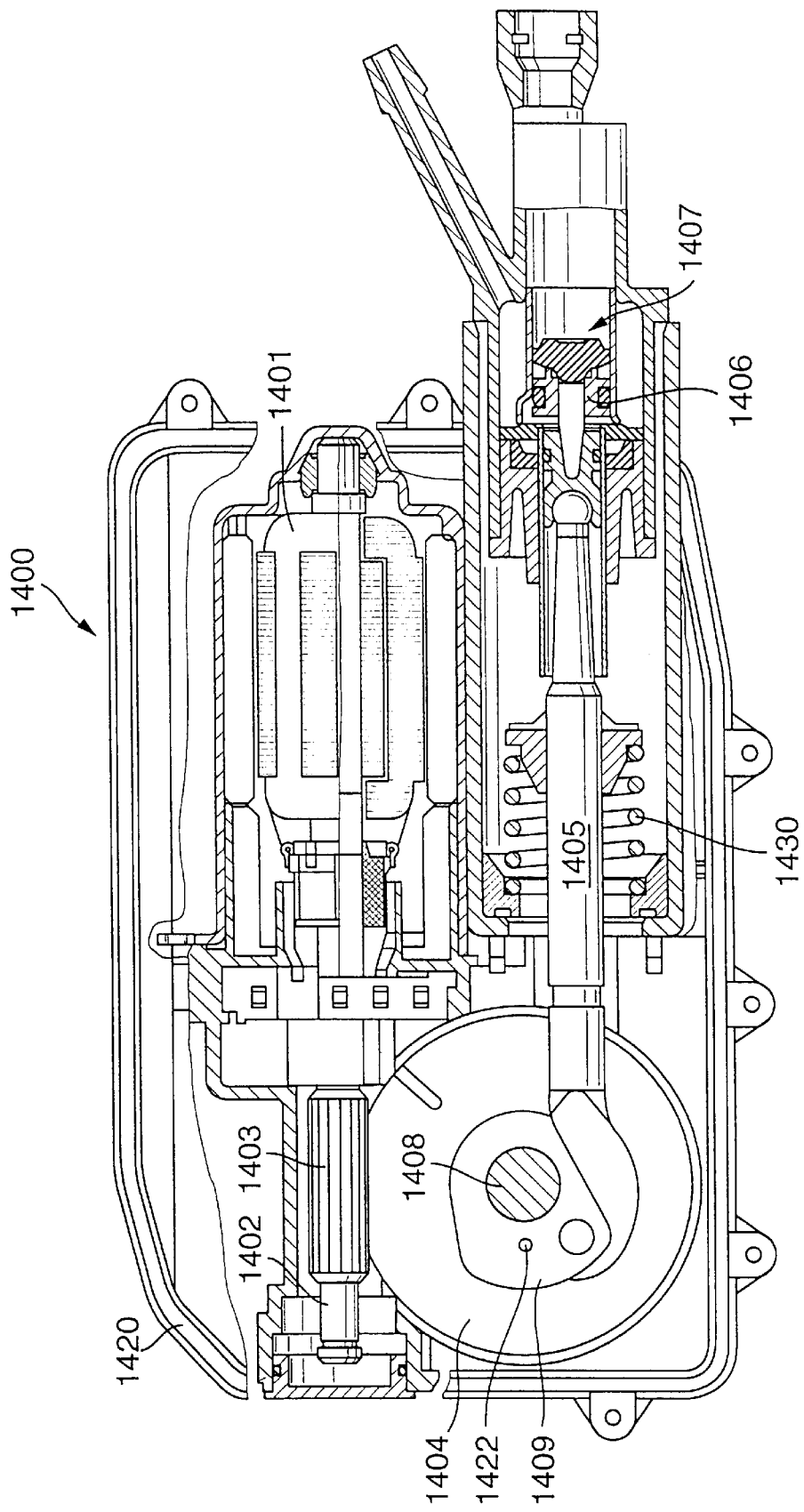
FIG. 24 is a sectional view of an actor having an electric motor which can be coupled to at least one automated system by at least one fluid-operated connection.
Figure 25:
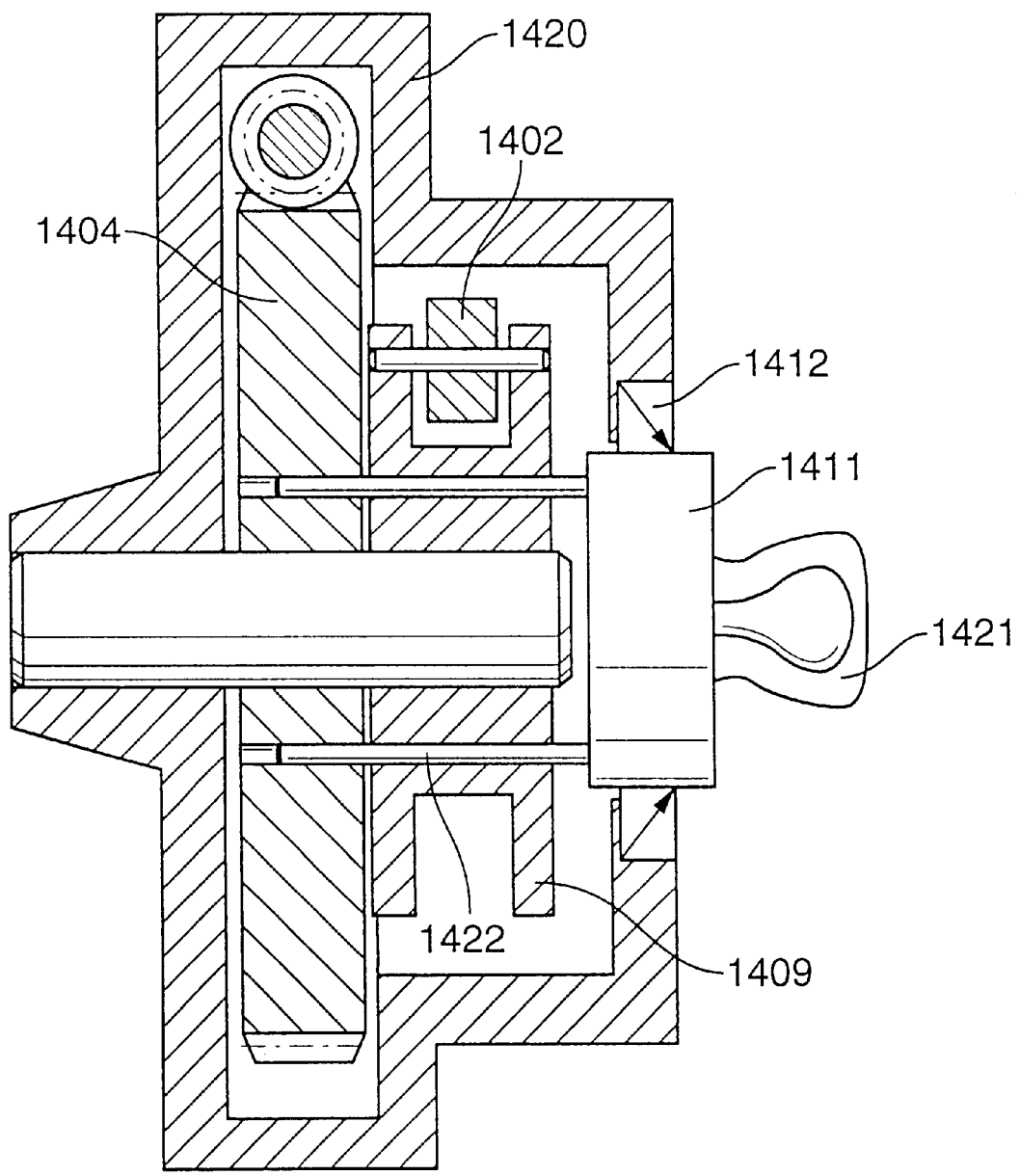
FIG. 25 is an enlarged sectional view of a detail in the actor of FIG. 24.

FIGS. 24 and 25 show an actor 1400 and a fluid-operated (hydrostatic) connection between such actor and the respective (torque transmitting or transmission) system. The connection can comprise a hydraulic master cylinder, a slave cylinder and a fluid-conveying conduit between the two cylinders. If the illustrated actor 1400 is associated with an automated clutch, the latter can be disengaged in response to dissipation of energy by a compensating spring in the actor. Such compensating spring must be designed in such a way that the energy which the spring can store suffices to disengage the clutch. The compensating spring can act (directly or indirectly) upon the piston of the aforementioned master cylinder.

The actor 1400 can be provided with a manually operable mechanism to terminate or interrupt the connection between a gearing of the actor and the compensating spring so that the movement-impeding effect of the gearing (when the actor is idle) is eliminated or overcome and the energy which was stored by the compensating spring can be dissipated to thus disengage the clutch.

Referring more specifically to the actor 1400 of FIG. 24, this actor comprises a driving unit (e.g., an electric motor) 1401 having an output shaft 1402 which is coaxial and can be of one piece with a worm 1403 mating with a worm wheel 1404. The latter is coupled with a pusher 1405 which can be connected with the piston 1406 of a master cylinder 1407. The shaft 1408 of the worm wheel 1404 mounts a crankshaft 1409 which is separably coupled thereto by entraining elements 1422 (see FIG. 25). The entraining elements 1422 are mounted on a disc-shaped carrier 1411 which is movable by hand in the axial direction of the elements 1422 to thus connect the crankshaft 1409 to or to disconnect the crankshaft from te worm wheel 1404. The carrier 1411 is provided with a suitable handle 1421.

The carrier 1411 is sealingly mounted in a bearing or sealing element 1412 of the housing 1420 of the actor 1400. The character 1430 denotes the aforementioned compensating spring which is free to dissipate stored energy and to thus cause the clutch to assume a desired (such as disengaged) condition as soon as the handle 1421 is pulled to extract the entraining elements 1422 and to thus allow the worm wheel 1404 and the crankshaft 1409 to move relative to each other. This terminates the blocking or self-locking effect of the worm gearing 1403, 1404 upon the connection between the output element 1402 of the driving unit 1401 and the input element of the clutch so that the latter can be influenced by the compensating spring 1430.

It is also possible to employ a single actor for a transmission system and a torque transmitting system, i.e., a single actor can suffice to select the condition of a clutch as well as to select and/or to effect the shifting of a transmission system into or from a particular gear. In the range within which the actor 1400 actuates the clutch, the compensating spring 1430 can be employed in the aforedescribed manner to dissipate energy and to disengage the clutch in the event of an emergency, i.e., in response to extraction of the entraining elements 1422 by the carrier 1411 and handle 1421. On the other hand, when the actor operates within another range to control a transmission system, the clutch can be operated (such as disengaged), for example, by mechanical means such as one or more disc cams or the like. If the actor is set up to simultaneously operate an automated clutch and an automated transmission system, the effect of the compensating spring 1430 can be extended to cover the range within which the actor controls the selection and shifting of the transmission system into or from a selected gear. For example, the compensating spring 1430 can serve to automatically shift the transmission system into neutral gear when the carrier 1411 and its entraining elements 1422 are withdrawn by way of the handle 1421.

The following is a list of additional foreign patent applications which, if necessary, can be referred to for an even more complete understanding of the present invention and the disclosures of which (if contained in corresponding granted U.S. patents and/or allowed U.S. patent applications) are to be considered as having been incorporated herein by reference:

PCT/DE Serial No. 95/01861.

German patent applications Serial Nos. 196 37 001, 196 36 005, 196 22 572, 196 02 421, 195 47 082, 196 22 643, 196 09 924, 196 02 874, 196 09 957, 196 11 147, 196 31 726, 196 16 055, 196 45 358, 196 22 641, 196 21 106, 196 24 008, 196 25 950, 196 32 946, 196 29 969, 196 28 199, 42 39 289, 196 21 123 and 196 08 454.

Whenever the preceding specification and/or the claims refer to a connection which can be separated or interrupted and reestablished, once or more than once (reference may be had, for example, to the embodiment which is shown in FIG. 5e and wherein the bolt 305 and the cotter pin 360 can be separated and reassembled to allow for repeated separation of the elements 301, 302 from and their reattachment to each other), this is not intended to embrace a connection which can be interrupted by permitting a fluid (such as oil) to escape from a conduit connecting an output element with an input element. The reason is that such fluid-operated connection cannot be reestablished by the simple expedient of resealing the conduit in order to prevent further escape of fluid from the connection; for example, the connection might not be capable of being reestablished due to excessive losses of fluid or as a result of penetration of atmospheric air into the interrupted connection. In many instances, and as fully described hereinbefore, separable and reestablishable connections which are contemplated in accordance wit the present invention are to be established between mechanical parts in the form of links, levers, rods, discs or the like, and the connections themselves, too, can include mechanical parts in the form of screws, bolts, pins, pawls or the like.

An important advantage of numerous embodiments of the present invention is their simplicity. Thus, a connection which is proposed in accordance with the present invention can be readily interrupted and/or reestablished by a vehicle operator who is not a skilled mechanic. Furthermore, the features which are shown in FIGS. 8 to 8c (namely, the utilization of one or more pointers and associated scales) even further simplifies the task of an operator who is confronted with an emergency situation under circumstances which are less than favorable as far immediately or reasonably rapidly obtaining assistance from a repair shop or from another operator is concerned.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of our contribution to the art of power trains for motor vehicles and, therefore, such adaptations should and are intended to be comprehended within the meaning and range of equivalence of the appended claims.

What is claimed is:

1. A motor vehicle power train comprising a prime mover; a transmission system shiftable into and from a selected one of a plurality of gears; a torque transmitting system having engaged and disengaged conditions; means for automatically operating at least one of said systems through actuating means operating at least one input element of said at least one system, said actuating means comprising at least one driving unit with an actuating shaft and at least one mobile output element arranged to receive motion from said actuating shaft and to normally transmit motion to said at least one input element; wherein said actuating means further comprises a back-up actuating device to manually apply an actuating torque directly to the actuating shaft if the driving unit is inoperative, said back-up actuating device being axially movable into a first position in which the back-up actuating device has a torque-transmitting engagement with the actuating shaft and into a second position in which the back-up actuating device is disengaged from the actuating shaft; and wherein the back-up actuating device comprises securing means to secure the back-up actuating device in either of the first position and the second position, wherein in the first position, the torque-transmitting engagement comprises a friction-based coupling engagement.

2. A motor vehicle power train comprising a prime mover; a transmission system shiftable into and from a selected one of a plurality of gears; a torque transmitting system having engaged and disengaged conditions; means for automatically operating at least one of said systems through actuating means operating at least one input element of said at least one system, said actuating means comprising at least one driving unit with an actuating shaft and at least one mobile output element arranged to receive motion from said actuating shaft and to normally transmit motion to said at least one input element; wherein said actuating means further comprises a back-up actuating device to manually apply an actuating torque directly to the actuating shaft if the driving unit is inoperative, said back-up actuating device being axially movable into a first position in which the back-up actuating device has a torque-transmitting engagement with the actuating shaft and into a second position in which the back-up actuating device is disengaged from the actuating shaft; and wherein the back-up actuating device comprises securing means to secure the back-up actuating device in either of the first position and the second position, wherein the securing means has an elastic resilience whereby the back-up actuating device, when in the first position, is spring-biased into the torque-transmitting engagement.

* * * * *